(12) United States Patent
Huang

(10) Patent No.: US 12,025,777 B2
(45) Date of Patent: Jul. 2, 2024

(54) OPTICAL IMAGING LENS SYSTEM, IMAGE CAPTURING UNIT AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 542 days.

(21) Appl. No.: 17/198,071

(22) Filed: Mar. 10, 2021

(65) Prior Publication Data

US 2022/0146789 A1 May 12, 2022

(30) Foreign Application Priority Data

Nov. 11, 2020 (TW) ................................. 109139256

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC .. G02B 13/0045; G02B 9/64; G02B 27/0025; G02B 13/06; G02B 13/18; G02B 13/04
See application file for complete search history.

(56) References Cited

U.S. PATENT DOCUMENTS 9,523,841 B1 12/2016 Chen
10,268,025 B1 4/2019 Sato
(Continued)

FOREIGN PATENT DOCUMENTS

CN 101354479 1/2009
CN 107831588 3/2018
(Continued)

OTHER PUBLICATIONS

1 European Search Report dated May 30, 2022 as received in application No. 21190630.0.
(Continued)

*Primary Examiner* — George G. King
*Assistant Examiner* — Anna Smith
(74) *Attorney, Agent, or Firm* — Maschoff Brennan

(57) ABSTRACT

An optical imaging lens system includes eight lens elements which are, in order from an object side to an image side along an optical path: a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side. The eighth lens element has negative refractive power. The object-side surface of the eighth lens element is convex in a paraxial region thereof. The image-side surface of the eighth lens element is concave in a paraxial region thereof and has at least one critical point in an off-axis region thereof. A total number of lens elements in the optical imaging lens system is eight.

35 Claims, 34 Drawing Sheets

(56) References Cited

U.S. PATENT DOCUMENTS

| | | | |
|---|---|---|---|
| 2015/0103413 A1* | 4/2015 | Uchida | G02B 13/18 359/694 |
| 2019/0137736 A1* | 5/2019 | Huh | G02B 13/0045 |
| 2019/0361205 A1 | 11/2019 | Wolterink | |
| 2020/0132969 A1 | 4/2020 | Huang | |
| 2020/0209543 A1 | 7/2020 | Kim | |

FOREIGN PATENT DOCUMENTS

| | | | |
|---|---|---|---|
| CN | 109116520 | | 1/2019 |
| CN | 109581631 | | 4/2019 |
| CN | 209297019 | | 8/2019 |
| CN | 110515187 | | 11/2019 |
| CN | 110989136 | | 4/2020 |
| CN | 111239984 | | 6/2020 |
| CN | 111308659 A | | 6/2020 |
| CN | 111552059 A | | 8/2020 |
| CN | 111624737 A | | 9/2020 |
| CN | 112014953 A | * 12/2020 | ......... G02B 13/0045 |
| CN | 112180562 A | 1/2021 | |
| CN | 112505902 A | 3/2021 | |
| JP | H11-295595 | 10/1999 | |
| JP | 2013-061547 | 4/2013 | |
| JP | 2019-197088 | 11/2019 | |
| TW | I694268 | 5/2020 | |
| TW | I701474 | 8/2020 | |
| TW | M602642 | 10/2020 | |
| WO | 2020-019705 | 1/2020 | |
| WO | WO-2021022524 A1 * | 2/2021 | ............. G02B 7/021 |
| WO | 2022-018582 | 1/2022 | |

OTHER PUBLICATIONS

Chinese Office Action dated Oct. 9, 2022 as received in application No. 202011432667.0.

Taiwan Office Action dated Dec. 2, 2021 as received in application No. 109139256.

* cited by examiner

OPTICAL IMAGING LENS SYSTEM, IMAGE CAPTURING UNIT AND ELECTRONIC DEVICE

RELATED APPLICATIONS

This application claims priority to Taiwan Application 109139256, filed on Nov. 11, 2020, which is incorporated by reference herein in its entirety.

BACKGROUND

Technical Field

The present disclosure relates to an optical imaging lens system, an image capturing unit and an electronic device, more particularly to an optical imaging lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The eighth lens element has negative refractive power. The object-side surface of the eighth lens element is convex in a paraxial region thereof. The image-side surface of the eighth lens element is concave in a paraxial region thereof, and the image-side surface of the eighth lens element has at least one critical point in an off-axis region thereof. A total number of lens elements in the optical imaging lens system is eight.

When an Abbe number of the third lens element is V3, an Abbe number of the fourth lens element is V4, a focal length of the optical imaging lens system is f, a focal length of the second lens element is f2, a curvature radius of the object-side surface of the first lens element is R1, and a curvature radius of the image-side surface of the sixth lens element is R12, the following conditions are satisfied:

$10.0<V3+V4<70.0;$ $-8.0<f/R1-f/R12≤1.50;$ and $-0.60<f/f2<5.0.$

According to another aspect of the present disclosure, an optical imaging lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The second lens element has positive refractive power. The image-side surface of the seventh lens element is concave in a paraxial region thereof. At least one of the object-side surface and the image-side surface of the seventh lens element has at least one inflection point. The image-side surface of the eighth lens element is concave in a paraxial region thereof, and the image-side surface of the eighth lens element has at least one critical point in an off-axis region thereof. A total number of lens elements in the optical imaging lens system is eight.

When an Abbe number of the third lens element is V3, an Abbe number of the fourth lens element is V4, a focal length of the optical imaging lens system is f, a curvature radius of the object-side surface of the first lens element is R1, a curvature radius of the image-side surface of the sixth lens element is R12, an axial distance between the sixth lens element and the seventh lens element is T67, and an axial distance between the seventh lens element and the eighth lens element is T78, the following conditions are satisfied:

$10.0<V3+V4<70.0;$ $-8.0<f/R1-f/R12<1.80;$ and $0.01<T67/T78<0.45.$

According to another aspect of the present disclosure, an optical imaging lens system includes eight lens elements. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The object-side surface of the first lens element is concave in a paraxial region thereof. At least one of the object-side surface and the image-side surface of the first lens element is aspheric. At least one of the object-side surface and the image-side surface of the first lens element has at least one inflection point. The image-side surface of the eighth lens element is concave in a paraxial region thereof, and the image-side surface of the eighth lens element has at least one critical point in an off-axis region thereof. A total number of lens elements in the optical imaging lens system is eight.

When an Abbe number of the third lens element is V3, an Abbe number of the fourth lens element is V4, a curvature radius of the object-side surface of the eighth lens element is R15, and a curvature radius of the image-side surface of the eighth lens element is R16, the following conditions are satisfied:

$10.0<V3+V4<70.0;$ and $-0.80<(R15+R16)/(R15-R16).$

According to another aspect of the present disclosure, an image capturing unit includes one of the aforementioned optical imaging lens systems and an image sensor, wherein the image sensor is disposed on an image surface of the optical imaging lens system.

According to another aspect of the present disclosure, an electronic device includes at least two image capturing units disposed on the same side of the electronic device. The at least two image capturing units include a first image capturing unit and a second image capturing unit. The first image capturing unit includes one of the aforementioned optical imaging lens systems and an image sensor disposed on an image surface of the optical imaging lens system. The second image capturing unit includes an optical lens assembly and an image sensor disposed on an image surface of the optical lens assembly. A maximum field of view of the first image capturing unit and a maximum field of view of the second image capturing unit differ by at least 20 degrees.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens system includes eight lens elements, and a total number of lens elements in the optical imaging lens system is eight. The eight lens elements are, in order from an object side to an image side along an optical path, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

Figure 31:
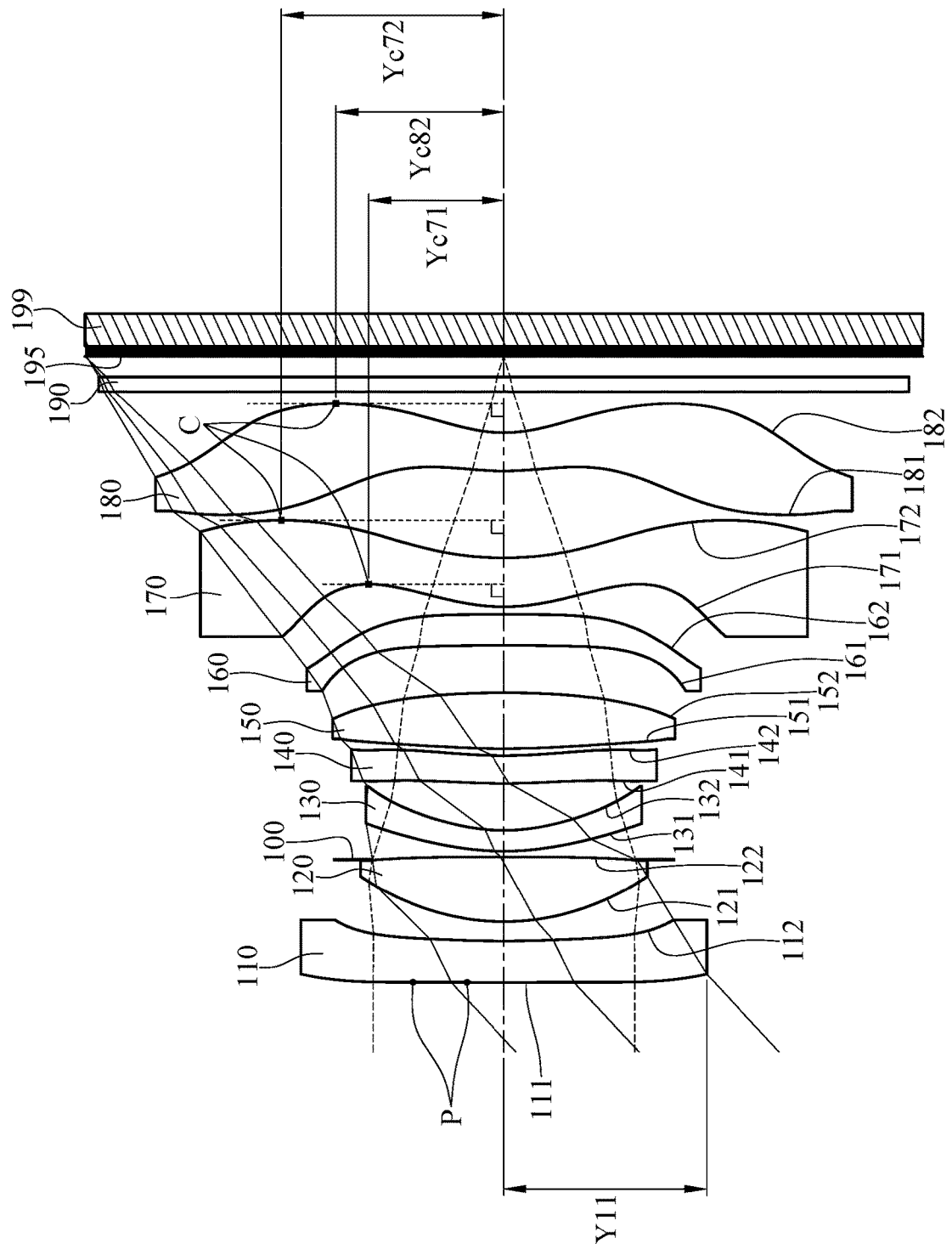
FIG. 31 shows a schematic view of Y11, Yc71, Yc72, Yc82, and several inflection points and critical points of lens elements according to the 1st embodiment of the present disclosure.

The object-side surface of the first lens element can be concave in a paraxial region thereof. Therefore, it is favorable for providing a compact and wide-angle lens configuration. At least one of the object-side surface and the image-side surface of the first lens element can be aspheric. Therefore, it is favorable for correcting off-axis aberrations so as to improve peripheral image quality. At least one of the object-side surface and the image-side surface of the first lens element can have at least one inflection point. Therefore, it is favorable for receiving light rays from off-axis region so as to reduce the incident angle of light, thereby preventing total reflection. Please refer to FIG. 31, which shows a schematic view of inflection points P of the object-side surface 111 of the first lens element 110 according to the 1st embodiment of the present disclosure. The inflection points of the object-side surface of the first lens element in FIG. 31 are only exemplary. In each embodiment, each lens surface of the lens elements can have one or more inflection points.

The second lens element can have positive refractive power. Therefore, it is favorable for providing significant light converging capability so as to reduce the size of the optical imaging lens system, thereby meeting the requirement of compactness. The object-side surface of the second lens element can be convex in a paraxial region thereof. Therefore, it is favorable for providing sufficient converging capability at the object side of the optical imaging lens system from the second lens element so as to achieve a compact configuration.

The third lens element can have negative refractive power. Therefore, it is favorable for correcting aberrations generated by the second lens element and further correcting spherical and chromatic aberrations. The image-side surface of the third lens element can be concave in a paraxial region thereof. Therefore, it is favorable for correcting aberrations generated by the first and second lens elements so as to improve image quality.

The fourth lens element can have negative refractive power. Therefore, it is favorable for balancing negative refractive power distribution of the third and fourth lens elements so as to prevent a single lens element from having overly strong refractive power, thereby preventing excessive aberrations.

The fifth lens element can have positive refractive power. Therefore, it is favorable for properly distributing the converging capability of the optical imaging lens system so as to achieve high image quality.

The image-side surface of the sixth lens element can be concave in a paraxial region thereof. Therefore, it is favorable for balancing aberrations in the paraxial and off-axis regions so as to ensure consistent quality between the center and peripheral regions of the images.

The seventh lens element can have positive refractive power. Therefore, it is favorable for balancing the refractive power of the eighth lens element so as to reduce aberrations of the optical imaging lens system. The object-side surface of the seventh lens element can be convex in a paraxial region thereof. Therefore, it is favorable for correcting field curvature. The image-side surface of the seventh lens element can be concave in a paraxial region thereof. Therefore, it is favorable for extending the effective radius of the seventh lens element so as to correct peripheral light rays. Moreover, in one configuration where the image-side surface of the seventh lens element is concave in the paraxial region thereof, the image-side surface of the seventh lens element can have at least one convex critical point in an off-axis region thereof. Therefore, it is favorable for achieving compactness and flattening the Petzval surface of the optical imaging lens system. At least one of the object-side surface and the image-side surface of the seventh lens element can have at least one inflection point. Therefore, it is favorable for adjusting light convergence capability at off-axis regions and increasing peripheral image quality when taking close-up photos. Please refer to FIG. 31, which shows a schematic view of critical points C of the seventh lens element 170 and the eighth lens element 180 according to the 1st embodiment of the present disclosure. The critical points of the seventh and eighth lens elements in FIG. 31 are only exemplary. In each embodiment, each of the lens elements can have one or more critical points in an off-axis region thereof.

The eighth lens element can have negative refractive power. Therefore, it is favorable for achieving a compact module so as to reduce the total size of the optical imaging lens system. The object-side surface of the eighth lens element can be convex in a paraxial region thereof. Therefore, it is favorable for correcting coma and astigmatism. The image-side surface of the eighth lens element is concave in a paraxial region thereof. Therefore, it is favorable for reducing the back focal length of the optical imaging lens system so as to meet the requirement of compactness. The image-side surface of the eighth lens element has at least one critical point in an off-axis region thereof. Therefore, it is favorable for correcting off-axis aberrations and reducing the total track length of the optical imaging lens system.

According to the present disclosure, at least four lens elements of the optical imaging lens system can be made of plastic material. Therefore, it is favorable for reducing manufacturing costs and increasing design flexibility so as to better correct off-axis aberrations.

When an Abbe number of the third lens element is V3, and an Abbe number of the fourth lens element is V4, the following condition is satisfied: $10.0<V3+V4<70.0$. Therefore, it is favorable for adjusting the light path and balancing the light convergence of different wavelengths so as to correct chromatic aberration. Moreover, the following condition can also be satisfied: $20.0<V3+V4<50.0$.

When a focal length of the optical imaging lens system is f, a curvature radius of the object-side surface of the first lens element is R1, and a curvature radius of the image-side surface of the sixth lens element is R12, the following condition can be satisfied: $-8.0<f/R1-f/R12<1.80$. Therefore, it is favorable for preventing the object-side surface of the first lens element and the image-side surface of the sixth lens element from being overly curved so as to balance aberrations of the optical imaging lens system. Moreover, the following condition can also be satisfied: $-8.0<f/R1-f/R12<1.50$. Moreover, the following condition can also be satisfied: $-6.0<f/R1-f/R12<0.70$. Moreover, the following condition can also be satisfied: $-5.0<f/R1-f/R12<1.20$. Moreover, the following condition can also be satisfied: $-3.0<f/R1-f/R12<0.80$.

When the focal length of the optical imaging lens system is f, and a focal length of the second lens element is f2, the following condition can be satisfied: $-0.60<f/f2<5.0$. Therefore, it is favorable for the second lens element to control the light path for satisfying product specification. Moreover, the following condition can also be satisfied: $-0.30<f/f2<3.0$. Moreover, the following condition can also be satisfied: $0<f/f2<1.80$.

When an axial distance between the sixth lens element and the seventh lens element is T67, and an axial distance between the seventh lens element and the eighth lens element is T78, the following condition can be satisfied: $0.01<T67/T78<0.45$. Therefore, it is favorable for arranging the space in the optical imaging lens system so as to balance between the size and assembling yield rate thereof. Moreover, the following condition can also be satisfied: $0<T67/T78<0.35$. Moreover, the following condition can also be satisfied: $0<T67/T78<0.25$. Moreover, the following condition can also be satisfied: $0<T67/T78<0.15$.

When a curvature radius of the object-side surface of the eighth lens element is R15, and a curvature radius of the image-side surface of the eighth lens element is R16, the following condition can be satisfied: $-0.80<(R15+R16)/$ (R15−R16). Therefore, it is favorable for balancing the surface shape of the eighth lens element so as to enhance aberration corrections, thereby obtaining high image quality. Moreover, the following condition can also be satisfied: −0.30<(R15+R16)/(R15−R16)<9.0. Moreover, the following condition can also be satisfied: 0<(R15+R16)/(R15−R16)<9.0. Moreover, the following condition can also be satisfied: 1.0<(R15+R16)/(R15−R16)<6.0. Moreover, the following condition can also be satisfied: 2.0<(R15+R16)/(R15−R16)<5.0.

When the Abbe number of the third lens element is V3, and the Abbe number of the fourth lens element is V4, the following condition can be satisfied: 0.60<V3/V4<1.50. Therefore, it is favorable for correcting chromatic aberration by the third and fourth lens elements so as to prevent dispersion of light rays in different wavelengths.

When an Abbe number of the sixth lens element is V6, the following condition can be satisfied: 25.0<V6<50.0. Therefore, it is favorable for correcting chromatic aberration by the sixth lens element so as to fine-tune focusing positions of light rays with different wavelengths, thereby improving image quality. Moreover, the following condition can also be satisfied: 30.0<V6<48.0.

When an axial distance between the second lens element and the third lens element is T23, an axial distance between the third lens element and the fourth lens element is T34, an axial distance between the fourth lens element and the fifth lens element is T45, the axial distance between the sixth lens element and the seventh lens element is T67, and the axial distance between the seventh lens element and the eighth lens element is T78, the following condition can be satisfied: 0<(T23+T45+T67)/(T34+T78)<0.60. Therefore, it is favorable for balancing distances between adjacent lens elements and reducing sensitivity so as to achieve a high assembling yield rate. Moreover, the following condition can also be satisfied: 0.03<(T23+T45+T67)/(T34+T78)<0.35.

When a focal length of the first lens element is f1, and the focal length of the second lens element is f2, the following condition can be satisfied: −9.0<f2/f1<2.0. Therefore, it is favorable for balancing the refractive power of the first and second lens elements so as to obtain a larger field of view. Moreover, the following condition can also be satisfied: −1.0<f2/f1<1.0. Moreover, the following condition can also be satisfied: −0.50<f2/f1<0.40.

When an axial distance between the object-side surface of the first lens element and an image surface is TL, and the focal length of the optical imaging lens system is f, the following condition can be satisfied: 0.50<TL/f<5.0. Therefore, it is favorable for balancing the total track length and the field of view of the optical imaging lens system so as to satisfy product specification requirements. Moreover, the following condition can also be satisfied: 0.90<TL/f<2.0.

When a maximum value among refractive indices of all lens elements of the optical imaging lens system is Nmax, the following condition can be satisfied: 1.60<Nmax<1.78. Therefore, it is favorable for selecting proper lens materials so as to reduce difficulty in manufacture, thereby increasing the feasibility of commercialization of the optical imaging lens system. Moreover, the following condition can also be satisfied: 1.65<Nmax<1.72.

When a minimum value among Abbe numbers of all lens elements of the optical imaging lens system is Vdmin, the following condition can be satisfied: 10.0<Vdmin<20.0. Therefore, it is favorable for increasing the density difference between the lens elements and air so as to better control the light path within limited interior space. Moreover, the following condition can also be satisfied: 15.0<Vdmin<19.0.

When the focal length of the optical imaging lens system is f, and a maximum image height of the optical imaging lens system (which can be half of a diagonal length of an effective photosensitive area of an image sensor) is ImgH, the following condition can be satisfied: 0.30<f/ImgH<1.15. Therefore, it is favorable for controlling the viewing angle of the optical imaging lens system so as to provide a sufficient field of view for mainstream applications. Moreover, the following condition can also be satisfied: 0.50<f/ImgH<1.15.

When the focal length of the optical imaging lens system is f, and a vertical distance between a non-axial critical point on the image-side surface of the eighth lens element and an optical axis is Yc82, the following condition can be satisfied: 0.50<f/Yc82<5.0. Therefore, it is favorable for correcting off-axis aberrations at the image side while reducing distortion and field curvature. Please refer to FIG. 31, which shows a schematic view of the critical point C of the image-side surface 182 of the eighth lens element 180 and Yc82 according to the 1st embodiment of the present disclosure.

When an axial distance between the image-side surface of the eighth lens element and the image surface is BL, and the maximum image height of the optical imaging lens system is ImgH, the following condition can be satisfied: 0.05<BL/ImgH<0.25. Therefore, it is favorable for reducing the back focal length so as to control the total track length of the optical imaging lens system.

When the axial distance between the object-side surface of the first lens element and the image surface is TL, and the maximum image height of the optical imaging lens system is ImgH, the following condition can be satisfied: 0.80<TL/ImgH<1.90. Therefore, it is favorable for reducing the total track length while having a sufficient light receiving area of the optical imaging lens system so as to prevent vignetting in the peripheral region of the image. Moreover, the following condition can also be satisfied: 0.90<TL/ImgH<1.65. Moreover, the following condition can also be satisfied: 1.0<TL/ImgH<1.55.

When the axial distance between the seventh lens element and the eighth lens element is T78, and a central thickness of the seventh lens element is CT7, the following condition can be satisfied: 0.60<T78/CT7<8.0. Therefore, it is favorable for balancing the thicknesses of the lens elements and gaps between adjacent lens elements of the optical imaging lens system so as to achieve a high assembling yield rate. Moreover, the following condition can also be satisfied: 0.90<T78/CT7<3.0.

When the focal length of the optical imaging lens system is f, the curvature radius of the object-side surface of the first lens element is R1, and a curvature radius of the image-side surface of the first lens element is R2, the following condition can be satisfied: 0<|f/R1|+|f/R2|<2.0. Therefore, it is favorable for the first lens element to become a correction lens so as to prevent an overly curved lens surface of a single lens element and correct aberrations generated by adjacent lens elements. Moreover, the following condition can also be satisfied: 0.05<|f/R1|+|f/R2|<1.20.

When the axial distance between the third lens element and the fourth lens element is T34, and a central thickness of the third lens element is CT3, the following condition can be satisfied: 1.0<T34/CT3<3.50. Therefore, it is favorable for providing sufficient space between the third and fourth lens elements so as to adjust the light path.

When the focal length of the optical imaging lens system is f, and the focal length of the first lens element is f1, the following condition can be satisfied: −0.50<f/f1<0.15. Therefore, it is favorable for controlling the refractive power of the first lens element so as to reduce aberrations generated due to a large incident angle.

When the axial distance between the fourth lens element and the fifth lens element is T45, and a central thickness of the fourth lens element is CT4, the following condition can be satisfied: 0.03<T45/CT4<0.55. Therefore, it is favorable for controlling the central thicknesses and axial distances between the fourth and fifth lens elements so as to better utilize space in the optical imaging lens system.

When a central thickness of the fifth lens element is CT5, and a central thickness of the sixth lens element is CT6, the following condition can be satisfied: 1.20<CT5/CT6<2.50. Therefore, it is favorable for controlling the thicknesses of the fifth and sixth lens elements so as to maintain good quality in lens molding, thereby providing a stable manufacturing yield rate.

According to the present disclosure, the optical imaging lens system can further include an aperture stop. When an axial distance between the aperture stop and the image surface is SL, and the axial distance between the object-side surface of the first lens element and the image surface is TL, the following condition can be satisfied: 0.70<SL/TL<0.92. Therefore, the position of the aperture stop is favorable for controlling the size of the optical imaging lens system.

When half of a maximum field of view of the optical imaging lens system is HFOV, the following condition can be satisfied: 40.0 [deg.]<HFOV<58.0 [deg.]. Therefore, it is favorable for providing a sufficient field of view so as to satisfy the market demands.

When the focal length of the optical imaging lens system is f, and a focal length of the fourth lens element is f4, the following condition can be satisfied: −1.0<f/f4<−0.20. Therefore, it is favorable for controlling the refractive power of the fourth lens element so as to reduce sensitivity.

When the focal length of the optical imaging lens system is f, and the curvature radius of the object-side surface of the eighth lens element is R15, the following condition can be satisfied: −0.15<f/R15. Therefore, it is favorable for preventing overly strong refractive power of the eighth lens element so as to provide proper aberration corrections. Moreover, the following condition can also be satisfied: −0.10<f/R15<3.50.

When the focal length of the optical imaging lens system is f, and the curvature radius of the image-side surface of the eighth lens element is R16, the following condition can be satisfied: 2.0<f/R16<6.5. Therefore, it is favorable for ensuring a proper curvature of the image-side surface of the eighth lens element so as to control the light path and enhance its functionality. Moreover, the following condition can also be satisfied: 3.0<f/R16<5.5.

When a central thickness of the first lens element is CT1, and the central thickness of the third lens element is CT3, the following condition can be satisfied: 0.60<CT1/CT3<4.50. Therefore, it is favorable for controlling the thicknesses of lens elements at the object side of the optical imaging lens system so as to maintain good quality in lens molding, thereby providing a stable manufacturing yield rate Moreover, the following condition can also be satisfied: 1.30<CT1/CT3<4.50.

When a vertical distance between a non-axial critical point on the object-side surface of the seventh lens element and the optical axis is Yc71, and a vertical distance between a non-axial critical point on the image-side surface of the seventh lens element and the optical axis is Yc72, the following condition can be satisfied: 0.30<Yc71/Yc72<2.0. Therefore, it is favorable for providing high image quality at various object distances while reducing distortion and field curvature. Please refer to FIG. 31, which shows a schematic view of the critical points C of the object-side surface 171 and image-side surface 172 of the seventh lens element 170, Yc71 and Yc72 according to the 1st embodiment of the present disclosure.

When a curvature radius of the object-side surface of the second lens element is R3, and a curvature radius of the image-side surface of the second lens element is R4, the following condition can be satisfied: −1.50<(R3+R4)/(R3−R4)<0.50. Therefore, it is favorable for improving light convergence on the object-side surface of the second lens element while preventing an overly large incident angle of light in the optical imaging lens system with a large view angle.

When the axial distance between the third lens element and the fourth lens element is T34, and the axial distance between the fourth lens element and the fifth lens element is T45, the following condition can be satisfied: 0<T45/T34<1.0. Therefore, it is favorable for ensuring that the space between the third and fourth lens elements is larger than that between the fourth and fifth lens elements so as to control the light path closer to the object side, thereby minimizing the size of the optical imaging lens system. Moreover, the following condition can also be satisfied: 0<T45/T34<0.60. Moreover, the following condition can also be satisfied: 0<T45/T34<0.30.

When the axial distance between the object-side surface of the first lens element and the image surface is TL, and a maximum effective radius of the object-side surface of the first lens element is Y11, the following condition can be satisfied: 2.0<TL/Y11<4.50. Therefore, it is favorable for controlling a ratio of the outer diameter of the object side to the total track length of the optical imaging lens system so as to obtain a compact-sized system with improved image quality. Please refer to FIG. 31, which shows a schematic view of Y11 according to the 1st embodiment of the present disclosure.

When the axial distance between the object-side surface of the first lens element and the image surface is TL, and an entrance pupil diameter of the optical imaging lens system is EPD, the following condition can be satisfied: 1.50<TL/EPD<3.80. Therefore, it is favorable for achieving a short total track length and a large aperture, enabling the optical imaging lens system to capture high brightness images within a limited system length.

When a curvature radius of the object-side surface of the third lens element is R5, and a curvature radius of the image-side surface of the third lens element is R6, the following condition can be satisfied: −0.40<(R5−R6)/(R5+R6)<0.40. Therefore, it is favorable for balancing the light paths in both tangential direction and sagittal direction so as to correct astigmatism.

When the entrance pupil diameter of the optical imaging lens system is EPD, and the maximum image height of the optical imaging lens system is ImgH, the following condition can be satisfied: 0.45<EPD/ImgH<1.0. Therefore, it is favorable for providing sufficient light on the image surface with the required image brightness.

When a curvature radius of the object-side surface of the seventh lens element is R13, and a curvature radius of the image-side surface of the seventh lens element is R14, the following condition can be satisfied: −0.70<(R13−R14)/

(R13+R14)<0.50. Therefore, it is favorable for the seventh lens element to correct coma and distortion.

When an Abbe number of the first lens element is V1, an Abbe number of the second lens element is V2, the Abbe number of the third lens element is V3, the Abbe number of the fourth lens element is V4, an Abbe number of the fifth lens element is V5, the Abbe number of the sixth lens element is V6, an Abbe number of the seventh lens element is V7, an Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the i-th lens element is Ni, and a minimum value of Vi/Ni is (Vi/Ni)min, the following condition can be satisfied: 7.0<(Vi/Ni)min<11.80, wherein i=1, 2, 3, 4, 5, 6, 7 or 8. Therefore, it is favorable for having sufficient image correction capability in the optical imaging lens system so as to correct various aberrations. Moreover, the following condition can also be satisfied: 8.5<(Vi/Ni)min<11.0, wherein i=1, 2, 3, 4, 5, 6, 7 or 8.

When the axial distance between the object-side surface of the first lens element and the image surface is TL, the following condition can be satisfied: 4.0 [mm]<TL<10.0 [mm]. Therefore, it is favorable for controlling the total track length of the optical imaging lens system, which becomes applicable to more applications so as to satisfy market demands. Moreover, the following condition can also be satisfied: 4.5 [mm]<TL<8.0 [mm].

When the maximum image height of the optical imaging lens system is ImgH, the following condition can be satisfied: 4.0 [mm]<ImgH<9.50 [mm]. Therefore, it is favorable for providing a proper light receiving area with sufficient image brightness so as to meet product specifications. Moreover, the following condition can also be satisfied: 5.50 [mm]<ImgH<8.50 [mm].

According to the present disclosure, an absolute value of the focal length of the second lens element can be a minimum among absolute values of focal lengths of each of all lens elements of the optical imaging lens system. Therefore, it is favorable for the second lens element to have sufficient refractive power so as to obtain compactness for various popular applications on the market.

According to the present disclosure, the axial distance between the seventh lens element and the eighth lens element can be a maximum among axial distances between each of all adjacent lens elements of the optical imaging lens system. Therefore, it is favorable for providing sufficient space between the seventh and eighth lens elements so as to correct aberrations in paraxial and off-axis regions.

According to the present disclosure, a maximum effective radius of one of the object-side surface of the second lens element, the image-side surface of the second lens element, the object-side surface of the third lens element and the image-side surface of the third lens element can be a minimum among maximum effective radii of all lens surfaces of the optical imaging lens system. Therefore, it is favorable for positioning the aperture stop and balancing the amount of incident light and the size of the optical imaging lens system.

According to the present disclosure, the aforementioned features and conditions can be utilized in numerous combinations so as to achieve corresponding effects.

According to the present disclosure, the lens elements of the optical imaging lens system can be made of either glass or plastic material. When the lens elements are made of glass material, the refractive power distribution of the optical imaging lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical imaging lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical imaging lens system, based on the corresponding image sensor, can be flat or curved, especially a curved surface being concave facing towards the object side of the optical imaging lens system.

According to the present disclosure, an image correction unit, such as a field flattener, can be optionally disposed between the lens element closest to the image side of the optical imaging lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 32:
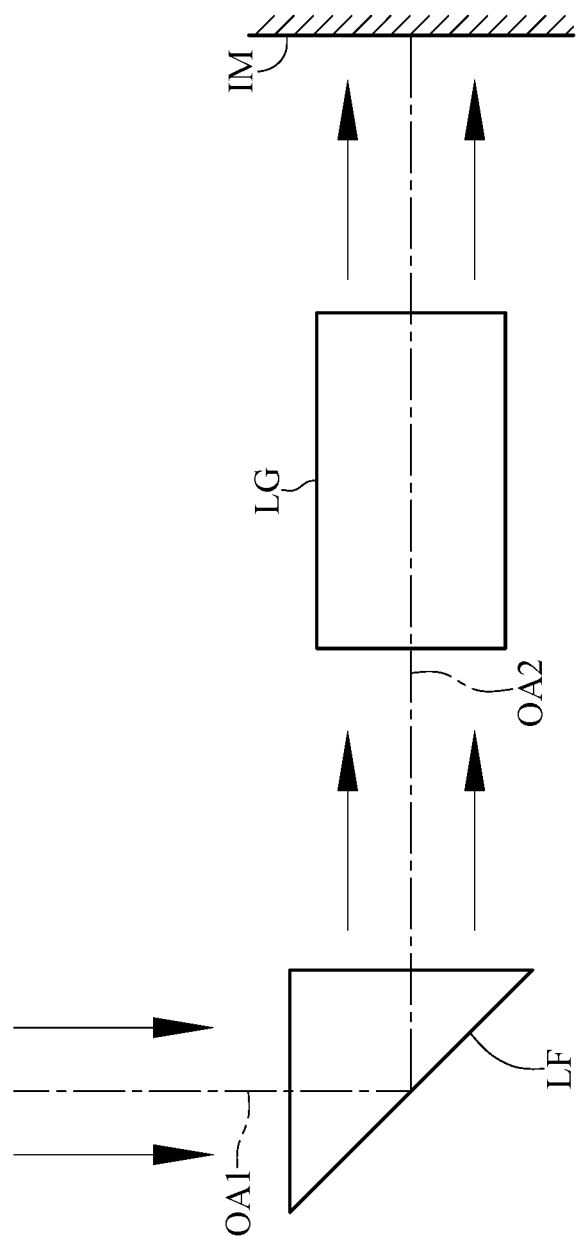
FIG. 32 shows a schematic view of a configuration of a light-folding element in an optical imaging lens system according to one embodiment of the present disclosure.
Figure 33:
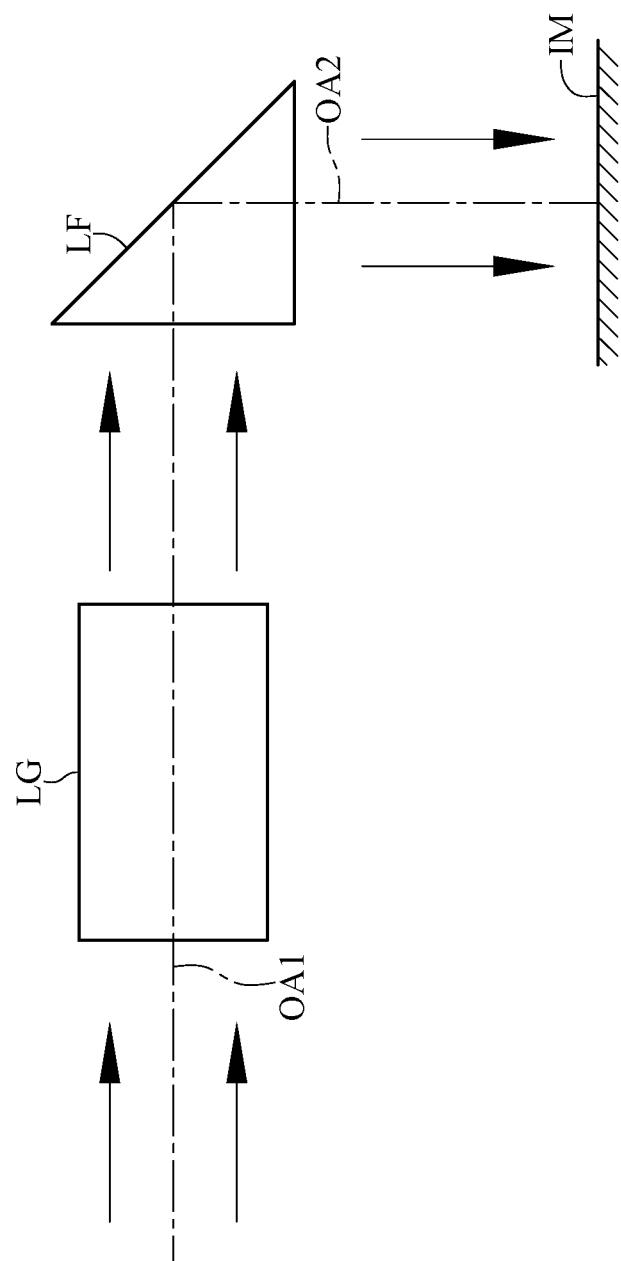
FIG. 33 shows a schematic view of another configuration of a light-folding element in an optical imaging lens system according to one embodiment of the present disclosure.
Figure 34:
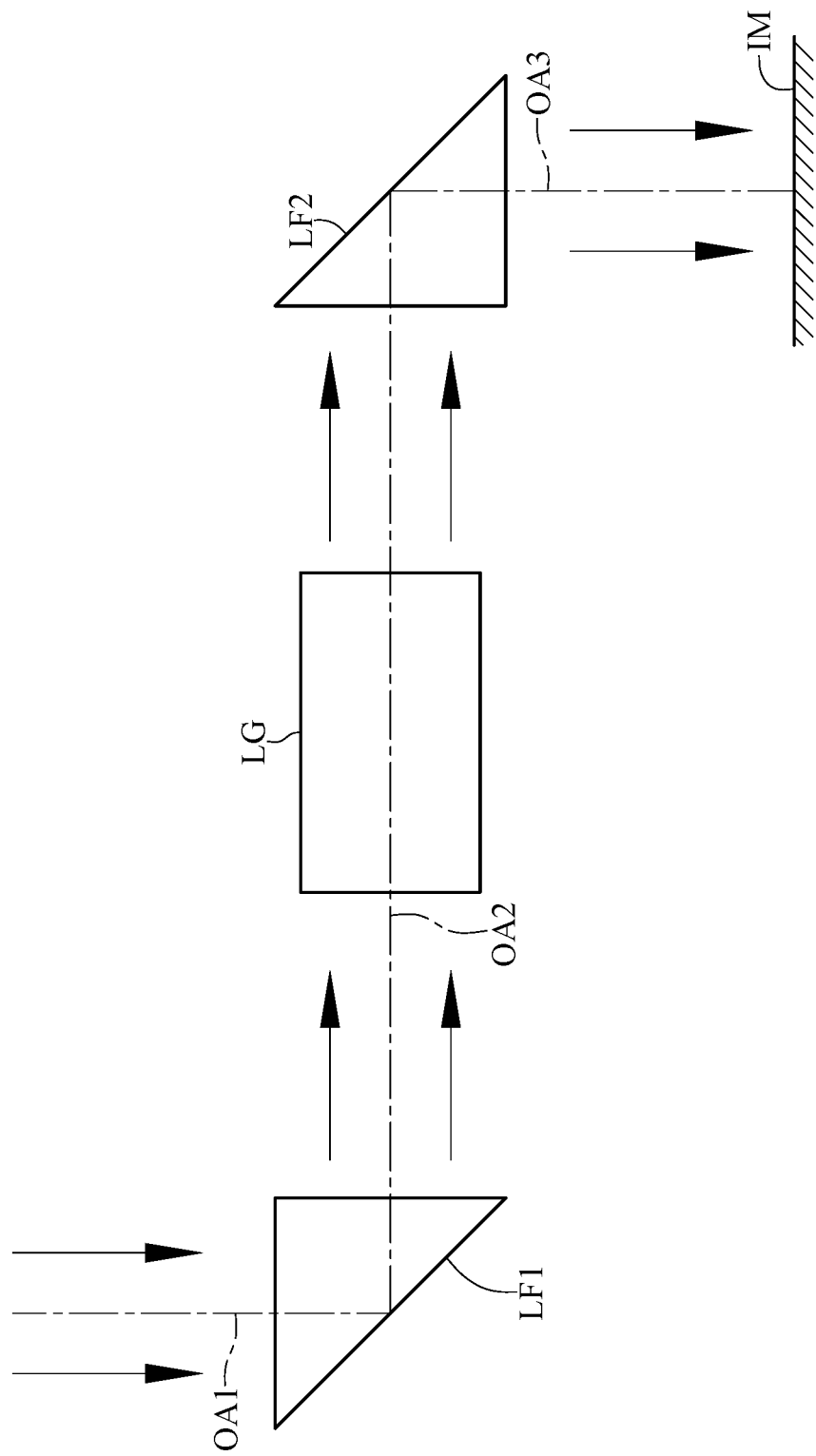
FIG. 34 shows a schematic view of a configuration of two light-folding elements in an optical imaging lens system according to one embodiment of the present disclosure.

According to the present disclosure, at least one light-folding element, such as a prism or a mirror, can be optionally disposed between an imaged object and the image surface on the imaging optical path, such that the optical imaging lens system can be more flexible in space arrangement, and therefore the dimensions of an electronic device is not restricted by the total track length of the optical imaging lens system. Specifically, please refer to FIG. 32 and FIG. 33. FIG. 32 shows a schematic view of a configuration of a light-folding element in an optical imaging lens system according to one embodiment of the present disclosure, and FIG. 33 shows a schematic view of another configuration of a light-folding element in an optical imaging lens system according to one embodiment of the present disclosure. In FIG. 32 and FIG. 33, the optical imaging lens system can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the optical imaging lens system as shown in FIG. 32 or disposed between a lens group LG of the optical imaging lens system and the image surface IM as shown in FIG. 33. Furthermore, please refer to FIG. 34, which shows a schematic view of a configuration of two light-folding elements in an optical imaging lens system according to one embodiment of the present disclosure. In FIG. 34, the optical imaging lens system can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical imaging lens system, the second light-folding element LF2 is disposed between the lens group LG of the optical imaging lens system and the image surface IM. The optical imaging lens system can be optionally provided with three or more light-folding elements, and the present disclosure is not limited to the type, amount and position of the light-folding elements of the embodiments disclosed in the aforementioned figures.

According to the present disclosure, the optical imaging lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens system and thereby provides a wider field of view for the same.

According to the present disclosure, the optical imaging lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
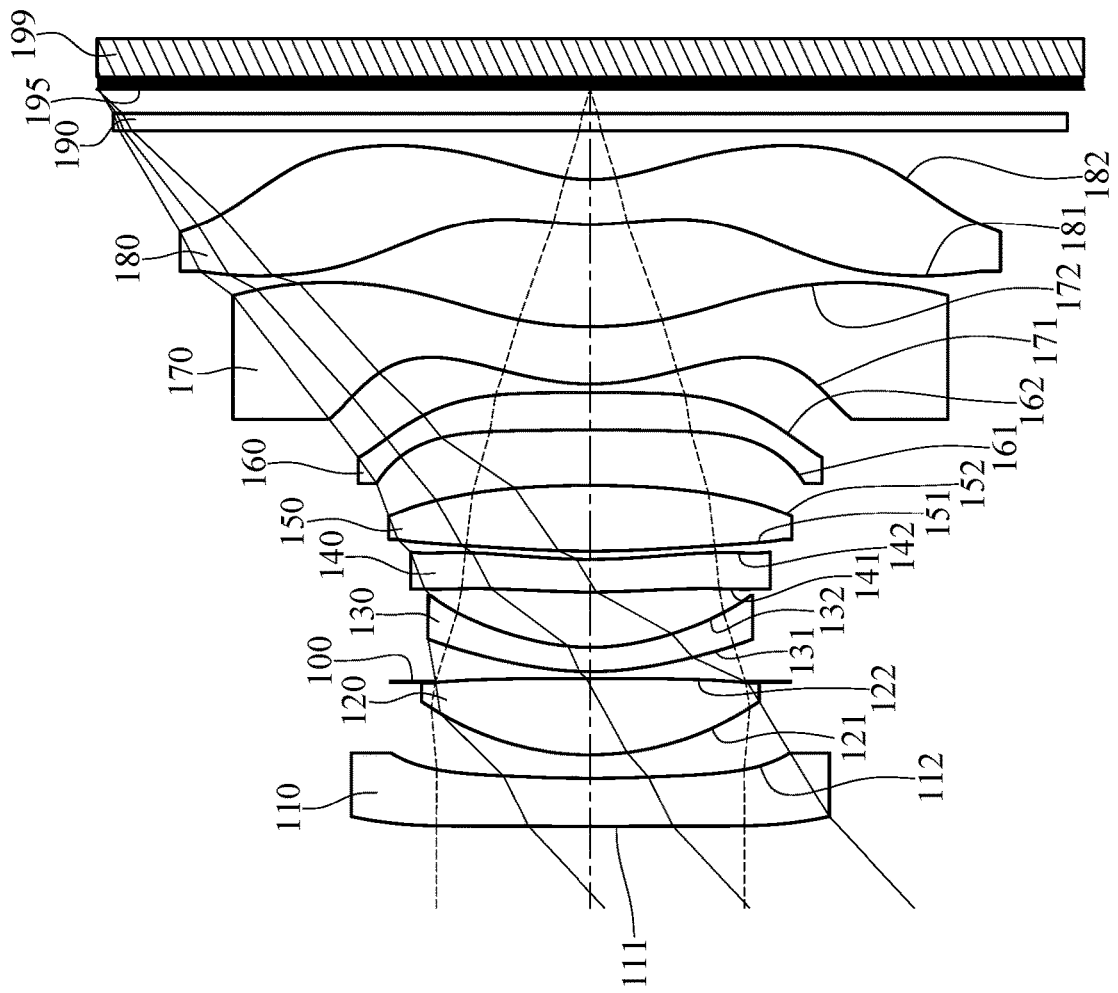
FIG. 1 is a schematic view of an image capturing unit according to the 1st embodiment of the present disclosure.
Figure 2:
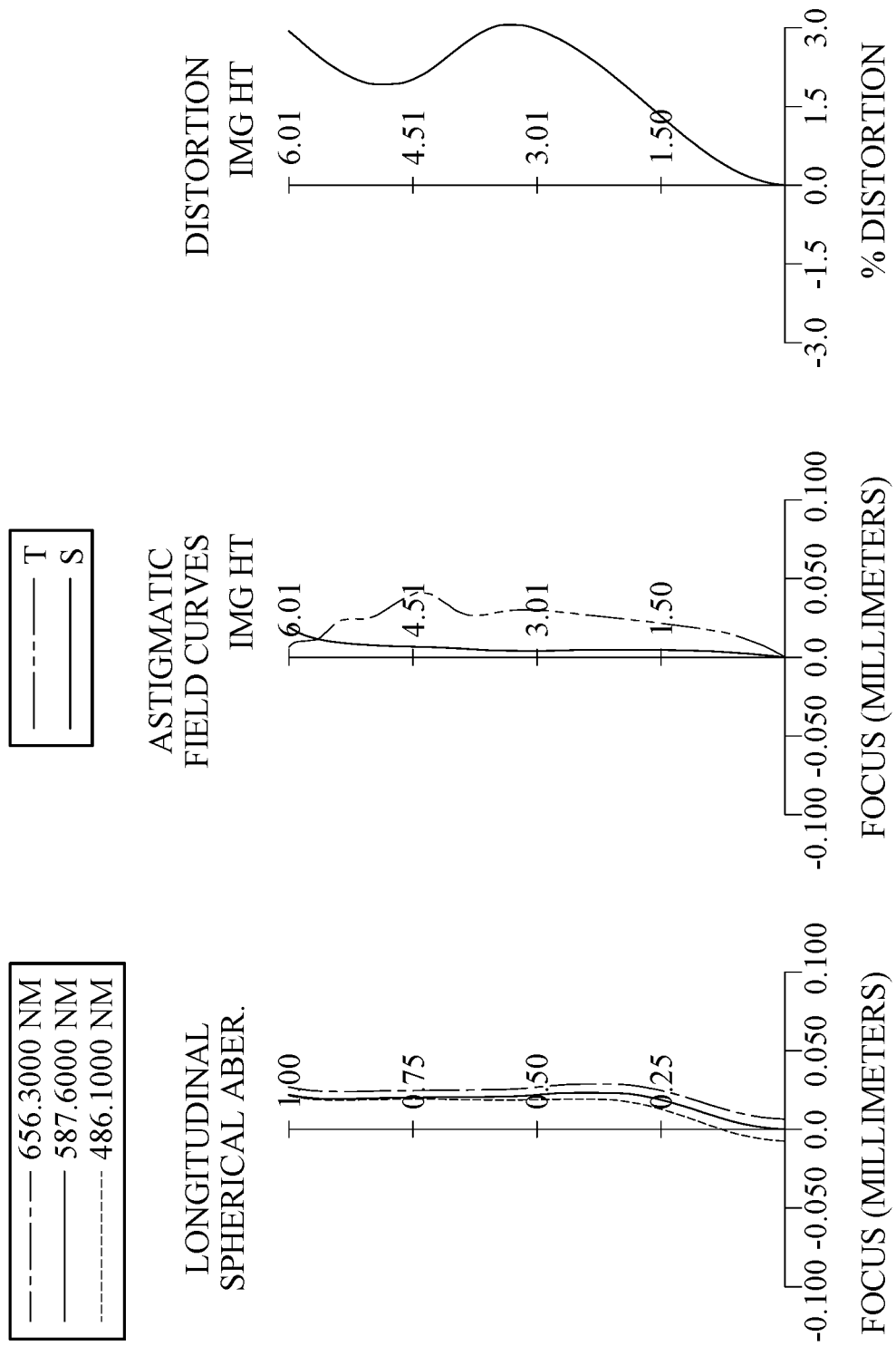
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens system (its reference numeral is omitted) of the present disclosure and an image sensor 199. The optical imaging lens system includes, in order from an object side to an image side along an optical path, a first lens element 110, a second lens element 120, an aperture stop 100, a third lens element 130, a fourth lens element 140, a fifth lens element 150, a sixth lens element 160, a seventh lens element 170, an eighth lens element 180, a filter 190 and an image surface 195. The optical imaging lens system includes eight lens elements (110, 120, 130, 140, 150, 160, 170 and 180) with no additional lens element disposed between each of the adjacent eight lens elements.

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has two inflection points.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being concave in a paraxial region thereof and an image-side surface 162 being concave in a paraxial region thereof. The sixth lens element 160 is made of plastic material and has the object-side surface 161 and the image-side surface 162 being both aspheric. The seventh lens element 170 with positive refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has at least one inflection point. The image-side surface 172 of the seventh lens element 170 has at least one inflection point. The object-side surface 171 of the seventh lens element 170 has at least one critical point in an off-axis region thereof. The image-side surface 172 of the seventh lens element 170 has at least one convex critical point in an off-axis region thereof.

The eighth lens element 180 with negative refractive power has an object-side surface 181 being convex in a paraxial region thereof and an image-side surface 182 being concave in a paraxial region thereof. The eighth lens element 180 is made of plastic material and has the object-side surface 181 and the image-side surface 182 being both aspheric. The image-side surface 182 of the eighth lens element 180 has at least one critical point in an off-axis region thereof.

The filter 190 is made of glass material and located between the eighth lens element 180 and the image surface 195, and will not affect the focal length of the optical imaging lens system. The image sensor 199 is disposed on or near the image surface 195 of the optical imaging lens system.

In this embodiment, the eight lens elements of the optical imaging lens system are all made of plastic material, an absolute value of a focal length of the second lens element 120 is a minimum among absolute values of focal lengths of each of all lens elements of the optical imaging lens system, an axial distance between the seventh lens element 170 and the eighth lens element 180 is a maximum among axial distances between each of all adjacent lens elements of the optical imaging lens system, and a maximum effective radius of the image-side surface 122 of the second lens element 120 is a minimum among maximum effective radii of all lens surfaces of the optical imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
X is the displacement in parallel with an optical axis from an axial vertex on the aspheric surface to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14, 16, 18 and 20.

In the optical imaging lens system of the image capturing unit according to the 1st embodiment, when a focal length of the optical imaging lens system is f, an f-number of the optical imaging lens system is Fno, and half of a maximum field of view of the optical imaging lens system is HFOV, these parameters have the following values: f=6.24 millimeters (mm), Fno=1.66, HFOV=43.0 degrees (deg.).

When an Abbe number of the sixth lens element 160 is V6, the following condition is satisfied: V6=44.6.

When an Abbe number of the third lens element 130 is V3, and an Abbe number of the fourth lens element 140 is V4, the following condition is satisfied: V3/V4=0.8.

When the Abbe number of the third lens element 130 is V3, and the Abbe number of the fourth lens element 140 is V4, the following condition is satisfied: V3+V4=36.0.

When a minimum value among Abbe numbers of all lens elements of the optical imaging lens system is Vdmin, the following condition is satisfied: Vdmin=16.5. In this embodiment, the Abbe number of the third lens element 130 is smaller than Abbe numbers of the other lens elements of the optical imaging lens system, and Vdmin is equal to the Abbe number of the third lens element 130.

When a maximum value among refractive indices of all lens elements of the optical imaging lens system is Nmax, the following condition is satisfied: Nmax=1.700. In this embodiment, a refractive index of the third lens element 130 is larger than refractive indices of the other lens elements of the optical imaging lens system, and Nmax is equal to the refractive index of the third lens element 130.

When an Abbe number of the first lens element 110 is V1, an Abbe number of the second lens element 120 is V2, the Abbe number of the third lens element 130 is V3, the Abbe number of the fourth lens element 140 is V4, an Abbe number of the fifth lens element 150 is V5, the Abbe number of the sixth lens element 160 is V6, an Abbe number of the seventh lens element 170 is V7, an Abbe number of the eighth lens element 180 is V8, an Abbe number of the i-th lens element is Vi, a refractive index of the first lens element 110 is N1, a refractive index of the second lens element 120 is N2, the refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, a refractive index of the eighth lens element 180 is N8, a refractive index of the i-th lens element is Ni, and a minimum value of Vi/Ni is (Vi/Ni)min, the following condition is satisfied: (Vi/Ni)min=9.71, wherein i=1, 2, 3, 4, 5, 6, 7 or 8. In this embodiment, a ratio of the Abbe number to refractive index of the third lens element 130 (V3/N3) is smaller than ratios of the Abbe number to refractive index of each of the other lens elements of the optical imaging lens system, and (Vi/Ni)min is equal to V3/N3.

When a central thickness of the first lens element 110 is CT1, and a central thickness of the third lens element 130 is CT3, the following condition is satisfied: CT1/CT3=1.98.

When a central thickness of the fifth lens element 150 is CT5, and a central thickness of the sixth lens element 160 is CT6, the following condition is satisfied: CT5/CT6=1.79.

When an axial distance between the third lens element 130 and the fourth lens element 140 is T34, and the central thickness of the third lens element 130 is CT3, the following condition is satisfied: T34/CT3=2.25. In this embodiment, an axial distance between two adjacent lens elements is a distance in a paraxial region between two adjacent lens surfaces of the two adjacent lens elements.

When the axial distance between the third lens element 130 and the fourth lens element 140 is T34, and an axial distance between the fourth lens element 140 and the fifth lens element 150 is T45, the following condition is satisfied: T45/T34=0.15.

When the axial distance between the fourth lens element 140 and the fifth lens element 150 is T45, and a central thickness of the fourth lens element 140 is CT4, the following condition is satisfied: T45/CT4=0.25.

When an axial distance between the sixth lens element 160 and the seventh lens element 170 is T67, and the axial distance between the seventh lens element 170 and the eighth lens element 180 is T78, the following condition is satisfied: T67/T78=0.09.

When the axial distance between the seventh lens element 170 and the eighth lens element 180 is T78, and a central thickness of the seventh lens element 170 is CT7, the following condition is satisfied: T78/CT7=1.79.

When an axial distance between the second lens element 120 and the third lens element 130 is T23, the axial distance between the third lens element 130 and the fourth lens element 140 is T34, the axial distance between the fourth lens element 140 and the fifth lens element 150 is T45, the axial distance between the sixth lens element 160 and the seventh lens element 170 is T67, and the axial distance between the seventh lens element 170 and the eighth lens element 180 is T78, the following condition is satisfied: (T23+T45+T67)/(T34+T78)=0.15.

When the focal length of the optical imaging lens system is f, and a curvature radius of the object-side surface 181 of the eighth lens element 180 is R15, the following condition is satisfied: f/R15=1.56.

When the focal length of the optical imaging lens system is f, and a curvature radius of the image-side surface 182 of the eighth lens element 180 is R16, the following condition is satisfied: f/R16=3.27.

When the focal length of the optical imaging lens system is f, a curvature radius of the object-side surface 111 of the first lens element 110 is R1, and a curvature radius of the image-side surface 112 of the first lens element 110 is R2, the following condition is satisfied: |f/R1|+|f/R2|=0.50.

When the focal length of the optical imaging lens system is f, the curvature radius of the object-side surface 111 of the first lens element 110 is R1, and a curvature radius of the image-side surface 162 of the sixth lens element 160 is R12, the following condition is satisfied: f/R1−f/R12=0.05.

When a curvature radius of the object-side surface 121 of the second lens element 120 is R3, and a curvature radius of the image-side surface 122 of the second lens element 120 is R4, the following condition is satisfied: (R3+R4)/(R3−R4)=−0.93.

When a curvature radius of the object-side surface 131 of the third lens element 130 is R5, and a curvature radius of the image-side surface 132 of the third lens element 130 is R6, the following condition is satisfied: (R5−R6)/(R5+R6)=0.14.

When a curvature radius of the object-side surface 171 of the seventh lens element 170 is R13, and a curvature radius of the image-side surface 172 of the seventh lens element 170 is R14, the following condition is satisfied: (R13−R14)/(R13+R14)=−0.26.

When the curvature radius of the object-side surface 181 of the eighth lens element 180 is R15, and the curvature radius of the image-side surface 182 of the eighth lens element 180 is R16, the following condition is satisfied: (R15+R16)/(R15−R16)=2.82.

When the focal length of the optical imaging lens system is f, and a focal length of the first lens element 110 is f1, the following condition is satisfied: f/f1=−0.17.

When the focal length of the optical imaging lens system is f, and the focal length of the second lens element 120 is f2, the following condition is satisfied: f/f2=1.04.

When the focal length of the optical imaging lens system is f, and a focal length of the fourth lens element 140 is f4, the following condition is satisfied: f/f4=−0.18.

When the focal length of the first lens element 110 is f1, and the focal length of the second lens element 120 is f2, the following condition is satisfied: f2/f1=−0.16.

When a maximum image height of the optical imaging lens system is ImgH, the following condition is satisfied: ImgH=6.01 [mm].

When an axial distance between the object-side surface 111 of the first lens element 110 and the image surface 195 is TL, the following condition is satisfied: TL=9.01 [mm].

When the axial distance between the object-side surface 111 of the first lens element 110 and the image surface 195 is TL, and the maximum image height of the optical imaging lens system is ImgH, the following condition is satisfied: TL/ImgH=1.50.

When the axial distance between the object-side surface 111 of the first lens element 110 and the image surface 195 is TL, and the focal length of the optical imaging lens system is f, the following condition is satisfied: TL/f=1.44.

When the axial distance between the object-side surface 111 of the first lens element 110 and the image surface 195 is TL, and a maximum effective radius of the object-side surface 111 of the first lens element 110 is Y11, the following condition is satisfied: TL/Y11=3.09.

When the axial distance between the object-side surface 111 of the first lens element 110 and the image surface 195 is TL, and an entrance pupil diameter of the optical imaging lens system is EPD, the following condition is satisfied: TL/EPD=2.40.

When an axial distance between the aperture stop 100 and the image surface 195 is SL, and the axial distance between the object-side surface 111 of the first lens element 110 and the image surface 195 is TL, the following condition is satisfied: SL/TL=0.80.

When the entrance pupil diameter of the optical imaging lens system is EPD, and the maximum image height of the optical imaging lens system is ImgH, the following condition is satisfied: EPD/ImgH=0.63.

When the focal length of the optical imaging lens system is f, and the maximum image height of the optical imaging lens system is ImgH, the following condition is satisfied: f/ImgH=1.04.

When an axial distance between the image-side surface 182 of the eighth lens element 180 and the image surface 195 is BL, and the maximum image height of the optical imaging lens system is ImgH, the following condition is satisfied: BL/ImgH=0.18.

When a vertical distance between a non-axial critical point on the object-side surface 171 of the seventh lens element 170 and the optical axis is Yc71, and a vertical distance between a non-axial critical point on the image-side surface 172 of the seventh lens element 170 and the optical axis is Yc72, the following condition is satisfied: Yc71/Yc72=0.61.

When the focal length of the optical imaging lens system is f, and a vertical distance between a non-axial critical point on the image-side surface 182 of the eighth lens element 180 and the optical axis is Yc82, the following condition is satisfied: f/Yc82=2.59.

When the Abbe number of the first lens element 110 is V1, the Abbe number of the second lens element 120 is V2, the Abbe number of the third lens element 130 is V3, the Abbe number of the fourth lens element 140 is V4, the Abbe number of the fifth lens element 150 is V5, the Abbe number of the sixth lens element 160 is V6, the Abbe number of the seventh lens element 170 is V7, the Abbe number of the eighth lens element 180 is V8, the refractive index of the first lens element 110 is N1, the refractive index of the second lens element 120 is N2, the refractive index of the third lens element 130 is N3, the refractive index of the fourth lens element 140 is N4, the refractive index of the fifth lens element 150 is N5, the refractive index of the sixth lens element 160 is N6, the refractive index of the seventh lens element 170 is N7, and the refractive index of the eighth lens element 180 is N8, the following conditions are satisfied: V1/N1=36.30; V2/N2=36.30; V3/N3=9.71; V4/N4=11.65; V5/N5=36.26; V6/N6=28.57; V7/N7=36.26; and V8/N8=36.48.

The detailed optical data of the 1st embodiment are shown in Table 1 and the aspheric surface data are shown in Table 2 below.

TABLE 1

1st Embodiment
f = 6.24 mm, Fno = 1.66, HFOV = 43.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 68.042 | (ASP) | 0.593 | Plastic | 1.545 | 56.1 | −36.67 |
| 2 | | 15.399 | (ASP) | 0.282 | | | | |
| 3 | Lens 2 | 3.400 | (ASP) | 0.935 | Plastic | 1.545 | 56.1 | 6.03 |
| 4 | | −89.116 | (ASP) | −0.040 | | | | |
| 5 | Ape. Stop | Plano | | 0.120 | | | | |
| 6 | Lens 3 | 3.702 | (ASP) | 0.300 | Plastic | 1.700 | 16.5 | −18.23 |
| 7 | | 2.774 | (ASP) | 0.674 | | | | |
| 8 | Lens 4 | 10.789 | (ASP) | 0.400 | Plastic | 1.669 | 19.5 | −35.45 |
| 9 | | 7.305 | (ASP) | 0.100 | | | | |
| 10 | Lens 5 | 12.698 | (ASP) | 0.805 | Plastic | 1.544 | 56.0 | 11.94 |
| 11 | | −13.008 | (ASP) | 0.680 | | | | |
| 12 | Lens 6 | −21.398 | (ASP) | 0.450 | Plastic | 1.562 | 44.6 | −33.76 |
| 13 | | 168.255 | (ASP) | 0.109 | | | | |
| 14 | Lens 7 | 2.857 | (ASP) | 0.700 | Plastic | 1.544 | 56.0 | 11.24 |
| 15 | | 4.897 | (ASP) | 1.250 | | | | |
| 16 | Lens 8 | 4.013 | (ASP) | 0.548 | Plastic | 1.534 | 56.0 | −7.51 |
| 17 | | 1.911 | (ASP) | 0.600 | | | | |
| 18 | Filter | Plano | | 0.210 | Glass | 1.517 | 64.2 | — |
| 19 | | Plano | | 0.293 | | | | |
| 20 | Image | Plano | | — | | | | |

Note:
Reference wavelength is 587.6 nm (d-line).

TABLE 2

Aspheric Coefficients

| Surface # | 1 | 2 | 3 | 4 | 6 | 7 |
|---|---|---|---|---|---|---|
| k = | −1.0000E+00 | −5.2583E+01 | −1.8965E−01 | −7.2946E+01 | −1.4020E+01 | −5.2511E+00 |
| A4 = | −5.0774E−03 | −7.5221E−03 | −3.5874E−03 | 8.2367E−04 | 1.1052E−02 | 3.2459E−03 |
| A6 = | 1.0729E−03 | 2.5226E−03 | 8.4432E−04 | −3.4245E−03 | −8.9107E−03 | 1.5919E−03 |
| A8 = | 4.4386E−05 | 2.2874E−04 | −1.3194E−04 | 1.8186E−03 | 5.3012E−03 | −6.3353E−04 |
| A10 = | −3.1910E−05 | −1.8614E−04 | 3.3068E−05 | −5.3700E−04 | −1.7560E−03 | 6.4713E−04 |
| A12 = | 4.4469E−06 | 4.1932E−05 | −7.1889E−06 | 7.6882E−05 | 3.4314E−04 | −2.6297E−04 |
| A14 = | −2.8978E−07 | −4.4413E−06 | 5.1176E−07 | −2.5658E−06 | −3.8909E−05 | 4.8558E−05 |
| A16 = | 7.3357E−09 | 1.9387E−07 | — | −3.2554E−07 | 2.0154E−06 | −3.3606E−06 |

| Surface # | 8 | 9 | 10 | 11 | 12 | 13 |
|---|---|---|---|---|---|---|
| k = | −1.6024E+01 | −7.8497E+00 | −3.7050E+01 | −6.5034E+01 | 3.8965E+01 | −1.0000E+00 |
| A4 = | −1.5205E−02 | −1.6631E−02 | −3.1077E−03 | −3.3828E−03 | 1.9913E−02 | −1.9074E−02 |
| A6 = | 4.5595E−03 | 2.9121E−03 | −1.9817E−03 | −3.5062E−03 | −1.4092E−02 | −1.2785E−03 |
| A8 = | −2.5479E−03 | −6.6559E−04 | 1.6727E−03 | 1.4511E−03 | 4.9002E−03 | 2.4389E−03 |
| A10 = | 8.1525E−04 | 3.1189E−05 | −4.8051E−04 | −2.7767E−04 | −1.3458E−03 | −1.1938E−03 |
| A12 = | −1.2270E−04 | 1.7159E−05 | 6.1031E−05 | 4.3725E−05 | 2.3720E−04 | 2.9672E−04 |
| A14 = | 8.5457E−06 | −1.3180E−06 | −2.7097E−06 | −6.8399E−06 | −2.2749E−05 | −4.0569E−05 |
| A16 = | — | — | — | 4.8823E−07 | 8.7185E−07 | 2.9421E−06 |
| A18 = | — | — | — | — | — | −8.8472E−08 |

TABLE 2-continued

| Aspheric Coefficients | | | | |
|---|---|---|---|---|
| Surface # | 14 | 15 | 16 | 17 |
| k = | −6.8686E+00 | −1.1745E−01 | −1.9993E+01 | −4.8087E+00 |
| A4 = | 1.4754E−03 | 1.2273E−02 | −4.7649E−02 | −2.9593E−02 |
| A6 = | −5.3216E−03 | −7.1010E−03 | 7.0271E−03 | 6.1991E−03 |
| A8 = | 1.6533E−03 | 1.2416E−03 | −4.5188E−04 | −9.6441E−04 |
| A10 = | −5.2215E−04 | −1.2850E−04 | 1.0731E−05 | 1.0779E−04 |
| A12 = | 1.1012E−04 | 8.4530E−06 | 3.0777E−07 | −8.4131E−06 |
| A14 = | −1.3531E−05 | −3.4679E−07 | −2.6781E−08 | 4.3073E−07 |
| A16 = | 8.7472E−07 | 8.0541E−09 | 6.6382E−10 | −1.3489E−08 |
| A18 = | −2.2739E−08 | −8.0432E−11 | −5.9681E−12 | 2.3263E−10 |
| A20 = | — | — | — | −1.6901E−12 |

In Table 1, the curvature radius, the thickness and the focal length are shown in millimeters (mm). Surface numbers 0-20 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
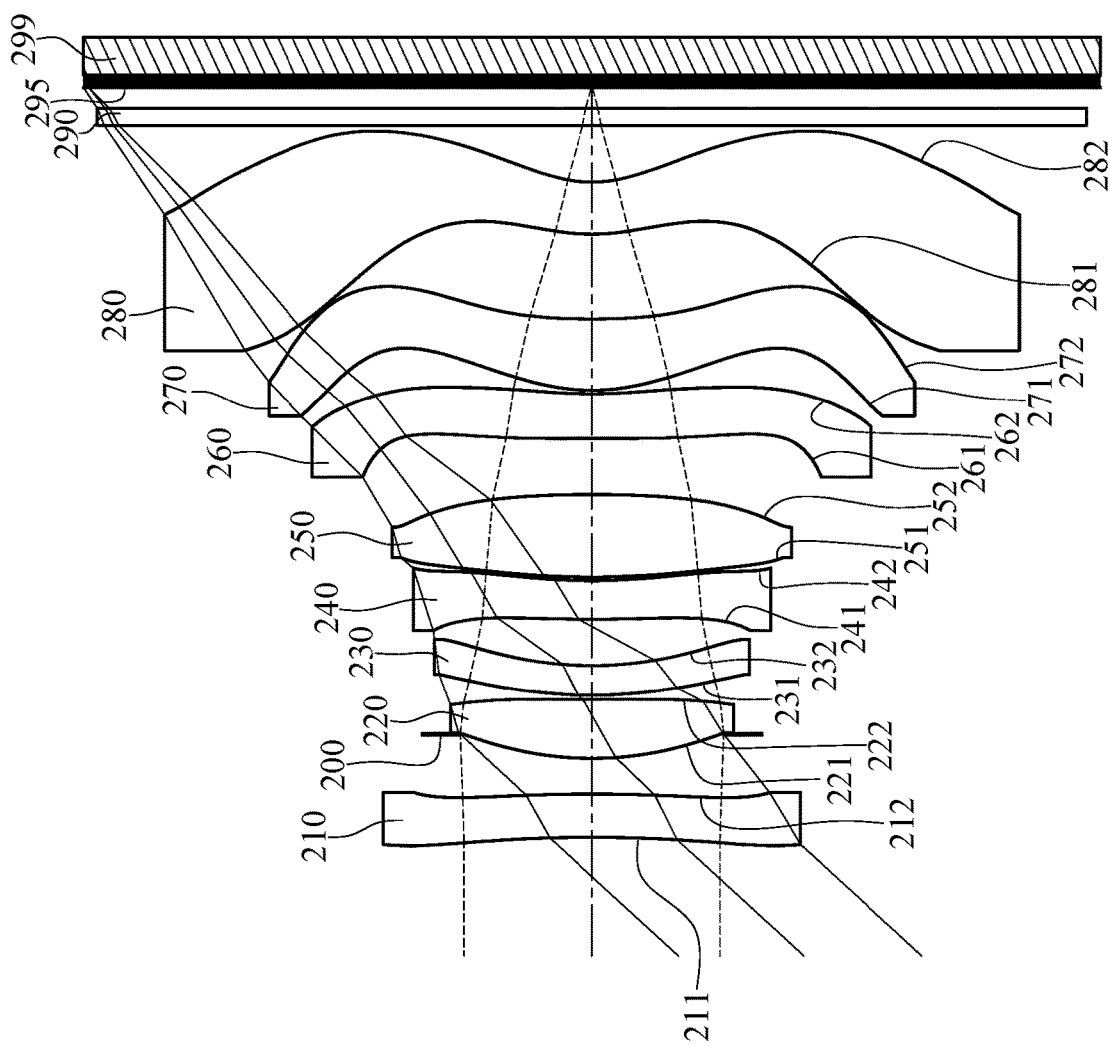
FIG. 3 is a schematic view of an image capturing unit according to the 2nd embodiment of the present disclosure.
Figure 4:
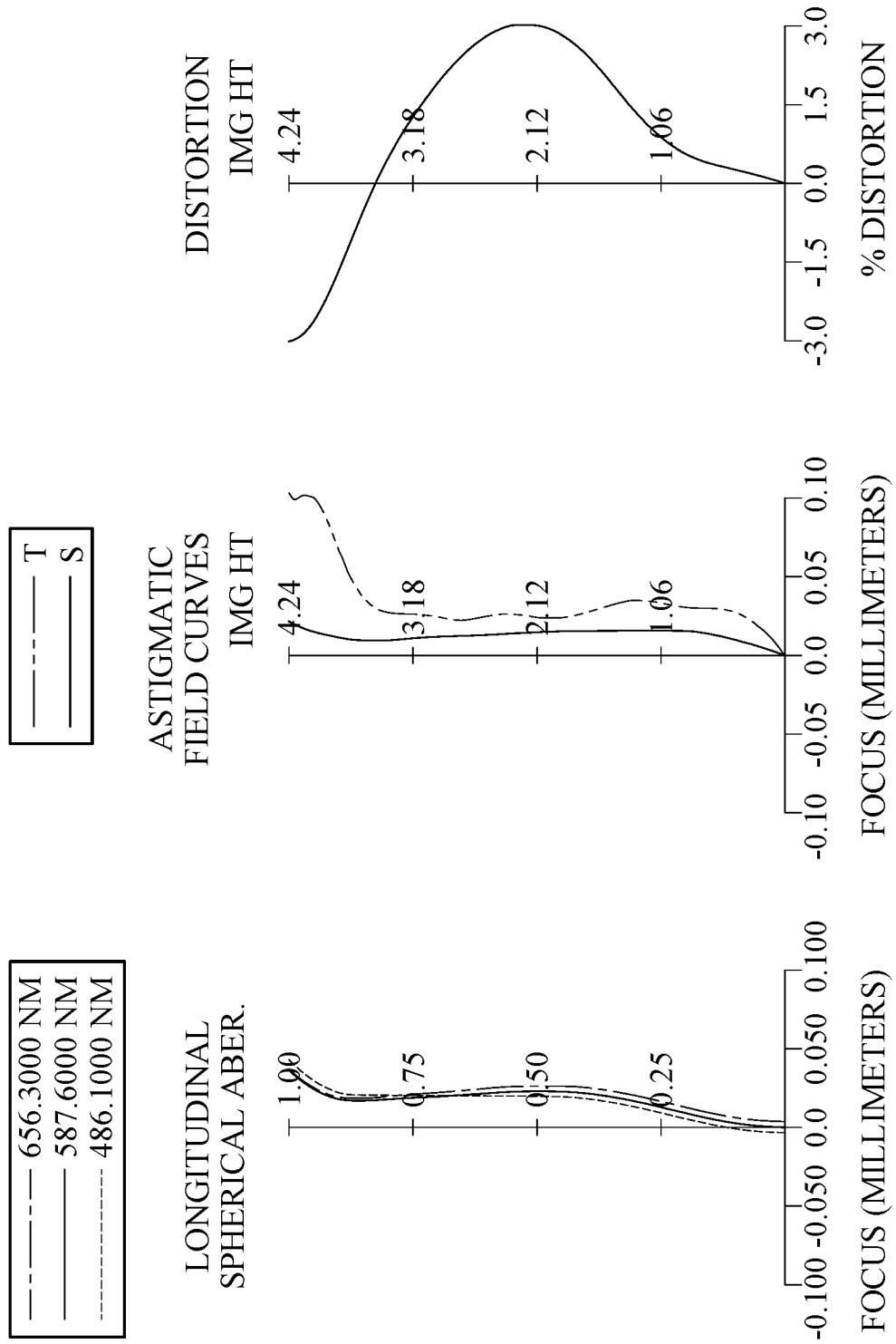
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens system (its reference numeral is omitted) of the present disclosure and an image sensor 299. The optical imaging lens system includes, in order from an object side to an image side along an optical path, a first lens element 210, an aperture stop 200, a second lens element 220, a third lens element 230, a fourth lens element 240, a fifth lens element 250, a sixth lens element 260, a seventh lens element 270, an eighth lens element 280, a filter 290 and an image surface 295. The optical imaging lens system includes eight lens elements (210, 220, 230, 240, 250, 260, 270 and 280) with no additional lens element disposed between each of the adjacent eight lens elements.

The first lens element 210 with negative refractive power has an object-side surface 211 being concave in a paraxial region thereof and an image-side surface 212 being convex in a paraxial region thereof. The first lens element 210 is made of plastic material and has the object-side surface 211 and the image-side surface 212 being both aspheric. The object-side surface 211 of the first lens element 210 has one inflection point. The image-side surface 212 of the first lens element 210 has one inflection point.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric.

The seventh lens element 270 with positive refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has at least one inflection point. The image-side surface 272 of the seventh lens element 270 has at least one inflection point. The object-side surface 271 of the seventh lens element 270 has at least one critical point in an off-axis region thereof. The image-side surface 272 of the seventh lens element 270 has at least one convex critical point in an off-axis region thereof.

The eighth lens element 280 with negative refractive power has an object-side surface 281 being convex in a paraxial region thereof and an image-side surface 282 being concave in a paraxial region thereof. The eighth lens element 280 is made of plastic material and has the object-side surface 281 and the image-side surface 282 being both aspheric. The image-side surface 282 of the eighth lens element 280 has at least one critical point in an off-axis region thereof.

The filter 290 is made of glass material and located between the eighth lens element 280 and the image surface 295, and will not affect the focal length of the optical imaging lens system. The image sensor 299 is disposed on or near the image surface 295 of the optical imaging lens system.

In this embodiment, the eight lens elements of the optical imaging lens system are all made of plastic material, an axial distance between the seventh lens element 270 and the eighth lens element 280 is a maximum among axial distances between each of all adjacent lens elements of the optical imaging lens system, and a maximum effective radius of the object-side surface 221 of the second lens element 220 is a minimum among maximum effective radii of all lens surfaces of the optical imaging lens system.

The detailed optical data of the 2nd embodiment are shown in Table 3 and the aspheric surface data are shown in Table 4 below.

TABLE 3

2nd Embodiment
f = 3.99 mm, Fno = 1.85, HFOV = 47.5 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −12.105 | (ASP) | 0.363 | Plastic | 1.566 | 37.4 | −376.62 |
| 2 |  | −12.973 | (ASP) | 0.503 |  |  |  |  |
| 3 | Ape. Stop | Plano |  | −0.203 |  |  |  |  |
| 4 | Lens 2 | 2.929 | (ASP) | 0.497 | Plastic | 1.545 | 56.1 | 5.52 |
| 5 |  | 104.089 | (ASP) | 0.035 |  |  |  |  |
| 6 | Lens 3 | 3.915 | (ASP) | 0.250 | Plastic | 1.650 | 21.5 | −22.60 |
| 7 |  | 3.014 | (ASP) | 0.392 |  |  |  |  |
| 8 | Lens 4 | 9.486 | (ASP) | 0.325 | Plastic | 1.669 | 19.5 | −12.55 |
| 9 |  | 4.392 | (ASP) | 0.030 |  |  |  |  |
| 10 | Lens 5 | 5.940 | (ASP) | 0.695 | Plastic | 1.544 | 56.0 | 6.94 |
| 11 |  | −9.926 | (ASP) | 0.470 |  |  |  |  |
| 12 | Lens 6 | 487.057 | (ASP) | 0.380 | Plastic | 1.566 | 37.4 | −6.72 |
| 13 |  | 3.775 | (ASP) | 0.030 |  |  |  |  |
| 14 | Lens 7 | 1.669 | (ASP) | 0.600 | Plastic | 1.544 | 56.0 | 3.90 |
| 15 |  | 6.858 | (ASP) | 0.714 |  |  |  |  |
| 16 | Lens 8 | 1.703 | (ASP) | 0.435 | Plastic | 1.566 | 37.4 | −5.53 |
| 17 |  | 1.001 | (ASP) | 0.478 |  |  |  |  |
| 18 | Filter | Plano |  | 0.150 | Glass | 1.517 | 64.2 | — |
| 19 |  | Plano |  | 0.174 |  |  |  |  |
| 20 | Image | Plano |  | — |  |  |  |  |

Note:
Reference wavelength is 587.6 nm (d-line).

TABLE 4

Aspheric Coefficients

| Surface # | 1 | 2 | 4 | 5 | 6 | 7 |
|---|---|---|---|---|---|---|
| k = | 1.3139E+01 | −8.0000E+01 | 1.3664E−01 | −8.0000E+01 | −2.2218E+01 | −4.0228E+00 |
| A4 = | −1.6403E−03 | 3.4196E−03 | 1.9848E−03 | −1.7314E−02 | 3.6332E−02 | 9.3343E−03 |
| A6 = | 2.9776E−03 | 2.0031E−03 | −4.0186E−03 | −2.5107E−02 | −4.6814E−02 | −4.2128E−03 |
| A8 = | 2.4022E−05 | 1.3480E−03 | −4.6790E−03 | 2.3016E−02 | 3.9357E−02 | −1.0473E−03 |
| A10 = | 2.1356E−05 | 1.0320E−04 | 2.2304E−03 | −1.1856E−02 | −1.7799E−02 | 3.4205E−03 |
| A12 = | 1.1824E−05 | −9.8802E−05 | 8.3065E−04 | 4.3107E−03 | 3.6810E−03 | −3.9823E−03 |
| A14 = | −5.2113E−06 | 5.5861E−05 | −3.2332E−04 | −7.5383E−04 | −3.4396E−04 | 8.7900E−04 |
| A16 = | — | — | — | 1.2251E−04 | — | −2.0171E−04 |

| Surface # | 8 | 9 | 10 | 11 | 12 | 13 |
|---|---|---|---|---|---|---|
| k = | −8.0000E+01 | −2.2529E+00 | −3.1783E+01 | −8.0000E+01 | 5.0000E+01 | −1.0000E+00 |
| A4 = | −4.5582E−02 | −7.4893E−02 | −3.4711E−02 | −1.4709E−02 | 3.7538E−02 | −1.5503E−01 |
| A6 = | 2.1744E−02 | 7.1520E−02 | 6.4653E−02 | −2.2664E−02 | −1.9212E−02 | 1.2150E−01 |
| A8 = | −4.5635E−02 | −6.0955E−02 | −5.4604E−02 | 2.6772E−02 | 6.4956E−03 | −6.2017E−02 |
| A10 = | 3.7332E−02 | 2.4525E−02 | 2.1121E−02 | −2.3461E−02 | −3.8250E−03 | 1.9530E−02 |
| A12 = | −1.4735E−02 | −3.6442E−03 | −3.4220E−03 | 1.3348E−02 | 1.2210E−03 | −4.0118E−03 |
| A14 = | 1.9878E−03 | 1.4462E−04 | 1.8691E−04 | −4.2188E−03 | −1.7349E−04 | 5.3962E−04 |
| A16 = | — | — | — | 5.5285E−04 | 2.6243E−06 | −4.3316E−05 |
| A18 = | — | — | — | — | — | 1.5408E−06 |

| Surface # | 14 | 15 | 16 | 17 |
|---|---|---|---|---|
| k = | −5.7016E+00 | −1.7558E−01 | −9.8536E+00 | −4.0664E+00 |
| A4 = | 7.3163E−04 | 9.6457E−02 | −1.0003E−01 | −6.4080E−02 |
| A6 = | 5.3721E−03 | −6.1180E−02 | 1.1219E−02 | 1.8500E−02 |
| A8 = | −1.0933E−02 | 1.6504E−02 | 5.7029E−04 | −3.2690E−03 |
| A10 = | 3.6448E−03 | −2.8256E−03 | −2.7127E−04 | 2.0462E−04 |
| A12 = | −6.1091E−04 | 3.0977E−04 | 3.8792E−05 | 2.0585E−05 |

TABLE 4-continued

| Aspheric Coefficients | | | |
|---|---|---|---|
| A14 = | 5.6399E−05 | −2.1101E−05 | −2.9421E−06 | −4.1306E−06 |
| A16 = | −2.1999E−06 | 7.1221E−07 | 8.8644E−08 | 2.4358E−07 |
| A18 = | — | — | — | −5.0282E−09 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.99 | f/f1 | −0.01 |
| Fno | 1.85 | f/f2 | 0.72 |
| HFOV [deg.] | 47.5 | f/f4 | −0.32 |
| V6 | 37.4 | f2/f1 | −0.01 |
| V3/V4 | 1.1 | ImgH [mm] | 4.23 |
| V3 + V4 | 40.9 | TL [mm] | 6.32 |
| Vdmin | 19.5 | TL/ImgH | 1.49 |
| Nmax | 1.669 | TL/f | 1.58 |
| (Vi/Ni)min | 11.66 | TL/Y11 | 3.60 |
| CT1/CT3 | 1.45 | TL/EPD | 2.93 |
| CT5/CT6 | 1.83 | SL/TL | 0.86 |
| T34/CT3 | 1.57 | EPD/ImgH | 0.51 |
| T45/T34 | 0.08 | f/ImgH | 0.94 |
| T45/CT4 | 0.09 | BL/ImgH | 0.19 |
| T67/T78 | 0.04 | Yc71/Yc72 | 0.91 |
| T78/CT7 | 1.19 | f/Yc82 | 2.18 |
| (T23 + T45 + T67)/(T34 + T78) | 0.09 | V1/N1 | 23.91 |
| f/R15 | 2.34 | V2/N2 | 36.30 |
| f/R16 | 3.98 | V3/N3 | 13.01 |
| |f/R1| + |f/R2| | 0.64 | V4/N4 | 11.66 |
| f/R1 − f/R12 | −1.39 | V5/N5 | 36.26 |
| (R3 + R4)/(R3 − R4) | −1.06 | V6/N6 | 23.91 |
| (R5 − R6)/(R5 + R6) | 0.13 | V7/N7 | 36.26 |
| (R13 − R14)/(R13 + R14) | −0.61 | V8/N8 | 23.91 |
| (R15 + R16)/(R15 − R16) | 3.86 | — | — |

3rd Embodiment

Figure 5:
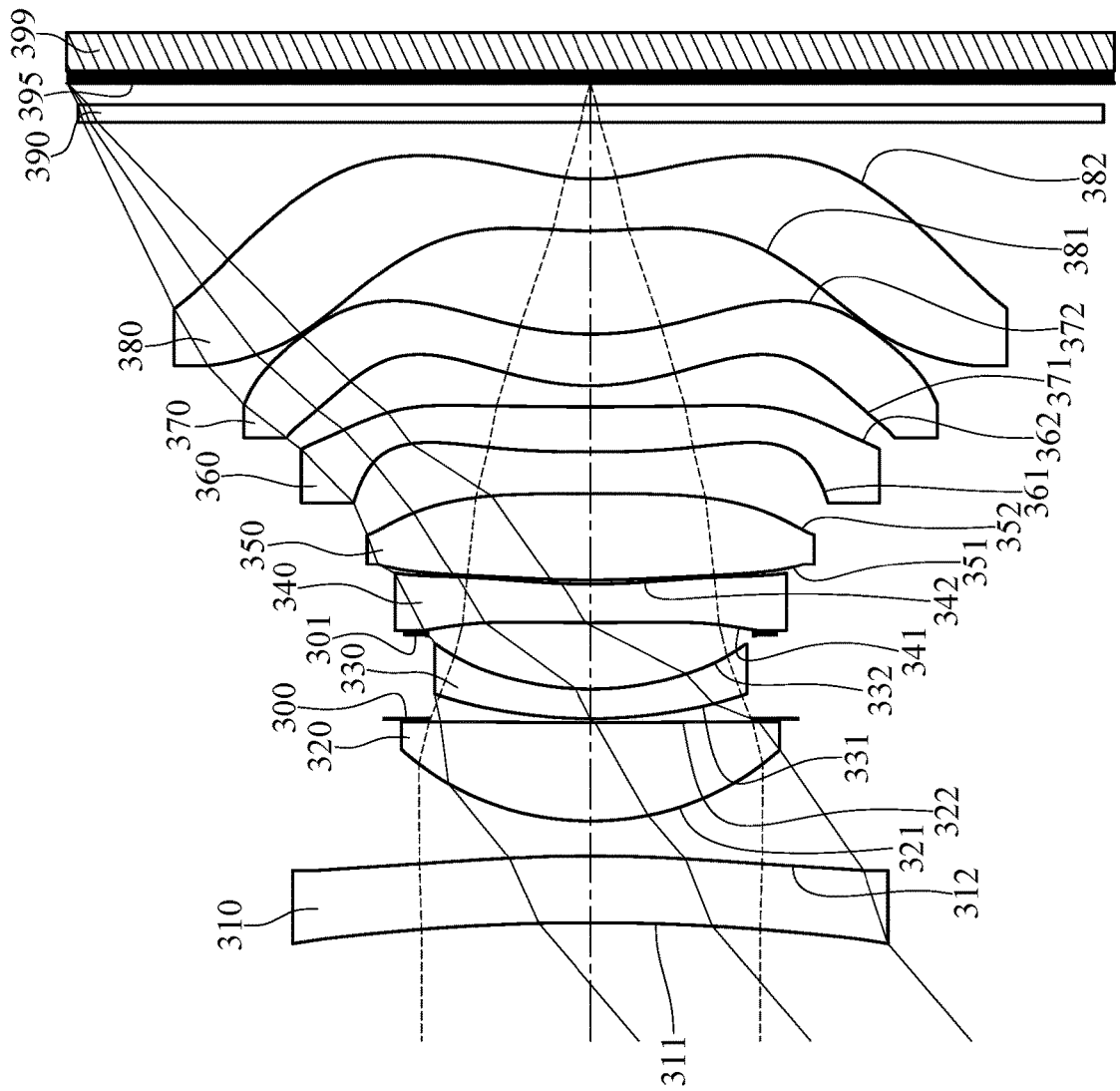
FIG. 5 is a schematic view of an image capturing unit according to the 3rd embodiment of the present disclosure.
Figure 6:
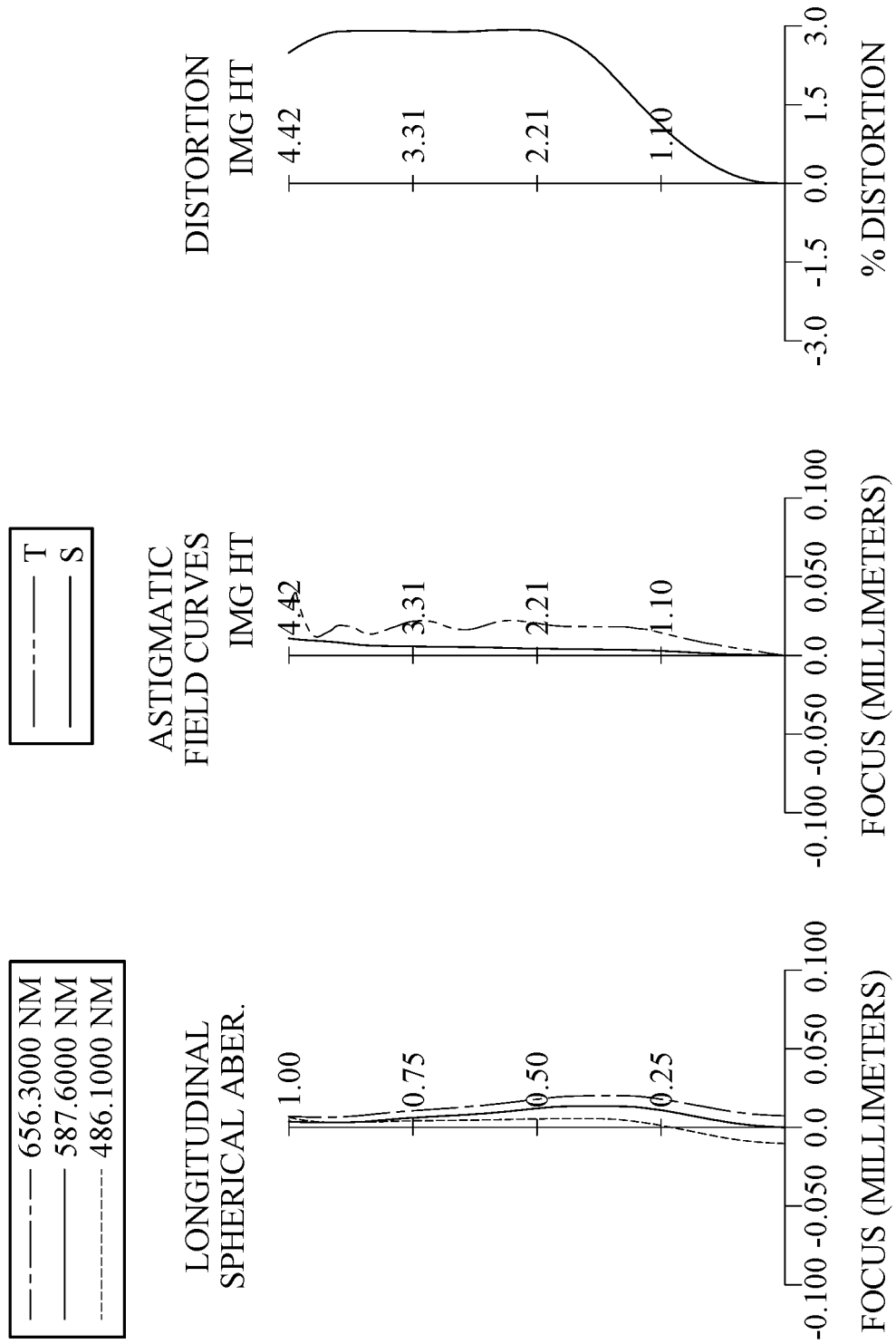
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens system (its reference numeral is omitted) of the present disclosure and an image sensor 399. The optical imaging lens system includes, in order from an object side to an image side along an optical path, a first lens element 310, a second lens element 320, an aperture stop 300, a third lens element 330, a stop 301, a fourth lens element 340, a fifth lens element 350, a sixth lens element 360, a seventh lens element 370, an eighth lens element 380, a filter 390 and an image surface 395. The optical imaging lens system includes eight lens elements (310, 320, 330, 340, 350, 360, 370 and 380) with no additional lens element disposed between each of the adjacent eight lens elements.

The first lens element 310 with positive refractive power has an object-side surface 311 being concave in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has one inflection point. The image-side surface 312 of the first lens element 310 has three inflection points.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric.

The seventh lens element 370 with positive refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has at least one inflection point. The image-side surface 372 of the seventh lens element 370 has at least one inflection point. The object-side surface 371 of the seventh lens element 370 has at least one critical point in an off-axis region thereof. The image-side surface 372 of the seventh lens element 370 has at least one convex critical point in an off-axis region thereof.

The eighth lens element 380 with negative refractive power has an object-side surface 381 being convex in a paraxial region thereof and an image-side surface 382 being concave in a paraxial region thereof. The eighth lens element 380 is made of plastic material and has the object-side surface 381 and the image-side surface 382 being both aspheric. The image-side surface 382 of the eighth lens element 380 has at least one critical point in an off-axis region thereof.

The filter 390 is made of glass material and located between the eighth lens element 380 and the image surface 395, and will not affect the focal length of the optical imaging lens system. The image sensor 399 is disposed on or near the image surface 395 of the optical imaging lens system.

In this embodiment, the eight lens elements of the optical imaging lens system are all made of plastic material, an absolute value of a focal length of the second lens element 320 is a minimum among absolute values of focal lengths of each of all lens elements of the optical imaging lens system, an axial distance between the seventh lens element 370 and the eighth lens element 380 is a maximum among axial distances between each of all adjacent lens elements of the optical imaging lens system, and a maximum effective radius of the image-side surface 332 of the third lens element 330 is a minimum among maximum effective radii of all lens surfaces of the optical imaging lens system.

The detailed optical data of the 3rd embodiment are shown in Table 5 and the aspheric surface data are shown in Table 6 below.

TABLE 5

3rd Embodiment
f = 5.03 mm, Fno = 1.76, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −19.263 | (ASP) | 0.562 | Plastic | 1.634 | 23.8 | 55.18 |
| 2 | | −12.564 | (ASP) | 0.300 | | | | |
| 3 | Lens 2 | 2.513 | (ASP) | 0.828 | Plastic | 1.545 | 56.1 | 4.87 |
| 4 | | 42.625 | (ASP) | 0.034 | | | | |
| 5 | Ape. Stop | Plano | | 0.000 | | | | |
| 6 | Lens 3 | 4.101 | (ASP) | 0.250 | Plastic | 1.669 | 19.5 | −11.24 |
| 7 | | 2.589 | (ASP) | 0.465 | | | | |
| 8 | Stop | Plano | | 0.096 | | | | |
| 9 | Lens 4 | 17.489 | (ASP) | 0.325 | Plastic | 1.660 | 20.4 | −11.86 |
| 10 | | 5.369 | (ASP) | 0.034 | | | | |
| 11 | Lens 5 | 8.535 | (ASP) | 0.736 | Plastic | 1.566 | 37.4 | 12.70 |
| 12 | | −44.235 | (ASP) | 0.351 | | | | |
| 13 | Lens 6 | 12.038 | (ASP) | 0.380 | Plastic | 1.566 | 37.4 | 45.88 |
| 14 | | 22.180 | (ASP) | 0.177 | | | | |
| 15 | Lens 7 | 1.994 | (ASP) | 0.436 | Plastic | 1.544 | 56.0 | 11.42 |
| 16 | | 2.710 | (ASP) | 0.878 | | | | |
| 17 | Lens 8 | 4.166 | (ASP) | 0.435 | Plastic | 1.534 | 55.9 | −5.60 |
| 18 | | 1.677 | (ASP) | 0.478 | | | | |
| 19 | Filter | Plano | | 0.150 | Glass | 1.517 | 64.2 | — |
| 20 | | Plano | | 0.183 | | | | |
| 21 | Image | Plano | | — | | | | |

Note:
Reference wavelength is 587.6 nm (d-line).
An effective radius of the stop 301 (Surface 8) is 1.380 mm.

TABLE 6

Aspheric Coefficients

| Surface # | 1 | 2 | 3 | 4 | 6 | 7 |
|---|---|---|---|---|---|---|
| k = | 4.2416E+01 | −4.3492E+01 | 2.4889E−01 | 4.7188E+01 | −2.4958E+01 | −2.7633E+00 |
| A4 = | −2.0584E−03 | 4.2534E−04 | 2.8292E−03 | −1.6804E−03 | 4.0829E−02 | 1.5252E−02 |
| A6 = | 1.0208E−03 | 3.8024E−04 | 7.5927E−04 | −1.7038E−02 | −4.3825E−02 | 1.0965E−03 |
| A8 = | −5.5961E−05 | 1.0166E−04 | −2.3785E−03 | 2.2036E−02 | 4.0106E−02 | 1.4815E−03 |
| A10 = | −9.5392E−06 | −1.5763E−05 | 1.2685E−03 | −1.2359E−02 | −1.7841E−02 | 5.1784E−03 |
| A12 = | 2.0358E−07 | −7.9989E−06 | −2.2196E−04 | 3.4990E−03 | 3.6044E−03 | −3.8451E−03 |
| A14 = | 1.6629E−08 | 1.1589E−06 | −1.1399E−06 | −4.1927E−04 | −2.5679E−04 | 9.7926E−04 |
| A16 = | 1.1465E−08 | — | — | — | — | −5.1374E−05 |

| Surface # | 9 | 10 | 11 | 12 | 13 | 14 |
|---|---|---|---|---|---|---|
| k = | −8.0000E+01 | −2.7262E+00 | −2.3113E+01 | 2.7903E+01 | 1.7120E+01 | −1.0000E+00 |
| A4 = | −4.1986E−02 | −5.5230E−02 | −3.6205E−02 | −2.4908E−02 | 2.3506E−02 | −3.7205E−02 |
| A6 = | 2.2567E−02 | 3.4286E−02 | 2.8800E−02 | −5.7304E−03 | −7.0350E−03 | 5.0484E−02 |
| A8 = | −3.5126E−02 | −2.7272E−02 | −1.5564E−02 | 8.8065E−04 | −8.9709E−03 | −3.3817E−02 |
| A10 = | 2.7653E−02 | 1.3919E−02 | 5.9497E−03 | 2.3892E−03 | 5.6494E−03 | 1.0993E−02 |
| A12 = | −1.0057E−02 | −3.2685E−03 | −1.2467E−03 | −1.2348E−03 | −1.9869E−03 | −2.0694E−03 |
| A14 = | 1.4888E−03 | 2.8060E−04 | 1.1037E−04 | 1.7532E−04 | 4.1377E−04 | 2.3799E−04 |
| A16 = | — | — | — | — | −4.0908E−05 | −1.5520E−05 |
| A18 = | — | — | — | — | — | 4.2449E−07 |

TABLE 6-continued

| Aspheric Coefficients | | | | |
|---|---|---|---|---|
| Surface # | 15 | 16 | 17 | 18 |
| k = | −6.1434E+00 | −1.4324E+00 | −3.9479E+01 | −7.2413E+00 |
| A4 = | 4.7659E−03 | −5.8620E−04 | −1.3176E−01 | −7.2164E−02 |
| A6 = | −2.1144E−02 | −2.3873E−02 | 5.1548E−02 | 2.7376E−02 |
| A8 = | 7.7633E−03 | 1.0407E−02 | −1.5596E−02 | −7.7907E−03 |
| A10 = | −2.8057E−03 | −3.3918E−03 | 3.0735E−03 | 1.3396E−03 |
| A12 = | 6.0739E−04 | 8.1637E−04 | −3.4550E−04 | −1.4173E−04 |
| A14 = | −5.9873E−05 | −1.3253E−04 | 2.0415E−05 | 9.7880E−06 |
| A16 = | 2.0794E−06 | 1.3460E−05 | −5.1886E−07 | −4.7664E−07 |
| A18 = | — | −7.6081E−07 | 1.9320E−09 | 1.6503E−08 |
| A20 = | — | 1.7926E−08 | — | −3.0101E−10 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.03 | f/f1 | 0.09 |
| Fno | 1.76 | f/f2 | 1.03 |
| HFOV [deg.] | 40.5 | f/f4 | −0.42 |
| V6 | 37.4 | f2/f1 | 0.09 |
| V3/V4 | 1.0 | ImgH [mm] | 4.42 |
| V3 + V4 | 39.9 | TL [mm] | 7.10 |
| Vdmin | 19.5 | TL/ImgH | 1.61 |
| Nmax | 1.669 | TL/f | 1.41 |
| (Vi/Ni)min | 11.66 | TL/Y11 | 2.82 |
| CT1/CT3 | 2.25 | TL/EPD | 2.48 |
| CT5/CT6 | 1.94 | SL/TL | 0.76 |
| T34/CT3 | 2.24 | EPD/ImgH | 0.65 |
| T45/T34 | 0.06 | f/ImgH | 1.14 |
| T45/CT4 | 0.10 | BL/ImgH | 0.18 |
| T67/T78 | 0.20 | Yc71/Yc72 | 0.88 |
| T78/CT7 | 2.01 | f/Yc82 | 3.52 |
| (T23 + T45 + T67)/(T34 + T78) | 0.17 | V1/N1 | 14.59 |
| f/R15 | 1.21 | V2/N2 | 36.30 |
| f/R16 | 3.00 | V3/N3 | 11.66 |
| |f/R1| + |f/R2| | 0.66 | V4/N4 | 12.29 |
| f/R1 − f/R12 | −0.49 | V5/N5 | 23.91 |
| (R3 + R4)/(R3 − R4) | −1.13 | V6/N6 | 23.91 |
| (R5 − R6)/(R5 + R6) | 0.23 | V7/N7 | 36.26 |
| (R13 − R14)/(R13 + R14) | −0.15 | V8/N8 | 36.46 |
| (R15 + R16)/(R15 − R16) | 2.35 | — | — |

4th Embodiment

Figure 7:
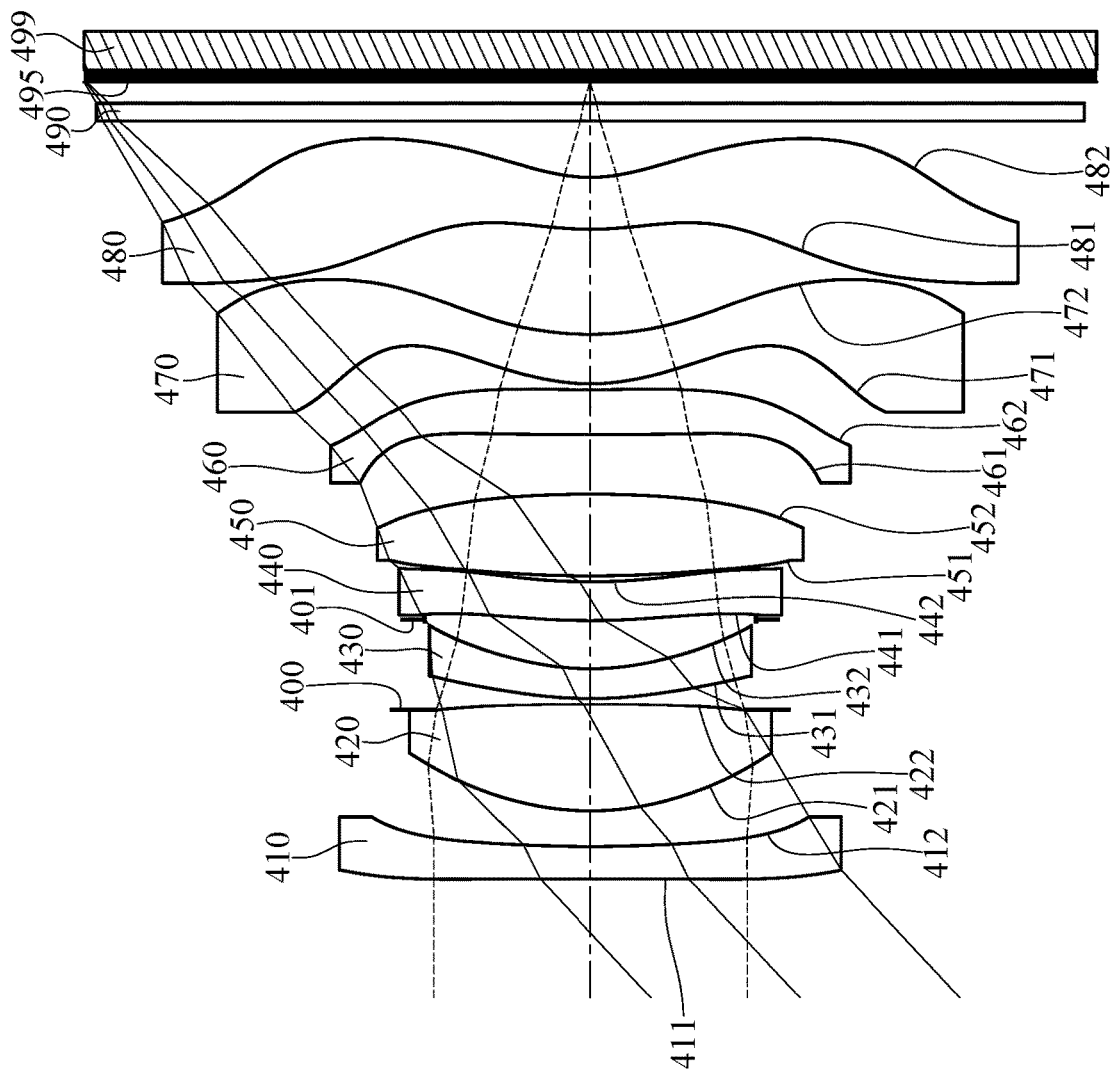
FIG. 7 is a schematic view of an image capturing unit according to the 4th embodiment of the present disclosure.
Figure 8:
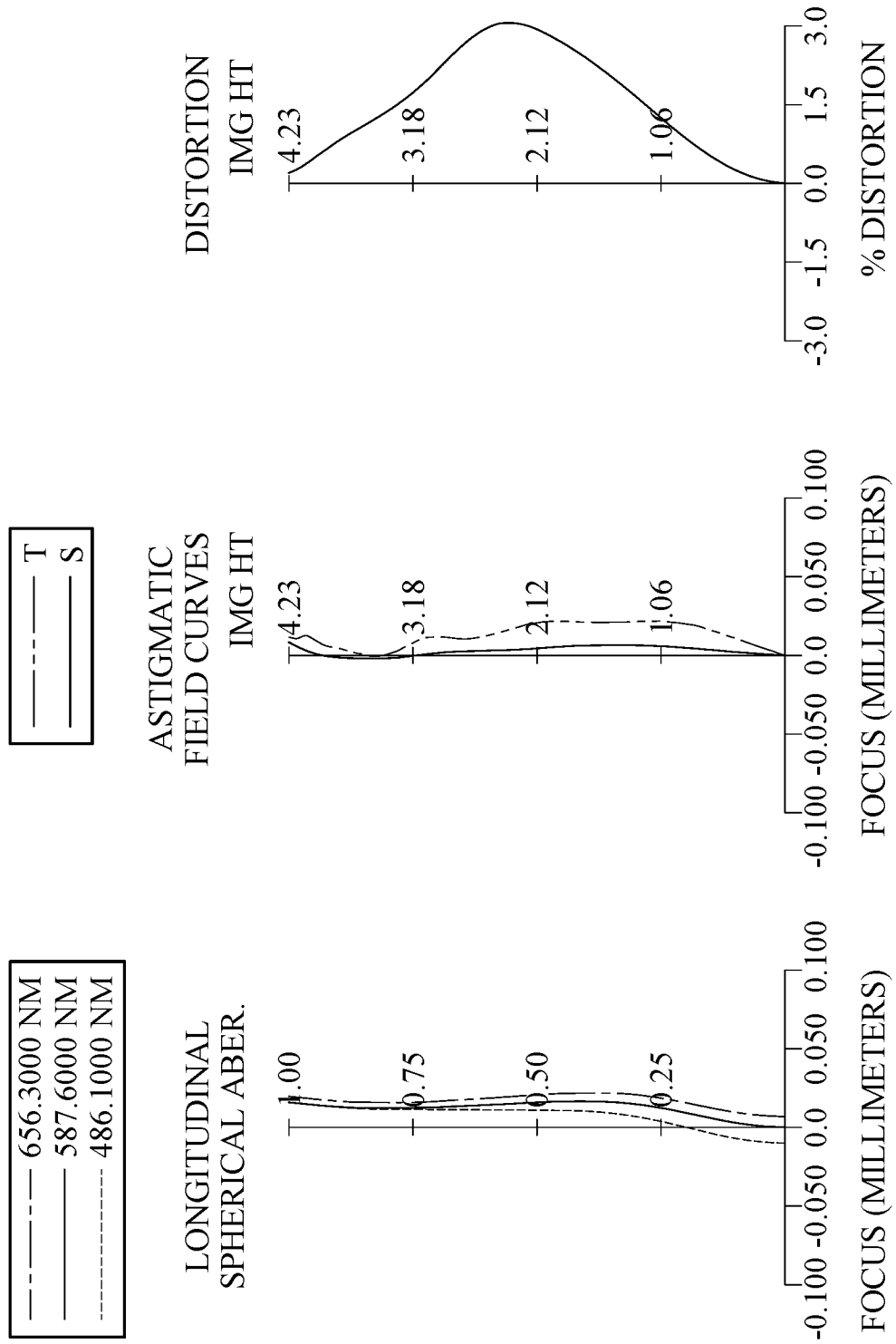
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens system (its reference numeral is omitted) of the present disclosure and an image sensor 499. The optical imaging lens system includes, in order from an object side to an image side along an optical path, a first lens element 410, a second lens element 420, an aperture stop 400, a third lens element 430, a stop 401, a fourth lens element 440, a fifth lens element 450, a sixth lens element 460, a seventh lens element 470, an eighth lens element 480, a filter 490 and an image surface 495. The optical imaging lens system includes eight lens elements (410, 420, 430, 440, 450, 460, 470 and 480) with no additional lens element disposed between each of the adjacent eight lens elements.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has two inflection points.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric.

The seventh lens element 470 with positive refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has at least one inflection point. The image-side surface 472 of the seventh lens element 470 has at least one inflection point. The object-side surface 471 of the seventh lens element 470 has at least one critical point in an off-axis region thereof. The image-side surface 472 of the seventh lens element 470 has at least one convex critical point in an off-axis region thereof.

The eighth lens element 480 with negative refractive power has an object-side surface 481 being convex in a paraxial region thereof and an image-side surface 482 being concave in a paraxial region thereof. The eighth lens element 480 is made of plastic material and has the object-side surface 481 and the image-side surface 482 being both aspheric. The image-side surface 482 of the eighth lens element 480 has at least one critical point in an off-axis region thereof.

The filter 490 is made of glass material and located between the eighth lens element 480 and the image surface 495, and will not affect the focal length of the optical imaging lens system. The image sensor 499 is disposed on or near the image surface 495 of the optical imaging lens system.

In this embodiment, the eight lens elements of the optical imaging lens system are all made of plastic material, an absolute value of a focal length of the second lens element 420 is a minimum among absolute values of focal lengths of each of all lens elements of the optical imaging lens system, an axial distance between the seventh lens element 470 and the eighth lens element 480 is a maximum among axial distances between each of all adjacent lens elements of the optical imaging lens system, and a maximum effective radius of the image-side surface 422 of the second lens element 420 is a minimum among maximum effective radii of all lens surfaces of the optical imaging lens system.

The detailed optical data of the 4th embodiment are shown in Table 7 and the aspheric surface data are shown in Table 8 below.

TABLE 7

4th Embodiment
f = 4.52 mm, Fno = 1.72, HFOV = 43.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 270.847 | (ASP) | 0.270 | Plastic | 1.545 | 56.1 | −20.63 |
| 2 | | 10.791 | (ASP) | 0.300 | | | | |
| 3 | Lens 2 | 2.425 | (ASP) | 0.896 | Plastic | 1.545 | 56.1 | 4.10 |
| 4 | | −24.552 | (ASP) | −0.050 | | | | |
| 5 | Ape. Stop | Plano | | 0.100 | | | | |
| 6 | Lens 3 | 3.459 | (ASP) | 0.250 | Plastic | 1.669 | 19.5 | −10.87 |
| 7 | | 2.276 | (ASP) | 0.412 | | | | |
| 8 | Stop | Plano | | −0.008 | | | | |
| 9 | Lens 4 | 6.037 | (ASP) | 0.325 | Plastic | 1.669 | 19.5 | −45.53 |
| 10 | | 4.930 | (ASP) | 0.050 | | | | |
| 11 | Lens 5 | 12.159 | (ASP) | 0.686 | Plastic | 1.544 | 56.0 | 9.72 |
| 12 | | −9.179 | (ASP) | 0.500 | | | | |
| 13 | Lens 6 | −48.786 | (ASP) | 0.380 | Plastic | 1.562 | 44.6 | −19.31 |
| 14 | | 13.989 | (ASP) | 0.050 | | | | |
| 15 | Lens 7 | 1.794 | (ASP) | 0.416 | Plastic | 1.544 | 56.0 | 7.51 |
| 16 | | 2.937 | (ASP) | 0.880 | | | | |
| 17 | Lens 8 | 2.649 | (ASP) | 0.435 | Plastic | 1.534 | 56.0 | −5.91 |
| 18 | | 1.358 | (ASP) | 0.478 | | | | |
| 19 | Filter | Plano | | 0.150 | Glass | 1.517 | 64.2 | — |
| 20 | | Plano | | 0.176 | | | | |
| 21 | Image | Plano | | — | | | | |

Note:
Reference wavelength is 587.6 nm (d-line).
An effective radius of the stop 401 (Surface 8) is 1.390 mm.

TABLE 8

Aspheric Coefficients

| Surface # | 1 | 2 | 3 | 4 | 6 | 7 |
|---|---|---|---|---|---|---|
| k = | −1.0000E+00 | −4.9486E+01 | −1.9066E−01 | −1.7306E+01 | −2.2233E+01 | −5.3220E+00 |
| A4 = | −1.1987E−02 | −1.4064E−02 | −9.9509E−03 | 2.0167E−03 | 2.7861E−02 | 9.2335E−03 |
| A6 = | 8.4797E−03 | 1.1772E−02 | 4.0436E−03 | −1.9885E−02 | −4.6382E−02 | −1.1788E−03 |
| A8 = | −2.0851E−03 | −4.2160E−04 | −2.0246E−03 | 2.1338E−02 | 4.1514E−02 | 1.8949E−03 |
| A10 = | 3.4272E−04 | −1.5855E−03 | 8.0604E−04 | −1.2409E−02 | −1.7873E−02 | 4.5325E−03 |
| A12 = | −3.7665E−05 | 8.2339E−04 | −2.5650E−04 | 3.5944E−03 | 2.9440E−03 | −4.0087E−03 |
| A14 = | 2.3938E−06 | −1.7744E−04 | 3.2223E−05 | −3.4100E−04 | 4.7843E−05 | 9.8245E−04 |
| A16 = | −8.8851E−08 | 1.5069E−05 | – | −2.6590E−05 | — | −1.2922E−05 |

| Surface # | 9 | 10 | 11 | 12 | 13 | 14 |
|---|---|---|---|---|---|---|
| k = | −1.0730E+01 | −3.7209E+00 | 1.3924E+01 | −8.0000E+01 | −8.0000E+01 | −1.0000E+00 |
| A4 = | −2.0625E−02 | 1.4296E−03 | 2.6404E−02 | −6.0557E−03 | 5.3593E−02 | −7.2899E−02 |
| A6 = | −9.9223E−03 | −4.2875E−02 | −4.4164E−02 | −2.2116E−02 | −6.3221E−02 | 3.4007E−02 |

TABLE 8-continued

| Aspheric Coefficients | | | | | | |
|---|---|---|---|---|---|---|
| A8 = | 1.2862E−02 | 3.8599E−02 | 3.2962E−02 | 2.3944E−02 | 4.1550E−02 | −1.1446E−02 |
| A10 = | −1.1076E−02 | −2.1949E−02 | −1.4716E−02 | −1.6818E−02 | −1.9000E−02 | 1.8374E−03 |
| A12 = | 5.2733E−03 | 6.9383E−03 | 3.6946E−03 | 7.7641E−03 | 4.7873E−03 | −4.3193E−04 |
| A14 = | −9.9572E−04 | −8.5898E−04 | −3.7526E−04 | −2.0173E−03 | −5.7691E−04 | 1.4969E−04 |
| A16 = | — | — | — | 2.1320E−04 | 1.9848E−05 | −2.1485E−05 |
| A18 = | — | — | — | — | — | 8.9359E−07 |

| Surface # | 15 | 16 | 17 | 18 |
|---|---|---|---|---|
| k = | −5.0427E+00 | −3.0137E−01 | −1.3954E+01 | −4.0666E+00 |
| A4 = | 1.5479E−03 | 4.4411E−02 | −1.2086E−01 | −8.5976E−02 |
| A6 = | −3.3854E−03 | −4.4392E−02 | 2.8586E−02 | 3.6180E−02 |
| A8 = | −9.5371E−03 | 1.3295E−02 | −1.1062E−03 | −1.1612E−02 |
| A10 = | 5.4492E−03 | −2.2662E−03 | −6.1053E−04 | 2.7222E−03 |
| A12 = | −1.6533E−03 | 2.3347E−04 | 1.2520E−04 | −4.4407E−04 |
| A14 = | 2.9505E−04 | −1.3951E−05 | −1.1067E−05 | 4.7019E−05 |
| A16 = | −2.7378E−05 | 4.0430E−07 | 4.8507E−07 | −3.0179E−06 |
| A18 = | 1.0036E−06 | −2.9770E−09 | −8.5698E−09 | 1.0592E−07 |
| A20 = | — | — | — | −1.5557E−09 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.52 | f/f1 | −0.22 |
| Fno | 1.72 | f/f2 | 1.10 |
| HFOV [deg.] | 43.0 | f/f4 | −0.10 |
| V6 | 44.6 | f2/f1 | −0.20 |
| V3/V4 | 1.0 | ImgH [mm] | 4.23 |
| V3 + V4 | 38.9 | TL [mm] | 6.70 |
| Vdmin | 19.5 | TL/ImgH | 1.58 |
| Nmax | 1.669 | TL/f | 1.48 |
| (Vi/Ni)min | 11.65 | TL/Y11 | 3.18 |
| CT1/CT3 | 1.08 | TL/EPD | 2.55 |
| CT5/CT6 | 1.81 | SL/TL | 0.79 |
| T34/CT3 | 1.62 | EPD/ImgH | 0.62 |
| T45/T34 | 0.12 | f/ImgH | 1.07 |
| T45/CT4 | 0.15 | BL/ImgH | 0.19 |
| T67/T78 | 0.06 | Yc71/Yc72 | 0.69 |
| T78/CT7 | 2.12 | f/Yc82 | 2.54 |
| (T23 + T45 + T67)/(T34 + T78) | 0.12 | V1/N1 | 36.30 |
| f/R15 | 1.71 | V2/N2 | 36.30 |
| f/R16 | 3.33 | V3/N3 | 11.65 |
| \|f/R1\| + \|f/R2\| | 0.44 | V4/N4 | 11.65 |
| f/R1 − f/R12 | −0.31 | V5/N5 | 36.26 |
| (R3 + R4)/(R3 − R4) | −0.82 | V6/N6 | 28.57 |
| (R5 − R6)/(R5 + R6) | 0.21 | V7/N7 | 36.26 |
| (R13 − R14)/(R13 + R14) | −0.24 | V8/N8 | 36.48 |
| (R15 + R16)/(R15 − R16) | 3.10 | — | — |

5th Embodiment

Figure 9:
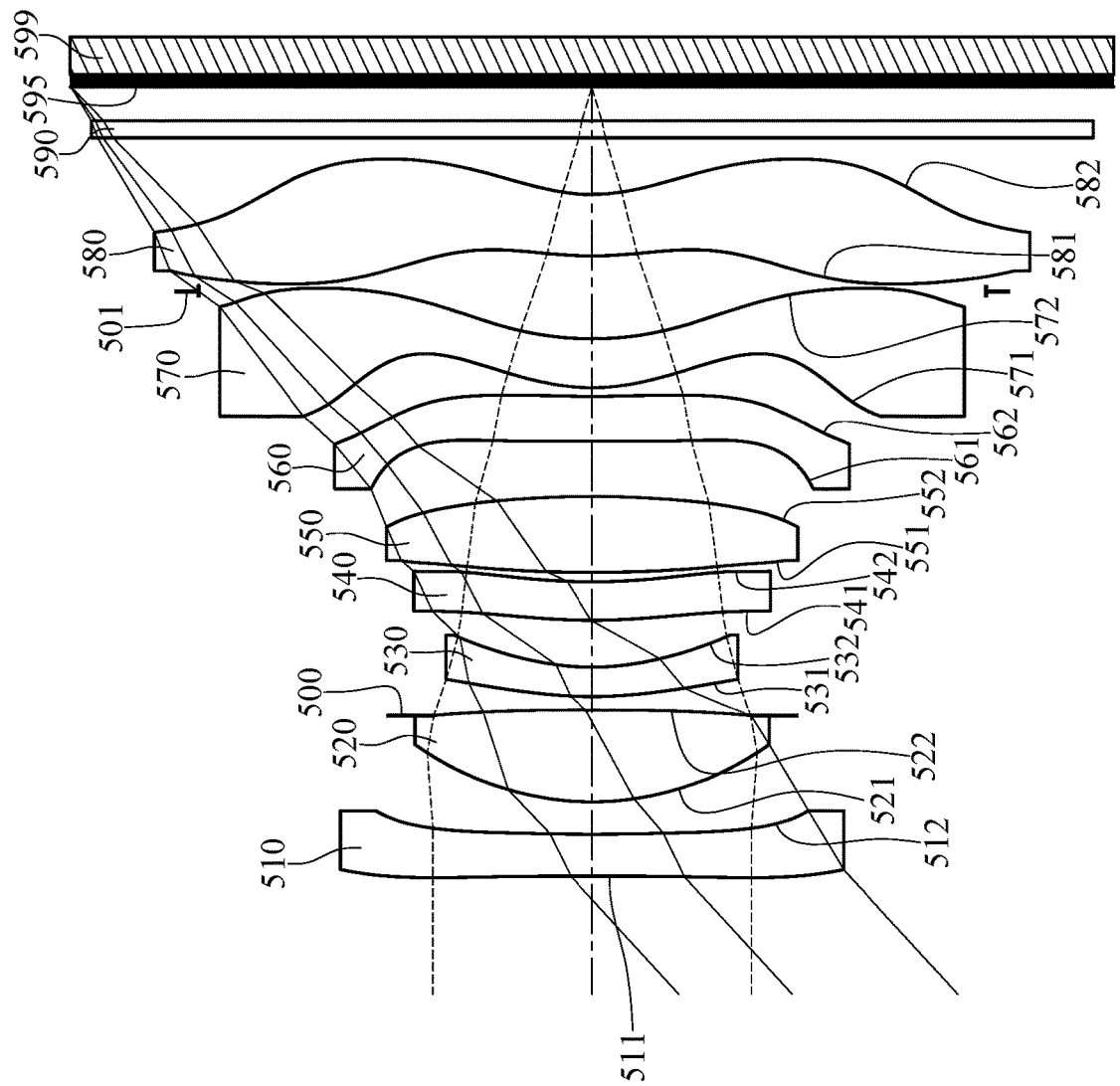
FIG. 9 is a schematic view of an image capturing unit according to the 5th embodiment of the present disclosure.
Figure 10:
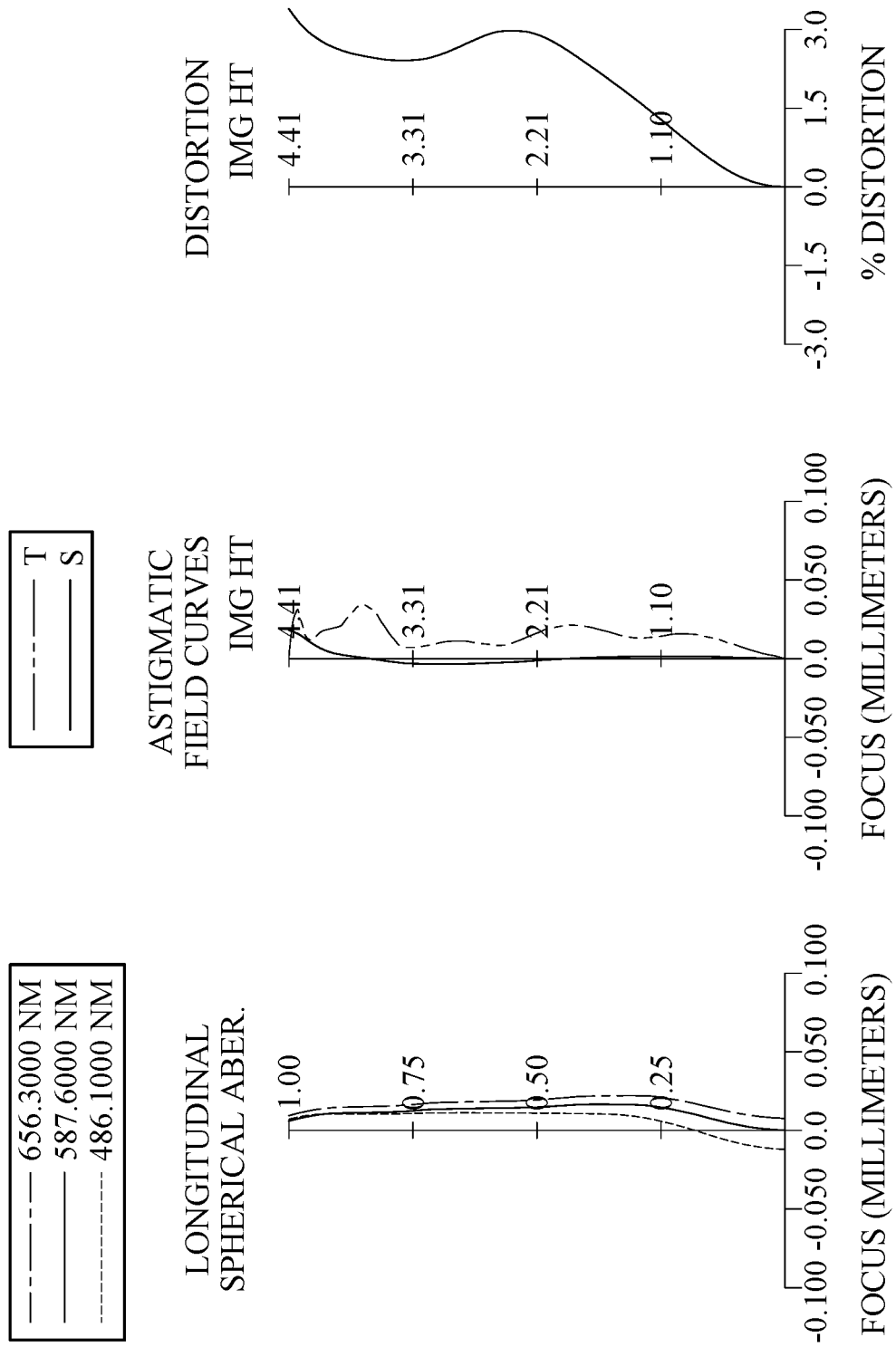
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens system (its reference numeral is omitted) of the present disclosure and an image sensor 599. The optical imaging lens system includes, in order from an object side to an image side along an optical path, a first lens element 510, a second lens element 520, an aperture stop 500, a third lens element 530, a fourth lens element 540, a fifth lens element 550, a sixth lens element 560, a seventh lens element 570, a stop 501, an eighth lens element 580, a filter 590 and an image surface 595. The optical imaging lens system includes eight lens elements (510, 520, 530, 540, 550, 560, 570 and 580) with no additional lens element disposed between each of the adjacent eight lens elements.

The first lens element 510 with negative refractive power has an object-side surface 511 being concave in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has one inflection point.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being concave in a paraxial region thereof and an image-side surface 562 being concave in a paraxial region thereof. The sixth lens element 560 is made of plastic material and has the object-side surface 561 and the image-side surface 562 being both aspheric.

The seventh lens element 570 with positive refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has at least one inflection point. The image-side surface 572 of the seventh lens element 570 has at least one inflection point. The object-side surface 571 of the seventh lens element 570 has at least one critical point in an off-axis region thereof. The image-side surface 572 of the seventh lens element 570 has at least one convex critical point in an off-axis region thereof.

The eighth lens element 580 with negative refractive power has an object-side surface 581 being convex in a paraxial region thereof and an image-side surface 582 being concave in a paraxial region thereof. The eighth lens element 580 is made of plastic material and has the object-side surface 581 and the image-side surface 582 being both aspheric. The image-side surface 582 of the eighth lens element 580 has at least one critical point in an off-axis region thereof.

The filter 590 is made of glass material and located between the eighth lens element 580 and the image surface 595, and will not affect the focal length of the optical imaging lens system. The image sensor 599 is disposed on or near the image surface 595 of the optical imaging lens system.

In this embodiment, the eight lens elements of the optical imaging lens system are all made of plastic material, an absolute value of a focal length of the second lens element 520 is a minimum among absolute values of focal lengths of each of all lens elements of the optical imaging lens system, an axial distance between the seventh lens element 570 and the eighth lens element 580 is a maximum among axial distances between each of all adjacent lens elements of the optical imaging lens system, and a maximum effective radius of the image-side surface 532 of the third lens element 530 is a minimum among maximum effective radii of all lens surfaces of the optical imaging lens system.

The detailed optical data of the 5th embodiment are shown in Table 9 and the aspheric surface data are shown in Table 10 below.

TABLE 9

5th Embodiment
f = 4.64 mm, Fno = 1.72, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −134.099 | (ASP) | 0.353 | Plastic | 1.545 | 56.1 | −28.53 |
| 2 | | 17.604 | (ASP) | 0.274 | | | | |
| 3 | Lens 2 | 2.434 | (ASP) | 0.780 | Plastic | 1.545 | 56.1 | 4.15 |
| 4 | | −28.176 | (ASP) | −0.050 | | | | |
| 5 | Ape. Stop | Plano | | 0.166 | | | | |
| 6 | Lens 3 | 3.542 | (ASP) | 0.250 | Plastic | 1.669 | 19.5 | −9.22 |
| 7 | | 2.187 | (ASP) | 0.396 | | | | |
| 8 | Lens 4 | 5.551 | (ASP) | 0.325 | Plastic | 1.639 | 23.5 | 133.56 |
| 9 | | 5.802 | (ASP) | 0.080 | | | | |
| 10 | Lens 5 | 25.243 | (ASP) | 0.641 | Plastic | 1.544 | 56.0 | 10.83 |
| 11 | | −7.616 | (ASP) | 0.470 | | | | |
| 12 | Lens 6 | −23.407 | (ASP) | 0.382 | Plastic | 1.562 | 44.6 | −12.14 |
| 13 | | 9.681 | (ASP) | 0.073 | | | | |
| 14 | Lens 7 | 1.734 | (ASP) | 0.416 | Plastic | 1.544 | 56.0 | 6.97 |
| 15 | | 2.925 | (ASP) | 0.400 | | | | |
| 16 | Stop | Plano | | 0.300 | | | | |
| 17 | Lens 8 | 3.085 | (ASP) | 0.520 | Plastic | 1.534 | 56.0 | −6.28 |
| 18 | | 1.513 | (ASP) | 0.478 | | | | |
| 19 | Filter | Plano | | 0.150 | Glass | 1.517 | 64.2 | — |
| 20 | | Plano | | 0.288 | | | | |
| 21 | Image | Plano | | — | | | | |

Note:
Reference wavelength is 587.6 nm (d-line).
An effective radius of the stop 501 (Surface 16) is 3.333 mm.

TABLE 10

Aspheric Coefficients

| Surface # | 1 | 2 | 3 | 4 | 6 | 7 |
|---|---|---|---|---|---|---|
| k = | −1.0000E+00 | −8.0000E+01 | −1.4116E−01 | −1.2849E+01 | −2.7046E+01 | −5.6393E+00 |
| A4 = | −1.2563E−02 | −2.1499E−02 | −1.6165E−02 | −1.7279E−02 | 1.1393E−03 | −6.0252E−03 |
| A6 = | 8.6033E−03 | 2.1303E−02 | 1.6392E−02 | 2.7412E−02 | 3.0262E−03 | 2.8516E−02 |
| A8 = | −1.8612E−03 | −7.6131E−03 | −1.3472E−02 | −3.3440E−02 | −5.6434E−04 | −2.0269E−02 |
| A10 = | 1.4266E−04 | 1.9785E−03 | 8.0775E−03 | 2.7130E−02 | −1.7625E−03 | 1.0427E−02 |

TABLE 10-continued

| Aspheric Coefficients | | | | | | |
|---|---|---|---|---|---|---|
| A12 = | 2.2376E−05 | −3.4308E−04 | −2.8471E−03 | −1.4559E−02 | 6.0556E−04 | −3.7516E−03 |
| A14 = | −4.6896E−06 | 4.2151E−05 | 4.1953E−04 | 4.5005E−03 | 4.0242E−07 | 8.0240E−04 |
| A16 = | 1.7402E−07 | −1.9954E−06 | — | −5.8861E−04 | — | −6.2627E−05 |

| Surface # | 8 | 9 | 10 | 11 | 12 | 13 |
|---|---|---|---|---|---|---|
| k = | −8.7128E+00 | −1.9631E+00 | 5.0000E+01 | −7.2123E+01 | −1.6969E+01 | −1.0000E+00 |
| A4 = | −1.6737E−02 | 3.4897E−02 | 7.7646E−02 | 1.3747E−02 | 8.1722E−02 | −7.6003E−02 |
| A6 = | −2.3001E−02 | −1.1334E−01 | −1.2267E−01 | −3.8321E−02 | −8.7249E−02 | 4.9531E−02 |
| A8 = | 3.1770E−02 | 1.1670E−01 | 1.1211E−01 | 2.6244E−02 | 5.4743E−02 | −2.9875E−02 |
| A10 = | −2.4073E−02 | −6.9228E−02 | −5.8304E−02 | −1.1220E−02 | −2.6868E−02 | 1.1151E−02 |
| A12 = | 9.7769E−03 | 2.0869E−02 | 1.5258E−02 | 4.0578E−03 | 7.9065E−03 | −3.2959E−03 |
| A14 = | −1.5309E−03 | −2.3850E−03 | −1.5367E−03 | −1.1417E−03 | −1.1901E−03 | 7.7039E−04 |
| A16 = | — | — | — | 1.4034E−04 | 6.3374E−05 | −1.0537E−04 |
| A18 = | — | — | — | — | — | 5.7904E−06 |

| Surface # | 14 | 15 | 17 | 18 |
|---|---|---|---|---|
| k = | −5.6287E+00 | −2.9749E−01 | −7.9694E+00 | −3.7566E+00 |
| A4 = | 4.5436E−03 | 4.2222E−02 | −1.2495E−01 | −8.3268E−02 |
| A6 = | −9.6568E−03 | −5.2099E−02 | 3.2641E−02 | 3.0599E−02 |
| A8 = | −9.9802E−03 | 1.8626E−02 | −2.3636E−03 | −8.4427E−03 |
| A10 = | 7.3033E−03 | −3.8708E−03 | −3.5756E−04 | 1.7365E−03 |
| A12 = | −2.5475E−03 | 5.0965E−04 | 8.9582E−05 | −2.6439E−04 |
| A14 = | 5.1159E−04 | −4.2020E−05 | −7.9081E−06 | 2.7598E−05 |
| A16 = | −5.3352E−05 | 1.9665E−06 | 3.3283E−07 | −1.7937E−06 |
| A18 = | 2.2081E−06 | −3.9532E−08 | −5.5746E−09 | 6.4330E−08 |
| A20 = | — | — | — | −9.6720E−10 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.64 | f/f1 | −0.16 |
| Fno | 1.72 | f/f2 | 1.12 |
| HFOV [deg.] | 42.6 | f/f4 | 0.03 |
| V6 | 44.6 | f2/f1 | −0.15 |
| V3/V4 | 0.8 | ImgH [mm] | 4.42 |
| V3 + V4 | 42.9 | TL [mm] | 6.69 |
| Vdmin | 19.5 | TL/ImgH | 1.52 |
| Nmax | 1.669 | TL/f | 1.44 |
| (Vi/Ni)min | 11.65 | TL/Y11 | 3.14 |
| CT1/CT3 | 1.41 | TL/EPD | 2.48 |
| CT5/CT6 | 1.68 | SL/TL | 0.80 |
| T34/CT3 | 1.58 | EPD/ImgH | 0.61 |
| T45/T34 | 0.20 | f/ImgH | 1.05 |
| T45/CT4 | 0.25 | BL/ImgH | 0.21 |
| T67/T78 | 0.10 | Yc71/Yc72 | 0.61 |
| T78/CT7 | 1.68 | f/Yc82 | 2.68 |
| (T23 + T45 + T67)/(T34 + T78) | 0.25 | V1/N1 | 36.30 |
| f/R15 | 1.50 | V2/N2 | 36.30 |
| f/R16 | 3.07 | V3/N3 | 11.65 |
| |f/R1| + |f/R2| | 0.30 | V4/N4 | 14.34 |
| f/R1 − f/R12 | −0.51 | V5/N5 | 36.26 |
| (R3 + R4)/(R3 − R4) | −0.84 | V6/N6 | 28.57 |
| (R5 − R6)/(R5 + R6) | 0.24 | V7/N7 | 36.26 |
| (R13 − R14)/(R13 + R14) | −0.26 | V8/N8 | 36.48 |
| (R15 + R16)/(R15 − R16) | 2.93 | | |

6th Embodiment

Figure 11:
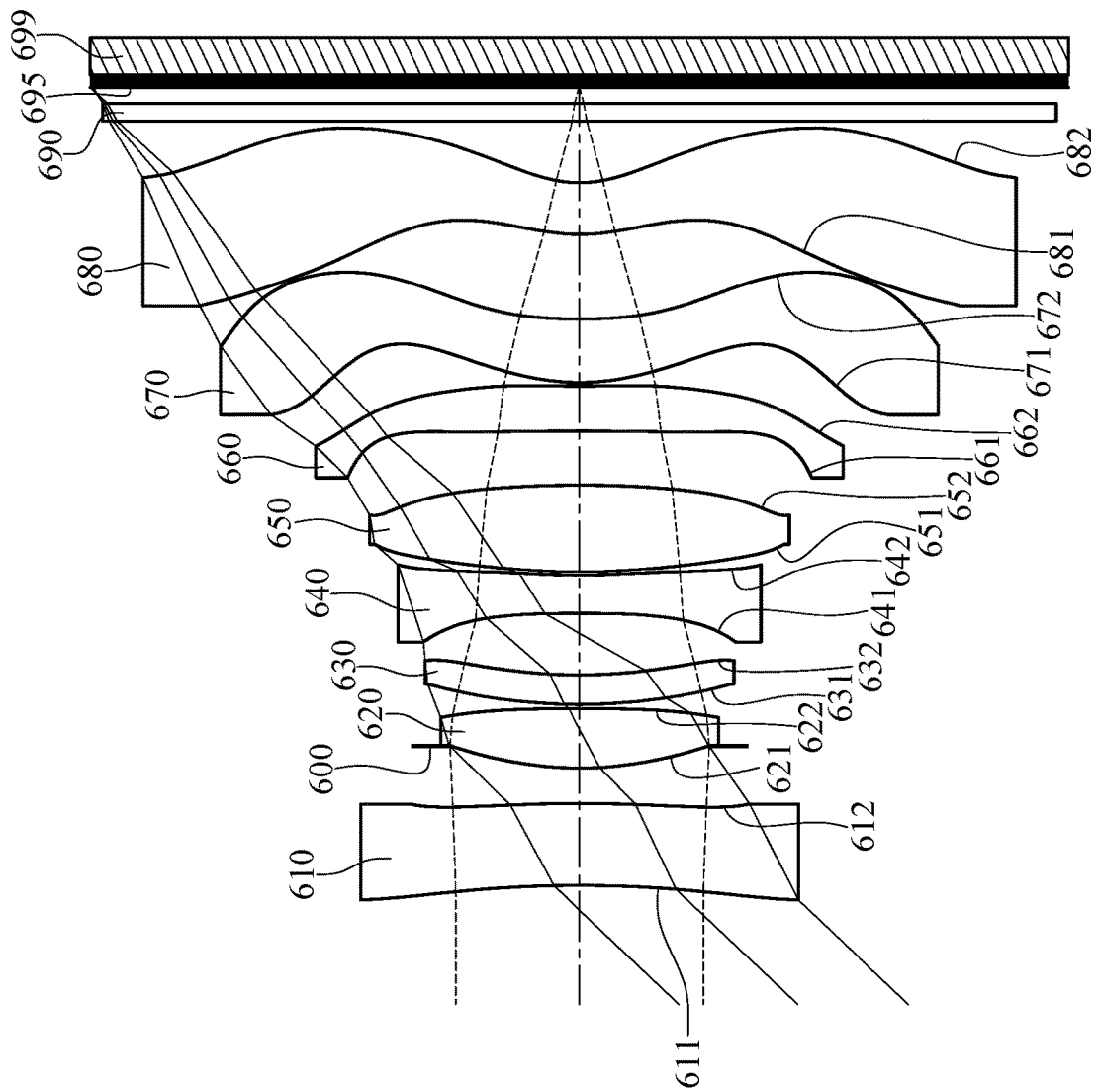
FIG. 11 is a schematic view of an image capturing unit according to the 6th embodiment of the present disclosure.
Figure 12:
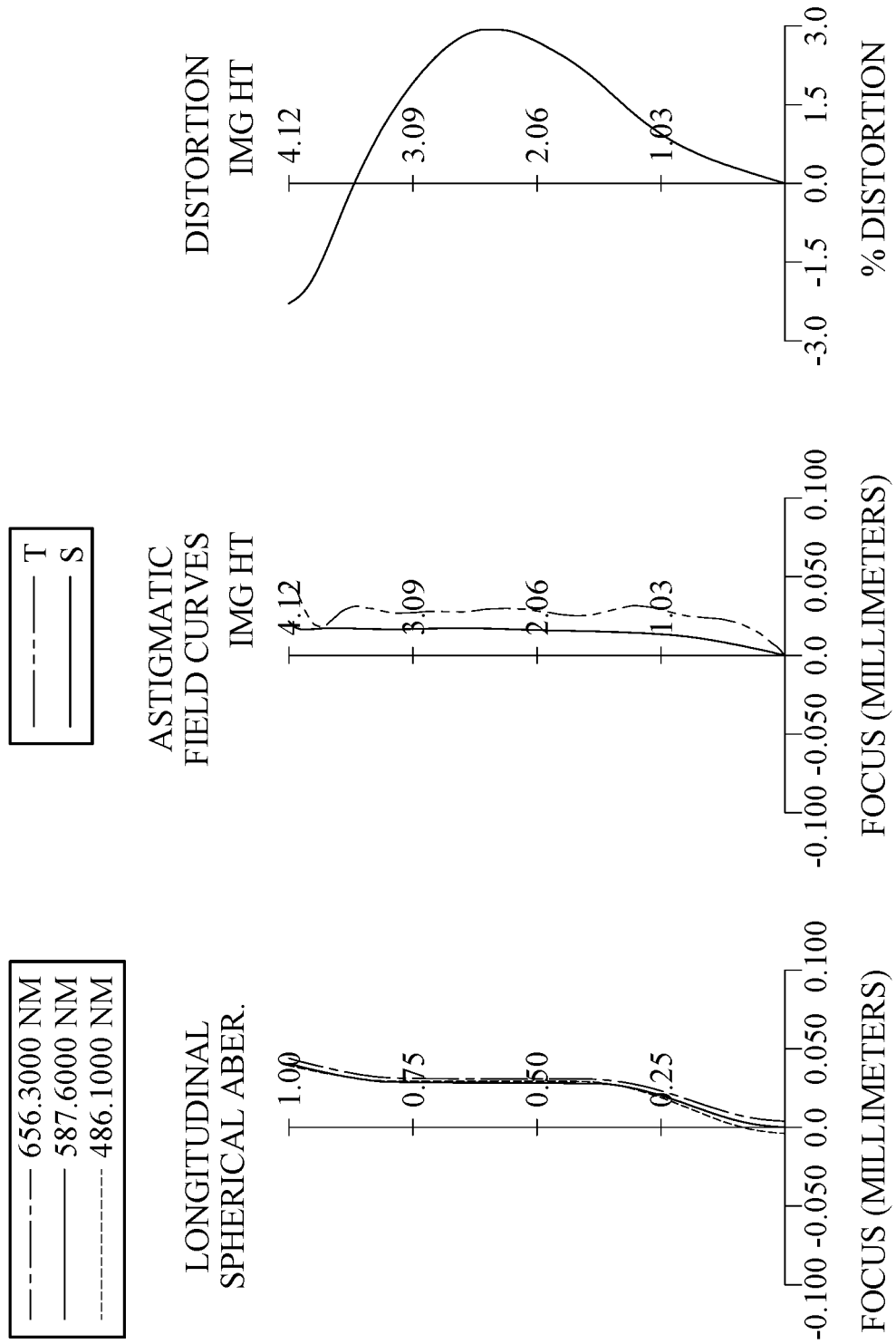
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens system (its reference numeral is omitted) of the present disclosure and an image sensor 699. The optical imaging lens system includes, in order from an object side to an image side along an optical path, a first lens element 610, an aperture stop 600, a second lens element 620, a third lens element 630, a fourth lens element 640, a fifth lens element 650, a sixth lens element 660, a seventh lens element 670, an eighth lens element 680, a filter 690 and an image surface 695. The optical imaging lens system includes eight lens elements (610, 620, 630, 640, 650, 660, 670 and 680) with no additional lens element disposed between each of the adjacent eight lens elements.

The first lens element 610 with negative refractive power has an object-side surface 611 being concave in a paraxial region thereof and an image-side surface 612 being convex in a paraxial region thereof. The first lens element 610 is made of plastic material and has the object-side surface 611 and the image-side surface 612 being both aspheric. The object-side surface 611 of the first lens element 610 has one inflection point. The image-side surface 612 of the first lens element 610 has one inflection point.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric.

The seventh lens element 670 with positive refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has at least one inflection point. The image-side surface 672 of the seventh lens element 670 has at least one inflection point. The object-side surface 671 of the seventh lens element 670 has at least one critical point in an off-axis region thereof. The image-side surface 672 of the seventh lens element 670 has at least one convex critical point in an off-axis region thereof.

The eighth lens element 680 with negative refractive power has an object-side surface 681 being convex in a paraxial region thereof and an image-side surface 682 being concave in a paraxial region thereof. The eighth lens element 680 is made of plastic material and has the object-side surface 681 and the image-side surface 682 being both aspheric. The image-side surface 682 of the eighth lens element 680 has at least one critical point in an off-axis region thereof.

The filter 690 is made of glass material and located between the eighth lens element 680 and the image surface 695, and will not affect the focal length of the optical imaging lens system. The image sensor 699 is disposed on or near the image surface 695 of the optical imaging lens system.

In this embodiment, the eight lens elements of the optical imaging lens system are all made of plastic material, an absolute value of a focal length of the second lens element 620 is a minimum among absolute values of focal lengths of each of all lens elements of the optical imaging lens system, an axial distance between the seventh lens element 670 and the eighth lens element 680 is a maximum among axial distances between each of all adjacent lens elements of the optical imaging lens system, and a maximum effective radius of the object-side surface 621 of the second lens element 620 is a minimum among maximum effective radii of all lens surfaces of the optical imaging lens system.

The detailed optical data of the 6th embodiment are shown in Table 11 and the aspheric surface data are shown in Table 12 below.

TABLE 11

6th Embodiment
f = 3.96 mm, Fno = 1.90, HFOV = 46.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −10.000 | (ASP) | 0.695 | Plastic | 1.566 | 37.4 | −143.39 |
| 2 | | −11.691 | (ASP) | 0.484 | | | | |
| 3 | Ape. Stop | Plano | | −0.184 | | | | |
| 4 | Lens 2 | 3.066 | (ASP) | 0.498 | Plastic | 1.545 | 56.1 | 5.35 |
| 5 | | −55.167 | (ASP) | 0.035 | | | | |
| 6 | Lens 3 | 4.301 | (ASP) | 0.250 | Plastic | 1.650 | 21.5 | 401.60 |
| 7 | | 4.273 | (ASP) | 0.517 | | | | |
| 8 | Lens 4 | −17.413 | (ASP) | 0.325 | Plastic | 1.669 | 19.5 | −7.03 |
| 9 | | 6.485 | (ASP) | 0.030 | | | | |
| 10 | Lens 5 | 5.869 | (ASP) | 0.731 | Plastic | 1.544 | 56.0 | 6.81 |
| 11 | | −9.612 | (ASP) | 0.454 | | | | |
| 12 | Lens 6 | −29.894 | (ASP) | 0.380 | Plastic | 1.566 | 37.4 | −13.23 |
| 13 | | 10.034 | (ASP) | 0.030 | | | | |
| 14 | Lens 7 | 1.938 | (ASP) | 0.533 | Plastic | 1.544 | 56.0 | 5.45 |
| 15 | | 5.057 | (ASP) | 0.717 | | | | |
| 16 | Lens 8 | 1.613 | (ASP) | 0.435 | Plastic | 1.566 | 37.4 | −5.93 |
| 17 | | 0.983 | (ASP) | 0.520 | | | | |
| 18 | Filter | Plano | | 0.150 | Glass | 1.517 | 64.2 | — |
| 19 | | Plano | | 0.132 | | | | |
| 20 | Image | Plano | | — | | | | |

Note:
Reference wavelength is 587.6 nm (d-line).

TABLE 12

Aspheric Coefficients

| Surface # | 1 | 2 | 4 | 5 | 6 | 7 |
|---|---|---|---|---|---|---|
| k = | 1.5124E+01 | −4.6960E+01 | −2.6568E−01 | −1.0000E+00 | −2.4579E+01 | −7.5520E+00 |
| A4 = | 8.1271E−04 | 6.7163E−03 | −6.3849E−03 | −9.1298E−02 | −3.2466E−02 | −6.3957E−03 |
| A6 = | 2.2051E−03 | 1.4085E−03 | 8.8779E−03 | 1.5019E−01 | 1.3713E−01 | 5.2453E−03 |
| A8 = | −3.5247E−04 | 2.1932E−03 | −3.4645E−02 | −2.0072E−01 | −1.9646E−01 | 1.9953E−02 |
| A10 = | 1.5160E−04 | −5.7004E−04 | 4.6403E−02 | 1.5883E−01 | 1.7804E−01 | −4.6791E−02 |
| A12 = | −2.9372E−05 | 6.2621E−05 | −2.9492E−02 | −6.5483E−02 | −1.0295E−01 | 3.5487E−02 |
| A14 = | 1.6811E−06 | 5.4418E−05 | 7.6154E−03 | 8.5093E−03 | 3.3331E−02 | −1.4635E−02 |
| A16 = | — | — | — | 1.6406E−03 | −4.4826E−03 | 2.5794E−03 |

| Surface # | 8 | 9 | 10 | 11 | 12 | 13 |
|---|---|---|---|---|---|---|
| k = | 5.0000E+01 | 6.2296E+00 | −2.2063E+01 | −6.8987E+01 | −4.4528E+01 | −1.0000E+00 |
| A4 = | −7.7965E−02 | −7.8374E−02 | −1.6619E−02 | −9.1639E−03 | −1.0770E−02 | −1.6610E−01 |
| A6 = | 4.3785E−02 | 4.6394E−02 | 1.4706E−02 | −3.2882E−03 | 4.4609E−02 | 1.3848E−01 |
| A8 = | −4.6710E−02 | −9.3023E−03 | −1.2568E−03 | 2.4554E−03 | −3.7092E−02 | −7.2177E−02 |
| A10 = | 3.6610E−02 | −6.1148E−03 | −3.5491E−03 | −7.2098E−03 | 1.5561E−02 | 2.4069E−02 |
| A12 = | −1.9137E−02 | 4.3112E−03 | 1.5848E−03 | 5.9019E−03 | −4.2908E−03 | −5.5183E−03 |
| A14 = | 3.9796E−03 | −7.2495E−04 | −1.7935E−04 | −2.0514E−03 | 7.0965E−04 | 8.3071E−04 |
| A16 = | — | — | — | 2.6859E−04 | −5.5408E−05 | −6.9766E−05 |
| A18 = | — | — | — | — | — | 2.3297E−06 |

| Surface # | 14 | 15 | 16 | 17 |
|---|---|---|---|---|
| k = | −5.2432E+00 | 3.8998E−01 | −6.4439E+00 | −3.2354E+00 |
| A4 = | 1.1295E−02 | 1.2390E−01 | −1.3114E−01 | −1.0108E−01 |
| A6 = | 8.9772E−04 | −8.6281E−02 | 3.1652E−02 | 4.5272E−02 |
| A8 = | −1.5427E−02 | 2.6393E−02 | −4.0807E−03 | −1.4471E−02 |
| A10 = | 7.2741E−03 | −4.9063E−03 | 4.4033E−04 | 3.2139E−03 |
| A12 = | −1.8937E−03 | 5.7693E−04 | −4.3887E−05 | −4.8935E−04 |
| A14 = | 3.0940E−04 | −4.1179E−05 | 1.9648E−06 | 4.9436E−05 |
| A16 = | −2.7888E−05 | 1.5432E−06 | 1.1387E−07 | −3.1301E−06 |
| A18 = | 1.0286E−06 | −2.0382E−08 | −1.3905E−08 | 1.1164E−07 |
| A20 = | — | — | 3.3081E−10 | −1.7044E−09 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.96 | f/f1 | −0.03 |
| Fno | 1.90 | f/f2 | 0.74 |
| HFOV [deg.] | 46.6 | f/f4 | −0.56 |
| V6 | 37.4 | f2/f1 | −0.04 |
| V3/V4 | 1.1 | ImgH [mm] | 4.12 |
| V3 + V4 | 40.9 | TL [mm] | 6.73 |
| Vdmin | 19.5 | TL/ImgH | 1.64 |
| Nmax | 1.669 | TL/f | 1.70 |
| (Vi/Ni)min | 11.66 | TL/Y11 | 3.66 |
| CT1/CT3 | 2.78 | TL/EPD | 3.23 |
| CT5/CT6 | 1.92 | SL/TL | 0.82 |
| T34/CT3 | 2.07 | EPD/ImgH | 0.51 |
| T45/T34 | 0.06 | f/ImgH | 0.96 |
| T45/CT4 | 0.09 | BL/ImgH | 0.19 |
| T67/T78 | 0.04 | Yc71/Yc72 | 0.77 |
| T78/CT7 | 1.35 | f/Yc82 | 2.03 |
| (T23 + T45 + T67)/(T34 + T78) | 0.08 | V1/N1 | 23.91 |
| f/R15 | 2.45 | V2/N2 | 36.30 |
| f/R16 | 4.03 | V3/N3 | 13.01 |
| \|f/R1\| + \|f/R2\| | 0.73 | V4/N4 | 11.66 |
| f/R1 − f/R12 | −0.79 | V5/N5 | 36.26 |
| (R3 + R4)/(R3 − R4) | −0.89 | V6/N6 | 23.91 |
| (R5 − R6)/(R5 + R6) | 0.003 | V7/N7 | 36.26 |
| (R13 − R14)/(R13 + R14) | −0.45 | V8/N8 | 23.91 |
| (R15 + R16)/(R15 − R16) | 4.12 | — | — |

7th Embodiment

Figure 13:
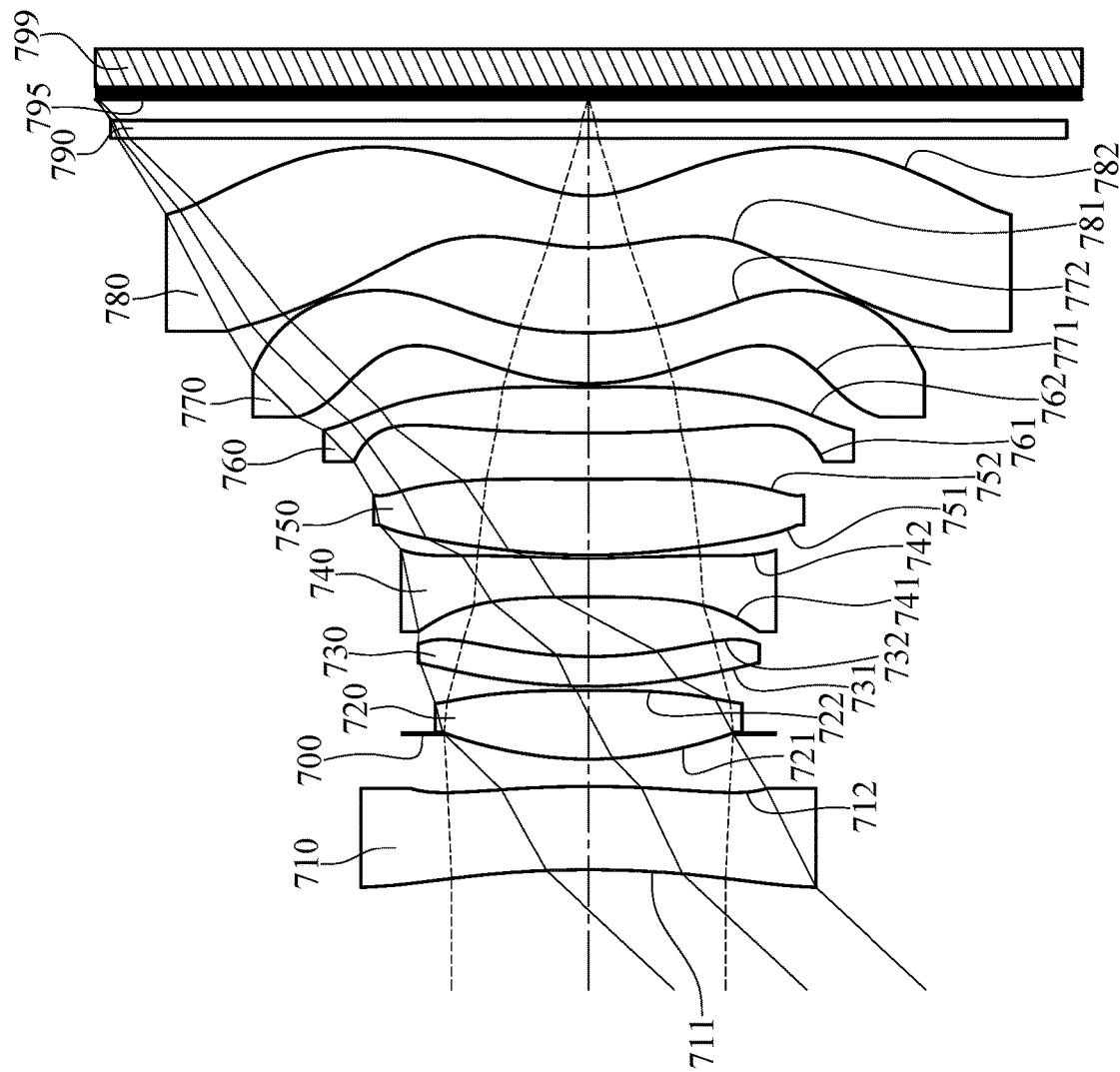
FIG. 13 is a schematic view of an image capturing unit according to the 7th embodiment of the present disclosure.
Figure 14:
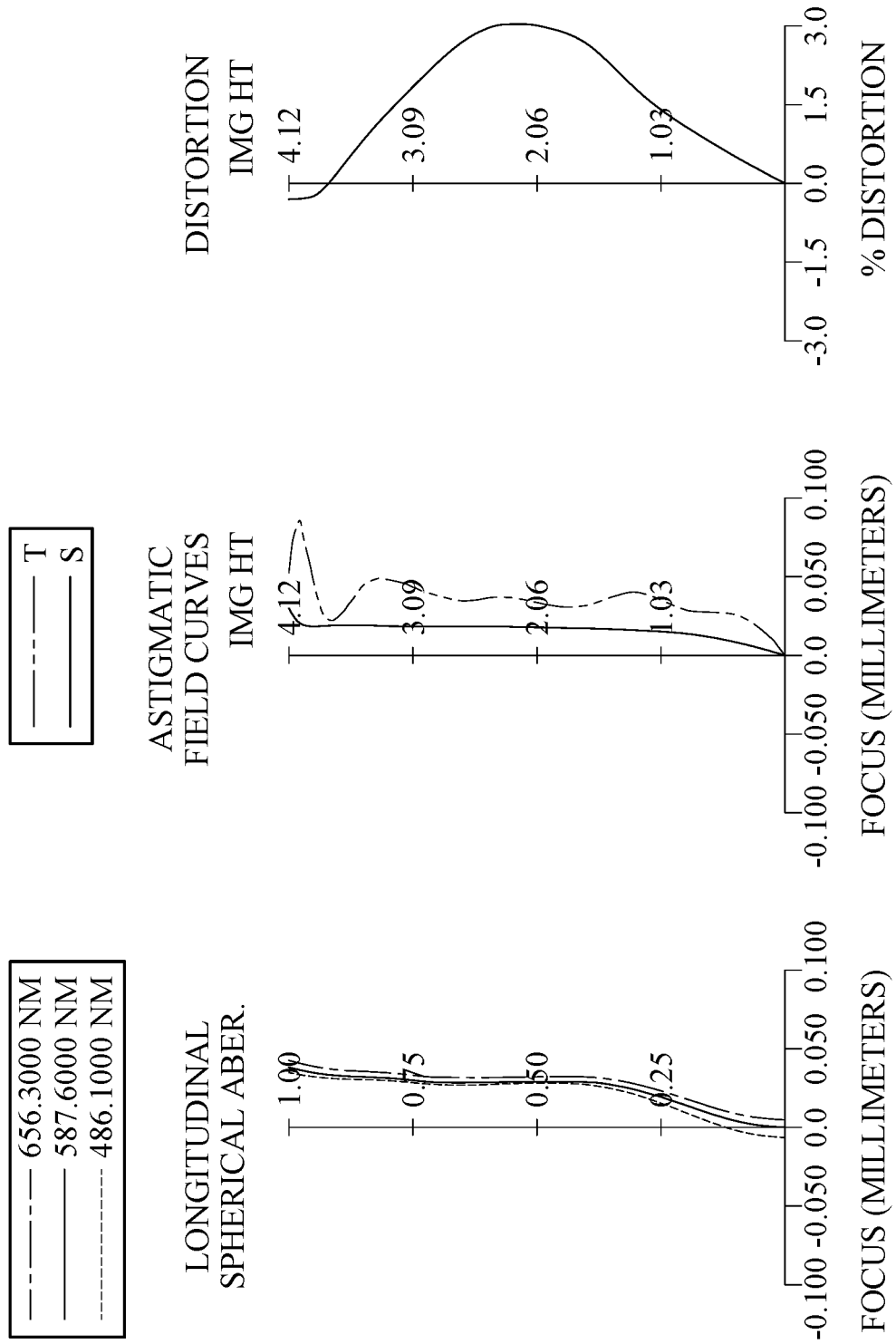
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens system (its reference numeral is omitted) of the present disclosure and an image sensor 799. The optical imaging lens system includes, in order from an object side to an image side along an optical path, a first lens element 710, an aperture stop 700, a second lens element 720, a third lens element 730, a fourth lens element 740, a fifth lens element 750, a sixth lens element 760, a seventh lens element 770, an eighth lens element 780, a filter 790 and an image surface 795. The optical imaging lens system includes eight lens elements (710, 720, 730, 740, 750, 760, 770 and 780) with no additional lens element disposed between each of the adjacent eight lens elements.

The first lens element 710 with positive refractive power has an object-side surface 711 being concave in a paraxial region thereof and an image-side surface 712 being convex in a paraxial region thereof. The first lens element 710 is made of plastic material and has the object-side surface 711 and the image-side surface 712 being both aspheric. The object-side surface 711 of the first lens element 710 has one inflection point. The image-side surface 712 of the first lens element 710 has one inflection point.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric.

The seventh lens element 770 with positive refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has at least one inflection point. The image-side surface 772 of the seventh lens element 770 has at least one inflection point. The object-side surface 771 of the seventh lens element 770 has at least one critical point in an off-axis region thereof. The image-side surface 772 of the seventh lens element 770 has at least one convex critical point in an off-axis region thereof.

The eighth lens element 780 with negative refractive power has an object-side surface 781 being convex in a paraxial region thereof and an image-side surface 782 being concave in a paraxial region thereof. The eighth lens element 780 is made of plastic material and has the object-side surface 781 and the image-side surface 782 being both aspheric. The image-side surface 782 of the eighth lens element 780 has at least one critical point in an off-axis region thereof.

The filter 790 is made of glass material and located between the eighth lens element 780 and the image surface 795, and will not affect the focal length of the optical imaging lens system. The image sensor 799 is disposed on or near the image surface 795 of the optical imaging lens system.

In this embodiment, the eight lens elements of the optical imaging lens system are all made of plastic material, an absolute value of a focal length of the second lens element 720 is a minimum among absolute values of focal lengths of each of all lens elements of the optical imaging lens system, an axial distance between the seventh lens element 770 and the eighth lens element 780 is a maximum among axial distances between each of all adjacent lens elements of the optical imaging lens system, and a maximum effective radius of the object-side surface 721 of the second lens element 720 is a minimum among maximum effective radii of all lens surfaces of the optical imaging lens system.

The detailed optical data of the 7th embodiment are shown in Table 13 and the aspheric surface data are shown in Table 14 below.

TABLE 13

7th Embodiment
f = 3.82 mm, Fno = 1.67, HFOV = 47.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −9.533 | (ASP) | 0.700 | Plastic | 1.566 | 37.4 | 538.74 |
| 2 |  | −9.489 | (ASP) | 0.442 |  |  |  |  |
| 3 | Ape. Stop | Plano |  | −0.214 |  |  |  |  |
| 4 | Lens 2 | 3.096 | (ASP) | 0.572 | Plastic | 1.545 | 56.1 | 5.19 |
| 5 |  | −30.402 | (ASP) | 0.035 |  |  |  |  |
| 6 | Lens 3 | 4.058 | (ASP) | 0.250 | Plastic | 1.650 | 21.5 | −68.60 |
| 7 |  | 3.629 | (ASP) | 0.495 |  |  |  |  |
| 8 | Lens 4 | −23.734 | (ASP) | 0.325 | Plastic | 1.679 | 18.4 | −7.93 |
| 9 |  | 7.002 | (ASP) | 0.030 |  |  |  |  |
| 10 | Lens 5 | 4.847 | (ASP) | 0.634 | Plastic | 1.544 | 56.0 | 9.88 |
| 11 |  | 46.829 | (ASP) | 0.382 |  |  |  |  |
| 12 | Lens 6 | 12.703 | (ASP) | 0.385 | Plastic | 1.566 | 37.4 | 84.64 |
| 13 |  | 17.097 | (ASP) | 0.030 |  |  |  |  |
| 14 | Lens 7 | 2.062 | (ASP) | 0.420 | Plastic | 1.544 | 56.0 | 6.77 |
| 15 |  | 4.351 | (ASP) | 0.715 |  |  |  |  |
| 16 | Lens 8 | 1.739 | (ASP) | 0.435 | Plastic | 1.566 | 37.4 | −5.65 |
| 17 |  | 1.025 | (ASP) | 0.478 |  |  |  |  |

TABLE 13-continued

7th Embodiment
f = 3.82 mm, Fno = 1.67, HFOV = 47.0 deg.

| Surface # | | Curvature Radius | Thickness | Material | Index | Abbe # | Focal Length |
|---|---|---|---|---|---|---|---|
| 18 | Filter | Plano | 0.150 | Glass | 1.517 | 64.2 | — |
| 19 | | Plano | 0.173 | | | | |
| 20 | Image | Plano | — | | | | |

Note:
Reference wavelength is 587.6 nm (d-line).

TABLE 14

Aspheric Coefficients

| Surface # | 1 | 2 | 4 | 5 | 6 | 7 |
|---|---|---|---|---|---|---|
| k = | 1.6294E+01 | −2.4687E+01 | −6.1157E−01 | 1.6578E+01 | −2.6804E+01 | −8.0747E+00 |
| A4 = | −3.9595E−03 | −5.7937E−03 | −1.4490E−02 | −9.4262E−02 | −1.8451E−02 | 4.0300E−03 |
| A6 = | 3.7978E−03 | 1.4129E−02 | 1.0794E−02 | 1.2710E−01 | 7.1191E−02 | −3.0120E−02 |
| A8 = | 1.1368E−04 | −6.5608E−03 | −1.9353E−02 | −1.5313E−01 | −6.9586E−02 | 7.7634E−02 |
| A10 = | −2.4484E−04 | 4.4328E−03 | 2.1807E−02 | 1.2059E−01 | 3.2522E−02 | −1.0780E−01 |
| A12 = | 7.3715E−05 | −1.8094E−03 | −1.3164E−02 | −5.6541E−02 | −5.2418E−03 | 7.3853E−02 |
| A14 = | −7.8289E−06 | 3.7926E−04 | 3.5604E−03 | 1.3355E−02 | −1.4015E−03 | −2.7227E−02 |
| A16 = | — | — | — | −7.0088E−04 | 4.9097E−04 | 4.1802E−03 |

| Surface # | 8 | 9 | 10 | 11 | 12 | 13 |
|---|---|---|---|---|---|---|
| k = | −3.4010E+01 | 3.9247E+00 | −2.1778E+01 | −1.0000E+00 | −4.0690E+01 | −1.0000E+00 |
| A4 = | −7.0441E−02 | −6.7568E−02 | −1.7283E−02 | −3.0103E−02 | −2.7872E−02 | −1.3385E−01 |
| A6 = | 2.0403E−02 | 1.5408E−02 | 1.2445E−02 | 1.8180E−02 | 6.0496E−02 | 1.1882E−01 |
| A8 = | −2.8696E−02 | 1.6518E−02 | 2.0387E−03 | −1.8566E−02 | −5.0445E−02 | −6.2936E−02 |
| A10 = | 3.0170E−02 | −1.7371E−02 | −4.7058E−03 | 1.0108E−02 | 2.2671E−02 | 2.0118E−02 |
| A12 = | −1.7303E−02 | 7.1276E−03 | 1.6780E−03 | −2.6321E−03 | −6.3534E−03 | −4.1364E−03 |
| A14 = | 3.7137E−03 | −1.0133E−03 | −1.7987E−04 | 1.6857E−04 | 1.0196E−03 | 5.3710E−04 |
| A16 = | — | — | — | 3.1404E−05 | −7.4591E−05 | −3.7543E−05 |
| A18 = | — | — | — | — | — | 9.1020E−07 |

| Surface # | 14 | 15 | 16 | 17 |
|---|---|---|---|---|
| k = | −4.7444E+00 | −1.6543E+00 | −7.9349E+00 | −3.1704E+00 |
| A4 = | 3.3176E−02 | 1.2642E−01 | −1.4513E−01 | −1.2164E−01 |
| A6 = | −1.8207E−02 | −9.0338E−02 | 3.5852E−02 | 6.0297E−02 |
| A8 = | −8.9830E−03 | 2.5988E−02 | −7.7354E−03 | −2.1148E−02 |
| A10 = | 6.0965E−03 | −4.3704E−03 | 3.0236E−03 | 5.0215E−03 |
| A12 = | −2.1087E−03 | 4.7345E−04 | −8.9876E−04 | −8.0086E−04 |
| A14 = | 4.6030E−04 | −3.5566E−05 | 1.5328E−04 | 8.4170E−05 |
| A16 = | −5.2300E−05 | 1.8869E−06 | −1.4921E−05 | −5.5629E−06 |
| A18 = | 2.3052E−06 | −5.5926E−08 | 7.8371E−07 | 2.0867E−07 |
| A20 = | — | — | −1.7381E−08 | −3.3771E−09 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

7th Embodiment

| f [mm] | 3.82 | f/f1 | 0.01 |
|---|---|---|---|
| Fno | 1.67 | f/f2 | 0.74 |
| HFOV [deg.] | 47.0 | f/f4 | −0.48 |
| V6 | 37.4 | f2/f1 | 0.01 |
| V3/V4 | 1.2 | ImgH [mm] | 4.12 |
| V3 + V4 | 39.9 | TL [mm] | 6.44 |

-continued

7th Embodiment

| Vdmin | 18.4 | TL/ImgH | 1.56 |
|---|---|---|---|
| Nmax | 1.679 | TL/f | 1.68 |
| (Vi/Ni)min | 10.98 | TL/Y11 | 3.39 |
| CT1/CT3 | 2.80 | TL/EPD | 2.81 |
| CT5/CT6 | 1.65 | SL/TL | 0.82 |
| T34/CT3 | 1.98 | EPD/ImgH | 0.56 |
| T45/T34 | 0.06 | f/ImgH | 0.93 |
| T45/CT4 | 0.09 | BL/ImgH | 0.19 |
| T67/T78 | 0.04 | Yc71/Yc72 | 0.82 |
| T78/CT7 | 1.70 | f/Yc82 | 2.15 |
| (T23 + T45 + T67)/(T34 + T78) | 0.08 | V1/N1 | 23.91 |
| f/R15 | 2.20 | V2/N2 | 36.30 |
| f/R16 | 3.73 | V3/N3 | 13.01 |
| |f/R1| + |f/R2| | 0.80 | V4/N4 | 10.98 |
| f/R1 − f/R12 | −0.62 | V5/N5 | 36.26 |
| (R3 + R4)/(R3 − R4) | −0.82 | V6/N6 | 23.91 |

-continued

| 7th Embodiment | | | |
|---|---|---|---|
| (R5 − R6)/(R5 + R6) | 0.06 | V7/N7 | 36.26 |
| (R13 − R14)/(R13 + R14) | −0.36 | V8/N8 | 23.91 |
| (R15 + R16)/(R15 − R16) | 3.87 | — | — |

8th Embodiment

Figure 15:
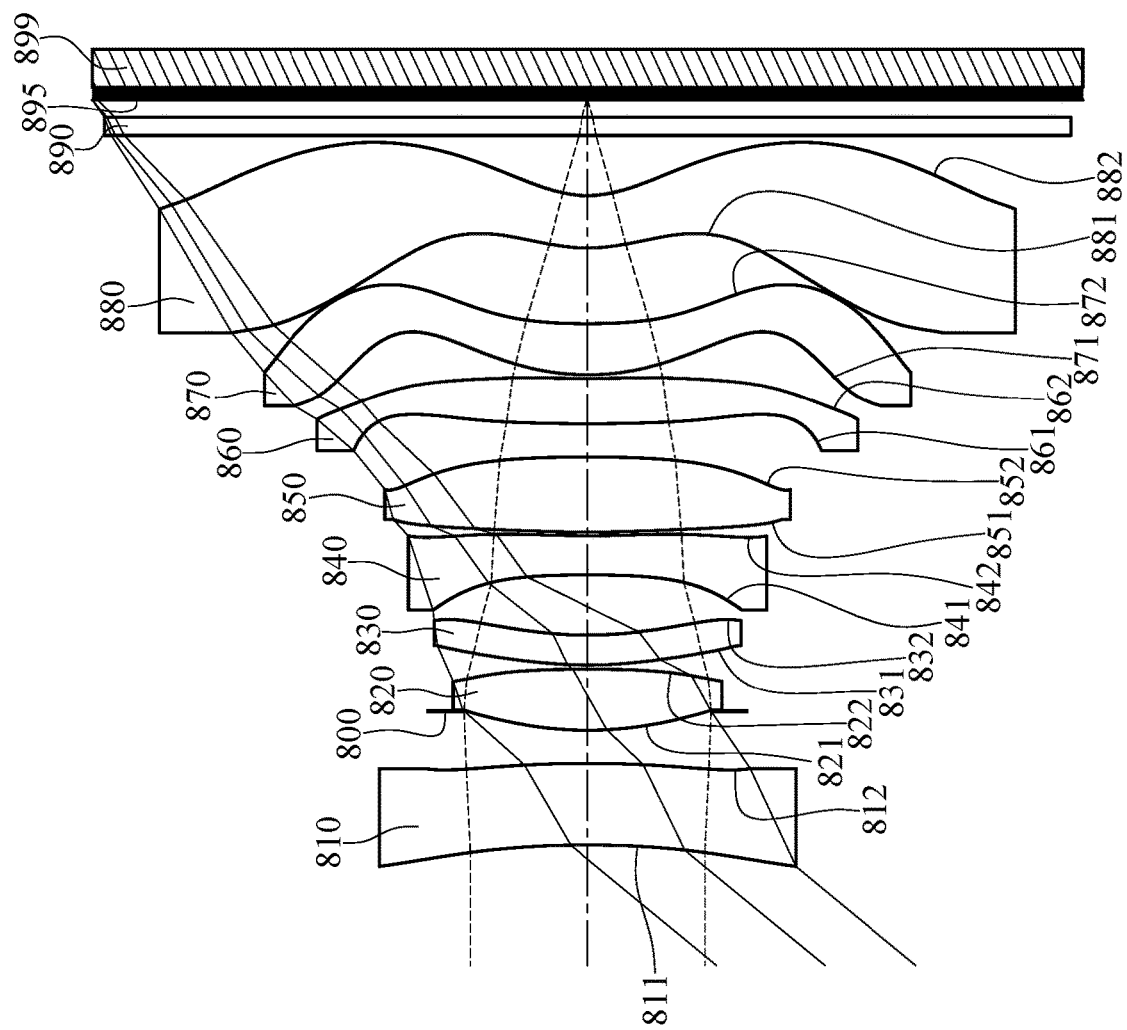
FIG. 15 is a schematic view of an image capturing unit according to the 8th embodiment of the present disclosure.
Figure 16:
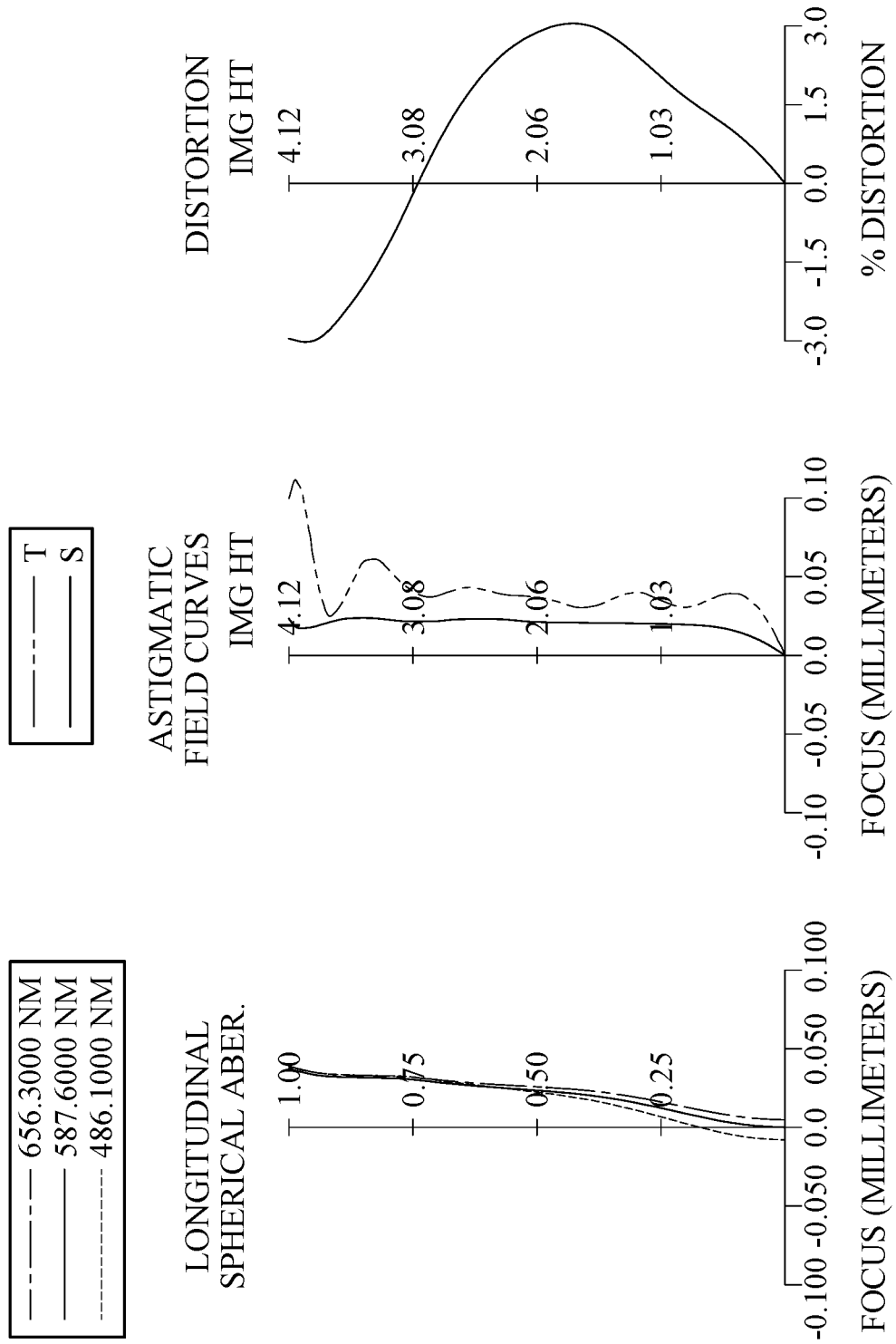
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens system (its reference numeral is omitted) of the present disclosure and an image sensor 899. The optical imaging lens system includes, in order from an object side to an image side along an optical path, a first lens element 810, an aperture stop 800, a second lens element 820, a third lens element 830, a fourth lens element 840, a fifth lens element 850, a sixth lens element 860, a seventh lens element 870, an eighth lens element 880, a filter 890 and an image surface 895. The optical imaging lens system includes eight lens elements (810, 820, 830, 840, 850, 860, 870 and 880) with no additional lens element disposed between each of the adjacent eight lens elements.

The first lens element 810 with negative refractive power has an object-side surface 811 being concave in a paraxial region thereof and an image-side surface 812 being convex in a paraxial region thereof. The first lens element 810 is made of plastic material and has the object-side surface 811 and the image-side surface 812 being both aspheric. The object-side surface 811 of the first lens element 810 has two inflection points. The image-side surface 812 of the first lens element 810 has one inflection point.

The second lens element 820 with positive refractive power has an object-side surface 821 being convex in a paraxial region thereof and an image-side surface 822 being convex in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric.

The seventh lens element 870 with positive refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has at least one inflection point. The image-side surface 872 of the seventh lens element 870 has at least one inflection point. The object-side surface 871 of the seventh lens element 870 has at least one critical point in an off-axis region thereof. The image-side surface 872 of the seventh lens element 870 has at least one convex critical point in an off-axis region thereof.

The eighth lens element 880 with negative refractive power has an object-side surface 881 being convex in a paraxial region thereof and an image-side surface 882 being concave in a paraxial region thereof. The eighth lens element 880 is made of plastic material and has the object-side surface 881 and the image-side surface 882 being both aspheric. The image-side surface 882 of the eighth lens element 880 has at least one critical point in an off-axis region thereof.

The filter 890 is made of glass material and located between the eighth lens element 880 and the image surface 895, and will not affect the focal length of the optical imaging lens system. The image sensor 899 is disposed on or near the image surface 895 of the optical imaging lens system.

In this embodiment, the eight lens elements of the optical imaging lens system are all made of plastic material, an absolute value of a focal length of the second lens element 820 is a minimum among absolute values of focal lengths of each of all lens elements of the optical imaging lens system, an axial distance between the seventh lens element 870 and the eighth lens element 880 is a maximum among axial distances between each of all adjacent lens elements of the optical imaging lens system, and a maximum effective radius of the object-side surface 821 of the second lens element 820 is a minimum among maximum effective radii of all lens surfaces of the optical imaging lens system.

The detailed optical data of the 8th embodiment are shown in Table 15 and the aspheric surface data are shown in Table 16 below.

TABLE 15

8th Embodiment
f = 3.47 mm, Fno = 1.78, HFOV = 50.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −8.461 | (ASP) | 0.680 | Plastic | 1.566 | 37.4 | −100.31 |
| 2 | | −10.231 | (ASP) | 0.433 | | | | |
| 3 | Ape. Stop | Plano | | −0.159 | | | | |
| 4 | Lens 2 | 2.964 | (ASP) | 0.512 | Plastic | 1.545 | 56.1 | 4.70 |
| 5 | | −17.744 | (ASP) | 0.035 | | | | |

TABLE 15-continued

8th Embodiment
f = 3.47 mm, Fno = 1.78, HFOV = 50.5 deg.

| Surface # | | Curvature Radius | | Thickness | Material | Index | Abbe # | Focal Length |
|---|---|---|---|---|---|---|---|---|
| 6 | Lens 3 | 3.517 | (ASP) | 0.250 | Plastic | 1.650 | 21.5 | −46557.35 |
| 7 | | 3.418 | (ASP) | 0.498 | | | | |
| 8 | Lens 4 | −11.351 | (ASP) | 0.325 | Plastic | 1.680 | 18.0 | −7.48 |
| 9 | | 9.328 | (ASP) | 0.030 | | | | |
| 10 | Lens 5 | 10.011 | (ASP) | 0.625 | Plastic | 1.544 | 56.0 | 11.00 |
| 11 | | −14.542 | (ASP) | 0.276 | | | | |
| 12 | Lens 6 | 15.660 | (ASP) | 0.380 | Plastic | 1.566 | 37.4 | −63.72 |
| 13 | | 10.824 | (ASP) | 0.030 | | | | |
| 14 | Lens 7 | 1.977 | (ASP) | 0.426 | Plastic | 1.544 | 56.0 | 5.34 |
| 15 | | 5.712 | (ASP) | 0.627 | | | | |
| 16 | Lens 8 | 1.416 | (ASP) | 0.436 | Plastic | 1.566 | 37.4 | −6.50 |
| 17 | | 0.909 | (ASP) | 0.500 | | | | |
| 18 | Filter | Plano | | 0.150 | Glass | 1.517 | 64.2 | — |
| 19 | | Plano | | 0.149 | | | | |
| 20 | Image | Plano | | — | | | | |

Note:
Reference wavelength is 587.6 nm (d-line).

TABLE 16

Aspheric Coefficients

| Surface # | 1 | 2 | 4 | 5 | 6 | 7 |
|---|---|---|---|---|---|---|
| k = | 1.5582E+01 | −1.0062E+01 | −7.1176E−01 | 4.6646E+01 | −2.8639E+01 | −9.9328E+00 |
| A4 = | −6.8788E−03 | −1.1200E−02 | −1.6883E−02 | −1.0877E−01 | 2.1205E−03 | 2.1165E−02 |
| A6 = | 4.4351E−03 | 1.4641E−02 | 7.7346E−03 | 1.2442E−01 | −1.3845E−04 | −7.7938E−02 |
| A8 = | 4.4148E−05 | −4.1458E−03 | −1.7664E−02 | −1.3656E−01 | 2.8024E−02 | 1.4478E−01 |
| A10 = | −1.8196E−04 | 2.5860E−03 | 2.4638E−02 | 1.0770E−01 | −6.4700E−02 | −2.0035E−01 |
| A12 = | 8.8033E−05 | −9.3130E−04 | −1.7154E−02 | −4.8243E−02 | 7.0682E−02 | 1.6096E−01 |
| A14 = | −1.4045E−05 | 2.7941E−04 | 6.3238E−03 | 7.9817E−03 | −3.7335E−02 | −7.0683E−02 |
| A16 = | — | — | — | 2.0199E−03 | 7.5950E−03 | 1.2731E−02 |

| Surface # | 8 | 9 | 10 | 11 | 12 | 13 |
|---|---|---|---|---|---|---|
| k = | 4.9694E+01 | −1.3290E+00 | −5.2376E+01 | −1.0000E+00 | 7.2189E+00 | −1.0000E+00 |
| A4 = | −7.6273E−02 | −5.8659E−02 | −1.6540E−02 | −4.2907E−02 | −2.2600E−02 | −1.2716E−01 |
| A6 = | −9.9727E−03 | −2.0715E−02 | −1.2309E−02 | 2.9080E−02 | 7.4967E−02 | 1.0936E−01 |
| A8 = | 1.9562E−02 | 5.6084E−02 | 3.2563E−02 | −2.8823E−02 | −6.8288E−02 | −4.7937E−02 |
| A10 = | −1.7794E−02 | −3.9480E−02 | −2.1801E−02 | 1.0475E−02 | 3.1002E−02 | 7.2511E−03 |
| A12 = | 7.2300E−03 | 1.3940E−02 | 6.3681E−03 | 1.1906E−03 | −8.4877E−03 | 1.3625E−03 |
| A14 = | −6.4818E−04 | −1.9083E−03 | −6.6584E−04 | −1.7091E−03 | 1.3386E−03 | −6.9458E−04 |
| A16 = | — | — | — | 3.2354E−04 | −9.7368E−05 | 1.0200E−04 |
| A18 = | — | — | — | — | — | −5.4408E−06 |

| Surface # | 14 | 15 | 16 | 17 |
|---|---|---|---|---|
| k = | −4.0485E+00 | −1.2611E+00 | −7.6272E+00 | −2.9375E+00 |
| A4 = | 3.0627E−02 | 1.1572E−01 | −1.0770E−01 | −1.1892E−01 |
| A6 = | −7.2160E−04 | −3.8430E−02 | −3.0177E−02 | 5.0832E−02 |
| A8 = | −1.7997E−02 | −1.8001E−02 | 3.1344E−02 | −1.5441E−02 |
| A10 = | 6.0631E−03 | 1.3403E−02 | −8.9974E−03 | 3.2360E−03 |
| A12 = | −1.2326E−03 | −3.6276E−03 | 1.2260E−03 | −4.6287E−04 |
| A14 = | 2.4564E−04 | 5.1685E−04 | −6.4354E−05 | 4.4384E−05 |
| A16 = | −3.1693E−05 | −3.8667E−05 | −2.8453E−06 | −2.7278E−06 |
| A18 = | 1.5922E−06 | 1.2030E−06 | 4.9810E−07 | 9.7037E−08 |
| A20 = | — | — | −1.7075E−08 | −1.5170E−09 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.47 | f/f1 | −0.03 |
| Fno | 1.78 | f/f2 | 0.74 |
| HFOV [deg.] | 50.5 | f/f4 | −0.46 |
| V6 | 37.4 | f2/f1 | −0.05 |
| V3/V4 | 1.2 | ImgH [mm] | 4.12 |
| V3 + V4 | 39.5 | TL [mm] | 6.20 |
| Vdmin | 18.0 | TL/ImgH | 1.51 |

-continued

| 8th Embodiment | | | |
|---|---|---|---|
| Nmax | 1.680 | TL/f | 1.79 |
| (Vi/Ni)min | 10.71 | TL/Y11 | 3.58 |
| CT1/CT3 | 2.72 | TL/EPD | 3.18 |
| CT5/CT6 | 1.64 | SL/TL | 0.82 |
| T34/CT3 | 1.99 | EPD/ImgH | 0.47 |
| T45/T34 | 0.06 | f/ImgH | 0.84 |
| T45/CT4 | 0.09 | BL/ImgH | 0.19 |
| T67/T78 | 0.05 | Yc71/Yc72 | 0.88 |
| T78/CT7 | 1.47 | f/Yc82 | 1.96 |
| (T23 + T45 + T67)/(T34 + T78) | 0.08 | V1/N1 | 23.91 |
| f/R15 | 2.45 | V2/N2 | 36.30 |
| f/R16 | 3.82 | V3/N3 | 13.01 |
| \|f/R1\| + \|f/R2\| | 0.75 | V4/N4 | 10.71 |
| f/R1 − f/R12 | −0.73 | V5/N5 | 36.26 |
| (R3 + R4)/(R3 − R4) | −0.71 | V6/N6 | 23.91 |
| (R5 − R6)/(R5 + R6) | 0.01 | V7/N7 | 36.26 |
| (R13 − R14)/(R13 + R14) | −0.49 | V8/N8 | 23.91 |
| (R15 + R16)/(R15 − R16) | 4.58 | — | — |

9th Embodiment

Figure 17:
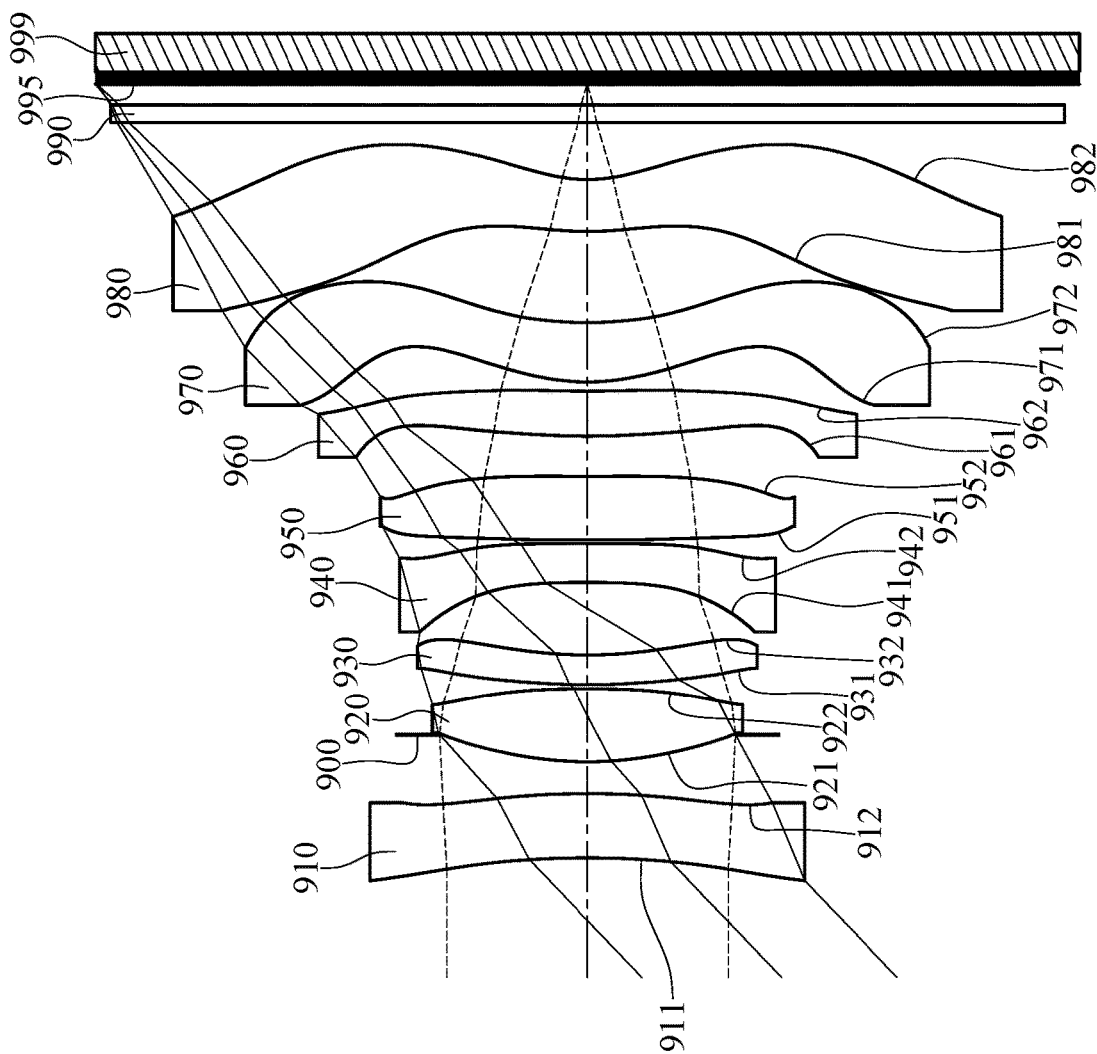
FIG. 17 is a schematic view of an image capturing unit according to the 9th embodiment of the present disclosure.
Figure 18:
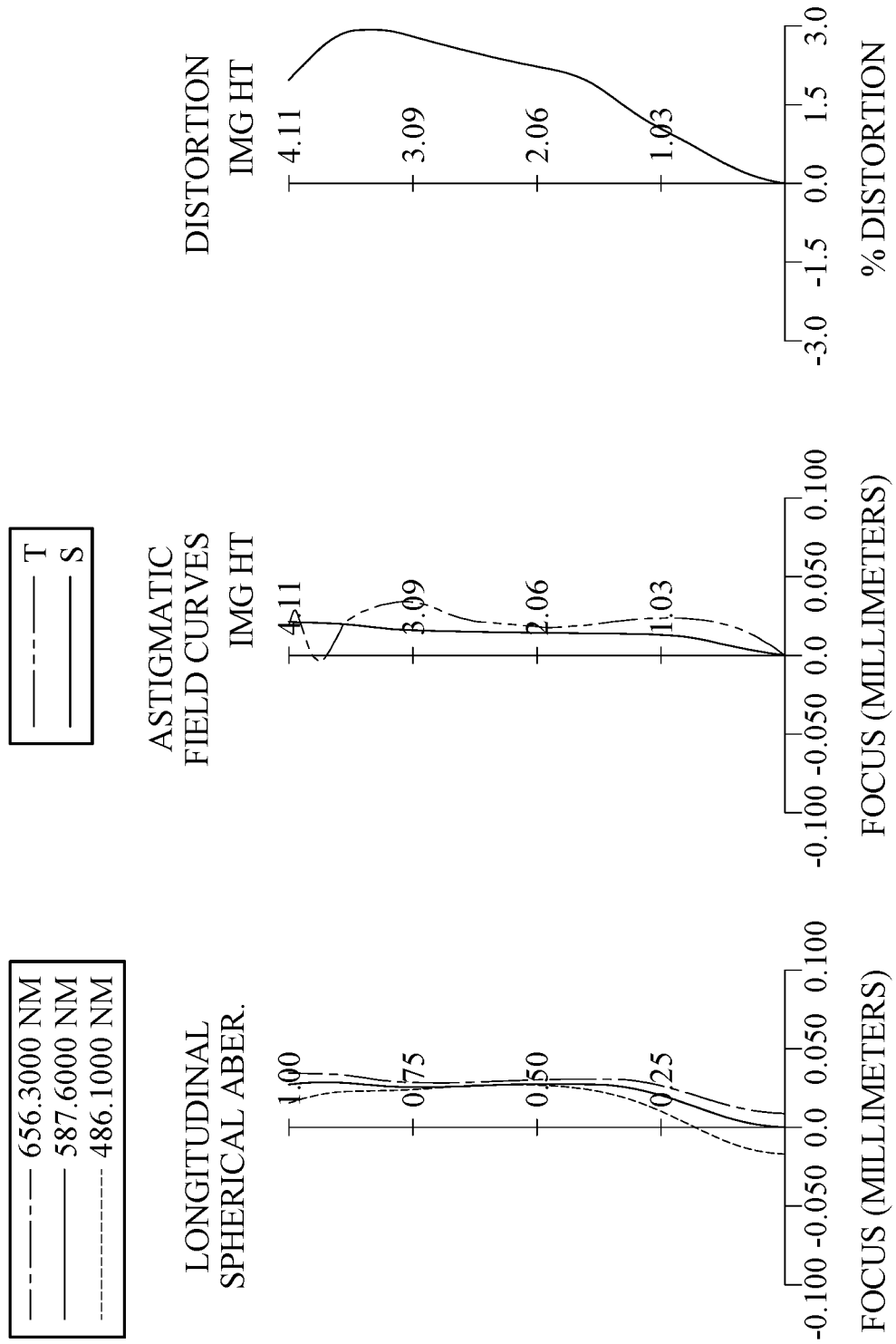
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens system (its reference numeral is omitted) of the present disclosure and an image sensor 999. The optical imaging lens system includes, in order from an object side to an image side along an optical path, a first lens element 910, an aperture stop 900, a second lens element 920, a third lens element 930, a fourth lens element 940, a fifth lens element 950, a sixth lens element 960, a seventh lens element 970, an eighth lens element 980, a filter 990 and an image surface 995. The optical imaging lens system includes eight lens elements (910, 920, 930, 940, 950, 960, 970 and 980) with no additional lens element disposed between each of the adjacent eight lens elements.

The first lens element 910 with positive refractive power has an object-side surface 911 being concave in a paraxial region thereof and an image-side surface 912 being convex in a paraxial region thereof. The first lens element 910 is made of plastic material and has the object-side surface 911 and the image-side surface 912 being both aspheric. The object-side surface 911 of the first lens element 910 has one inflection point. The image-side surface 912 of the first lens element 910 has one inflection point.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with negative refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric.

The sixth lens element 960 with positive refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric.

The seventh lens element 970 with positive refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both aspheric. The object-side surface 971 of the seventh lens element 970 has at least one inflection point. The image-side surface 972 of the seventh lens element 970 has at least one inflection point. The object-side surface 971 of the seventh lens element 970 has at least one critical point in an off-axis region thereof. The image-side surface 972 of the seventh lens element 970 has at least one convex critical point in an off-axis region thereof.

The eighth lens element 980 with negative refractive power has an object-side surface 981 being convex in a paraxial region thereof and an image-side surface 982 being concave in a paraxial region thereof. The eighth lens element 980 is made of plastic material and has the object-side surface 981 and the image-side surface 982 being both aspheric. The image-side surface 982 of the eighth lens element 980 has at least one critical point in an off-axis region thereof.

The filter 990 is made of glass material and located between the eighth lens element 980 and the image surface 995, and will not affect the focal length of the optical imaging lens system. The image sensor 999 is disposed on or near the image surface 995 of the optical imaging lens system.

In this embodiment, the eight lens elements of the optical imaging lens system are all made of plastic material, an absolute value of a focal length of the second lens element 920 is a minimum among absolute values of focal lengths of each of all lens elements of the optical imaging lens system, an axial distance between the seventh lens element 970 and the eighth lens element 980 is a maximum among axial distances between each of all adjacent lens elements of the optical imaging lens system, and a maximum effective radius of the object-side surface 921 of the second lens element 920 is a minimum among maximum effective radii of all lens surfaces of the optical imaging lens system.

The detailed optical data of the 9th embodiment are shown in Table 17 and the aspheric surface data are shown in Table 18 below.

TABLE 17

9th Embodiment
f = 4.19 mm, Fno = 1.78, HFOV = 43.8 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −8.276 | (ASP) | 0.537 | Plastic | 1.566 | 37.4 | 86.17 |
| 2 |  | −7.242 | (ASP) | 0.494 |  |  |  |  |
| 3 | Ape. Stop | Plano |  | −0.228 |  |  |  |  |
| 4 | Lens 2 | 3.054 | (ASP) | 0.612 | Plastic | 1.545 | 56.1 | 4.62 |
| 5 |  | −13.321 | (ASP) | 0.036 |  |  |  |  |
| 6 | Lens 3 | 4.941 | (ASP) | 0.250 | Plastic | 1.650 | 21.5 | −23.99 |
| 7 |  | 3.678 | (ASP) | 0.607 |  |  |  |  |
| 8 | Lens 4 | −9.023 | (ASP) | 0.325 | Plastic | 1.680 | 18.0 | −16.45 |
| 9 |  | −47.322 | (ASP) | 0.030 |  |  |  |  |
| 10 | Lens 5 | 85.797 | (ASP) | 0.532 | Plastic | 1.544 | 56.0 | −83.91 |
| 11 |  | 29.732 | (ASP) | 0.335 |  |  |  |  |
| 12 | Lens 6 | 6.686 | (ASP) | 0.380 | Plastic | 1.566 | 37.4 | 50.10 |
| 13 |  | 8.569 | (ASP) | 0.078 |  |  |  |  |
| 14 | Lens 7 | 1.836 | (ASP) | 0.497 | Plastic | 1.544 | 56.0 | 6.01 |
| 15 |  | 3.792 | (ASP) | 0.760 |  |  |  |  |
| 16 | Lens 8 | 2.649 | (ASP) | 0.435 | Plastic | 1.566 | 37.4 | −4.69 |
| 17 |  | 1.248 | (ASP) | 0.478 |  |  |  |  |
| 18 | Filter | Plano |  | 0.150 | Glass | 1.517 | 64.2 | — |
| 19 |  | Plano |  | 0.174 |  |  |  |  |
| 20 | Image | Plano |  | — |  |  |  |  |

Note:
Reference wavelength is 587.6 nm (d-line).

TABLE 18

Aspheric Coefficients

| Surface # | 1 | 2 | 4 | 5 | 6 | 7 |
|---|---|---|---|---|---|---|
| k = | 1.4720E+01 | −5.3696E+00 | −8.6074E−01 | 1.6416E+01 | −4.1071E+01 | −9.5417E+00 |
| A4 = | −1.0523E−02 | −1.5285E−02 | −2.1011E−02 | −1.3508E−01 | −6.9889E−02 | −4.8414E−03 |
| A6 = | 6.6134E−03 | 2.0039E−02 | 2.2012E−02 | 2.2754E−01 | 1.6186E−01 | −2.0646E−02 |
| A8 = | −1.0543E−04 | −7.2374E−03 | −3.1401E−02 | −2.7403E−01 | −1.8202E−01 | 4.9710E−02 |
| A10 = | −1.2616E−04 | 2.7719E−03 | 3.2410E−02 | 2.1988E−01 | 1.4227E−01 | −5.7916E−02 |
| A12 = | −2.3705E−06 | −6.7717E−04 | −1.7702E−02 | −1.0874E−01 | −7.6880E−02 | 3.0752E−02 |
| A14 = | 4.0792E−06 | 9.7495E−05 | 4.1894E−03 | 2.9077E−02 | 2.5012E−02 | −8.6134E−03 |
| A16 = | — | — | — | −2.8193E−03 | −3.6300E−03 | 9.3753E−04 |

| Surface # | 8 | 9 | 10 | 11 | 12 | 13 |
|---|---|---|---|---|---|---|
| k = | 3.5188E+01 | −1.0000E+00 | 5.0000E+01 | −1.0000E+00 | −8.0000E+01 | −1.0000E+00 |
| A4 = | −7.1168E−02 | 1.9072E−02 | 5.8111E−02 | −7.7130E−02 | −7.2245E−03 | −1.3652E−01 |
| A6 = | −2.7534E−02 | −1.4909E−01 | −1.0684E−01 | 5.3060E−02 | 2.2355E−02 | 1.2489E−01 |
| A8 = | 1.4163E−02 | 1.4745E−01 | 9.8414E−02 | −2.8807E−02 | −1.5924E−02 | −6.6963E−02 |
| A10 = | 1.0882E−02 | −7.4766E−02 | −4.9365E−02 | 6.5403E−03 | 3.7940E−03 | 2.1659E−02 |
| A12 = | −8.3422E−03 | 2.1834E−02 | 1.2662E−02 | 1.2520E−03 | −2.0520E−04 | −4.5070E−03 |
| A14 = | 1.5862E−03 | −2.7419E−03 | −1.2531E−03 | −1.1499E−03 | −1.0036E−04 | 6.0105E−04 |
| A16 = | — | — | — | 2.1125E−04 | 1.4010E−05 | −4.5512E−05 |
| A18 = | — | — | — | — | — | 1.3954E−06 |

| Surface # | 14 | 15 | 16 | 17 |
|---|---|---|---|---|
| k = | −5.9478E+00 | 2.5280E−03 | −6.1312E+00 | −4.0669E+00 |
| A4 = | 1.6323E−02 | 8.5469E−02 | −2.1803E−01 | −1.2033E−01 |
| A6 = | −1.3851E−02 | −7.5417E−02 | 1.2210E−01 | 6.5486E−02 |
| A8 = | −6.6507E−03 | 2.5761E−02 | −5.5031E−02 | −2.5072E−02 |
| A10 = | 4.4145E−03 | −5.6280E−03 | 1.8354E−02 | 6.2543E−03 |
| A12 = | −1.3569E−03 | 8.7387E−04 | −4.0181E−03 | −1.0141E−03 |
| A14 = | 2.5903E−04 | −9.4673E−05 | 5.5479E−04 | 1.0621E−04 |
| A16 = | −2.5890E−05 | 6.2401E−06 | −4.6628E−05 | −6.9256E−06 |
| A18 = | 9.8998E−07 | −1.8325E−07 | 2.1843E−06 | 2.5548E−07 |
| A20 = | — | — | −4.3840E−08 | −4.0696E−09 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

9th Embodiment

| | | | |
|---|---|---|---|
| f [mm] | 4.19 | f/f1 | 0.05 |
| Fno | 1.78 | f/f2 | 0.91 |
| HFOV [deg.] | 43.8 | f/f4 | −0.25 |
| V6 | 37.4 | f2/f1 | 0.05 |
| V3/V4 | 1.2 | ImgH [mm] | 4.12 |
| V3 + V4 | 39.5 | TL [mm] | 6.48 |
| Vdmin | 18.0 | TL/ImgH | 1.58 |
| Nmax | 1.680 | TL/f | 1.55 |
| (Vi/Ni)min | 10.71 | TL/Y11 | 3.57 |
| CT1/CT3 | 2.15 | TL/EPD | 2.75 |
| CT5/CT6 | 1.40 | SL/TL | 0.84 |
| T34/CT3 | 2.43 | EPD/ImgH | 0.57 |
| T45/T34 | 0.05 | f/ImgH | 1.02 |
| T45/CT4 | 0.09 | BL/ImgH | 0.19 |
| T67/T78 | 0.10 | Yc71/Yc72 | 0.78 |
| T78/CT7 | 1.53 | f/Yc82 | 2.63 |
| (T23 + T45 + T67)/(T34 + T78) | 0.11 | V1/N1 | 23.91 |
| f/R15 | 1.58 | V2/N2 | 36.30 |
| f/R16 | 3.36 | V3/N3 | 13.01 |
| |f/R1| + |f/R2| | 1.09 | V4/N4 | 10.71 |
| f/R1 − f/R12 | −1.00 | V5/N5 | 36.26 |
| (R3 + R4)/(R3 − R4) | −0.63 | V6/N6 | 23.91 |
| (R5 − R6)/(R5 + R6) | 0.15 | V7/N7 | 36.26 |
| (R13 − R14)/(R13 + R14) | −0.35 | V8/N8 | 23.91 |
| (R15 + R16)/(R15 − R16) | 2.78 | — | — |

10th Embodiment

Figure 19:
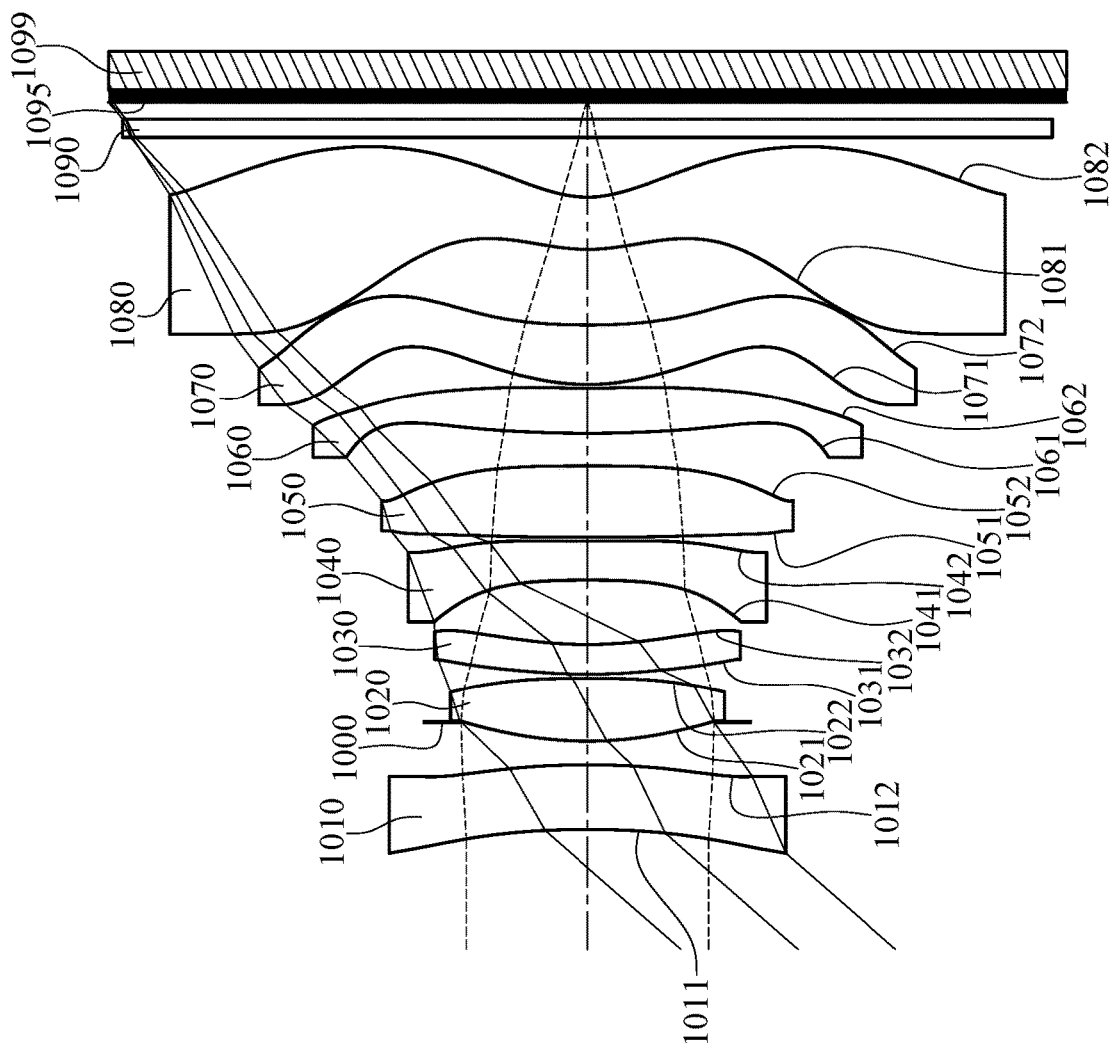
FIG. 19 is a schematic view of an image capturing unit according to the 10th embodiment of the present disclosure.
Figure 20:
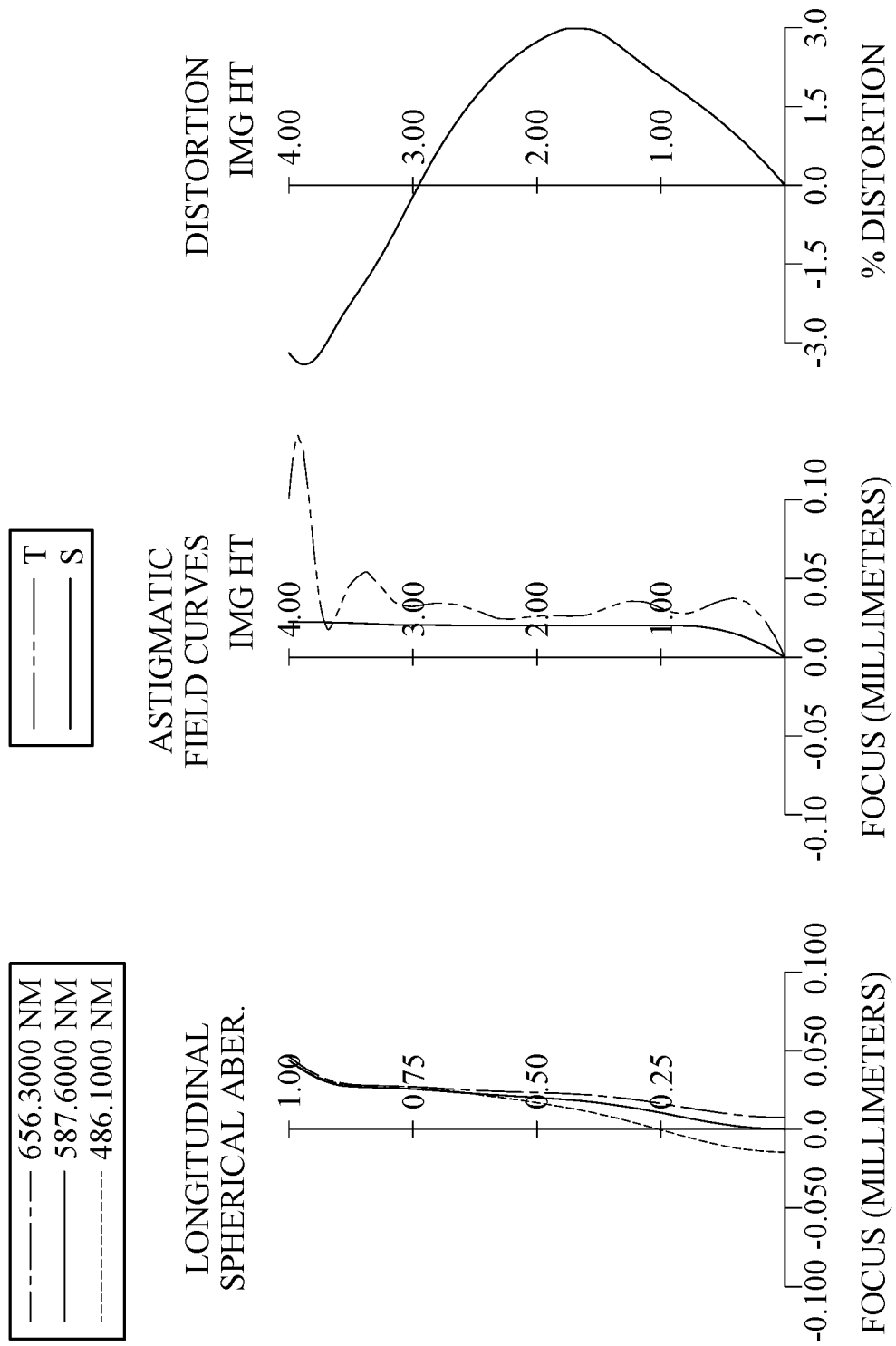
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens system (its reference numeral is omitted) of the present disclosure and an image sensor 1099. The optical imaging lens system includes, in order from an object side to an image side along an optical path, a first lens element 1010, an aperture stop 1000, a second lens element 1020, a third lens element 1030, a fourth lens element 1040, a fifth lens element 1050, a sixth lens element 1060, a seventh lens element 1070, an eighth lens element 1080, a filter 1090 and an image surface 1095. The optical imaging lens system includes eight lens elements (1010, 1020, 1030, 1040, 1050, 1060, 1070 and 1080) with no additional lens element disposed between each of the adjacent eight lens elements.

The first lens element 1010 with positive refractive power has an object-side surface 1011 being concave in a paraxial region thereof and an image-side surface 1012 being convex in a paraxial region thereof. The first lens element 1010 is made of plastic material and has the object-side surface 1011 and the image-side surface 1012 being both aspheric. The object-side surface 1011 of the first lens element 1010 has two inflection points. The image-side surface 1012 of the first lens element 1010 has one inflection point.

The second lens element 1020 with positive refractive power has an object-side surface 1021 being convex in a paraxial region thereof and an image-side surface 1022 being convex in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with negative refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with positive refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric.

The sixth lens element 1060 with negative refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric.

The seventh lens element 1070 with positive refractive power has an object-side surface 1071 being convex in a paraxial region thereof and an image-side surface 1072 being concave in a paraxial region thereof. The seventh lens element 1070 is made of plastic material and has the object-side surface 1071 and the image-side surface 1072 being both aspheric. The object-side surface 1071 of the seventh lens element 1070 has at least one inflection point. The image-side surface 1072 of the seventh lens element 1070 has at least one inflection point. The object-side surface 1071 of the seventh lens element 1070 has at least one critical point in an off-axis region thereof. The image-side surface 1072 of the seventh lens element 1070 has at least one convex critical point in an off-axis region thereof.

The eighth lens element 1080 with negative refractive power has an object-side surface 1081 being convex in a paraxial region thereof and an image-side surface 1082 being concave in a paraxial region thereof. The eighth lens element 1080 is made of plastic material and has the object-side surface 1081 and the image-side surface 1082 being both aspheric. The image-side surface 1082 of the eighth lens element 1080 has at least one critical point in an off-axis region thereof.

The filter 1090 is made of glass material and located between the eighth lens element 1080 and the image surface 1095, and will not affect the focal length of the optical imaging lens system. The image sensor 1099 is disposed on or near the image surface 1095 of the optical imaging lens system.

In this embodiment, the eight lens elements of the optical imaging lens system are all made of plastic material, an absolute value of a focal length of the second lens element 1020 is a minimum among absolute values of focal lengths of each of all lens elements of the optical imaging lens system, an axial distance between the seventh lens element 1070 and the eighth lens element 1080 is a maximum among axial distances between each of all adjacent lens elements of the optical imaging lens system, and a maximum effective radius of the object-side surface 1021 of the second lens element 1020 is a minimum among maximum effective radii of all lens surfaces of the optical imaging lens system.

The detailed optical data of the 10th embodiment are shown in Table 19 and the aspheric surface data are shown in Table 20 below.

TABLE 19

10th Embodiment
f = 3.60 mm, Fno = 1.78, HFOV = 48.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −7.904 | (ASP) | 0.540 | Plastic | 1.566 | 37.4 | 93.18 |
| 2 | | −7.044 | (ASP) | 0.359 | | | | |
| 3 | Ape. Stop | Plano | | −0.162 | | | | |
| 4 | Lens 2 | 3.088 | (ASP) | 0.528 | Plastic | 1.545 | 56.1 | 4.67 |
| 5 | | −13.570 | (ASP) | 0.035 | | | | |
| 6 | Lens 3 | 4.455 | (ASP) | 0.250 | Plastic | 1.650 | 21.5 | −33.40 |
| 7 | | 3.615 | (ASP) | 0.538 | | | | |
| 8 | Lens 4 | −8.277 | (ASP) | 0.325 | Plastic | 1.680 | 18.0 | −13.55 |
| 9 | | −82.555 | (ASP) | 0.030 | | | | |
| 10 | Lens 5 | −818.657 | (ASP) | 0.596 | Plastic | 1.544 | 56.0 | 110.50 |
| 11 | | −56.016 | (ASP) | 0.274 | | | | |
| 12 | Lens 6 | 10.294 | (ASP) | 0.380 | Plastic | 1.566 | 37.4 | −599.84 |
| 13 | | 9.857 | (ASP) | 0.030 | | | | |
| 14 | Lens 7 | 1.866 | (ASP) | 0.496 | Plastic | 1.544 | 56.0 | 4.83 |
| 15 | | 5.829 | (ASP) | 0.632 | | | | |
| 16 | Lens 8 | 1.553 | (ASP) | 0.435 | Plastic | 1.566 | 37.4 | −5.61 |
| 17 | | 0.937 | (ASP) | 0.500 | | | | |
| 18 | Filter | Plano | | 0.150 | Glass | 1.517 | 64.2 | — |
| 19 | | Plano | | 0.147 | | | | |
| 20 | Image | Plano | | — | | | | |

Note:
Reference wavelength is 587.6 nm (d-line).

TABLE 20

Aspheric Coefficients

| Surface # | 1 | 2 | 4 | 5 | 6 | 7 |
|---|---|---|---|---|---|---|
| k = | 1.5104E+01 | −2.2316E+00 | −8.2269E−01 | 3.9079E+01 | −3.7990E+01 | −1.1586E+01 |
| A4 = | −1.5846E−02 | −1.9604E−02 | −1.5068E−02 | −9.8789E−02 | −3.8806E−02 | −5.8723E−03 |
| A6 = | 7.0451E−03 | 1.7390E−02 | 1.7632E−02 | 1.3397E−01 | 5.9727E−02 | −3.5465E−02 |
| A8 = | 5.2793E−04 | 7.9197E−04 | −4.2355E−02 | −1.7133E−01 | −7.8633E−03 | 9.8712E−02 |
| A10 = | −2.8741E−04 | −4.2811E−03 | 5.4787E−02 | 1.6591E−01 | −6.0499E−02 | −1.4752E−01 |
| A12 = | 7.7583E−05 | 2.7595E−03 | −3.4726E−02 | −1.0747E−01 | 8.1064E−02 | 1.1836E−01 |
| A14 = | −1.3416E−05 | −5.1341E−04 | 8.9272E−03 | 3.9828E−02 | −4.5412E−02 | −5.1454E−02 |
| A16 = | — | — | — | −5.9364E−03 | 9.5279E−03 | 9.0198E−03 |

| Surface # | 8 | 9 | 10 | 11 | 12 | 13 |
|---|---|---|---|---|---|---|
| k = | 3.5344E+01 | −1.0000E+00 | −8.0000E+01 | −1.0000E+00 | −5.8106E+01 | −1.0000E+00 |
| A4 = | −6.3336E−02 | 4.3092E−02 | 7.4056E−02 | −8.9192E−02 | −1.8584E−02 | −1.2913E−01 |
| A6 = | −6.5283E−02 | −1.7992E−01 | −1.2717E−01 | 7.4391E−02 | 4.2856E−02 | 1.0091E−01 |
| A8 = | 9.1993E−02 | 1.8448E−01 | 1.1101E−01 | −5.4891E−02 | −2.6464E−02 | −3.7706E−02 |
| A10 = | −8.3674E−02 | −1.0279E−01 | −5.2306E−02 | 2.0059E−02 | 5.0077E−03 | 2.4594E−03 |
| A12 = | 4.4462E−02 | 3.1935E−02 | 1.2372E−02 | −9.0369E−04 | 5.5971E−04 | 2.5431E−03 |
| A14 = | −8.8888E−03 | −4.0910E−03 | −1.1161E−03 | −1.4872E−03 | −3.5237E−04 | −8.3599E−04 |
| A16 = | — | — | — | 3.0784E−04 | 3.6028E−05 | 1.0587E−04 |
| A18 = | — | — | — | — | — | −5.0305E−06 |

| Surface # | 14 | 15 | 16 | 17 |
|---|---|---|---|---|
| k = | −5.5527E+00 | 8.4206E−01 | −9.3287E+00 | −3.2757E+00 |
| A4 = | −2.9402E−03 | 5.4376E−02 | −1.5659E−01 | −1.2442E−01 |
| A6 = | 2.0231E−02 | −5.1267E−03 | 2.6242E−02 | 6.3735E−02 |
| A8 = | −2.1909E−02 | −2.2490E−02 | 3.7821E−03 | −2.2636E−02 |
| A10 = | 5.1296E−03 | 1.1408E−02 | −1.9756E−03 | 5.3641E−03 |
| A12 = | −1.7553E−04 | −2.6482E−03 | 2.6114E−04 | −8.3853E−04 |
| A14 = | −7.6595E−05 | 3.3351E−04 | −1.0714E−06 | 8.5072E−05 |
| A16 = | 9.8088E−06 | −2.1970E−05 | −3.1906E−06 | −5.3727E−06 |
| A18 = | −3.5448E−07 | 5.9309E−07 | 3.1448E−07 | 1.9151E−07 |
| A20 = | — | — | −9.8467E−09 | −2.9383E−09 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

10th Embodiment

| | | | |
|---|---|---|---|
| f [mm] | 3.60 | f/f1 | 0.04 |
| Fno | 1.78 | f/f2 | 0.77 |
| HFOV [deg.] | 48.8 | f/f4 | −0.27 |
| V6 | 37.4 | f2/f1 | 0.05 |
| V3/V4 | 1.2 | ImgH [mm] | 4.00 |
| V3 + V4 | 39.5 | TL [mm] | 6.08 |
| Vdmin | 18.0 | TL/ImgH | 1.52 |
| Nmax | 1.680 | TL/f | 1.69 |
| (Vi/Ni)min | 10.71 | TL/Y11 | 3.68 |
| CT1/CT3 | 2.16 | TL/EPD | 3.01 |
| CT5/CT6 | 1.57 | SL/TL | 0.85 |
| T34/CT3 | 2.15 | EPD/ImgH | 0.51 |
| T45/T34 | 0.06 | f/ImgH | 0.90 |
| T45/CT4 | 0.09 | BL/ImgH | 0.20 |
| T67/T78 | 0.05 | Yc71/Yc72 | 0.90 |
| T78/CT7 | 1.27 | f/Yc82 | 1.98 |
| (T23 + T45 + T67)/(T34 + T78) | 0.08 | V1/N1 | 23.91 |
| f/R15 | 2.32 | V2/N2 | 36.30 |
| f/R16 | 3.84 | V3/N3 | 13.01 |
| |f/R1| + |f/R2| | 0.97 | V4/N4 | 10.71 |
| f/R1 − f/R12 | −0.82 | V5/N5 | 36.26 |
| (R3 + R4)/(R3 − R4) | −0.63 | V6/N6 | 23.91 |
| (R5 − R6)/(R5 + R6) | 0.10 | V7/N7 | 36.26 |
| (R13 − R14)/(R13 + R14) | −0.51 | V8/N8 | 23.91 |
| (R15 + R16)/(R15 − R16) | 4.05 | — | — |

11th Embodiment

Figure 21:
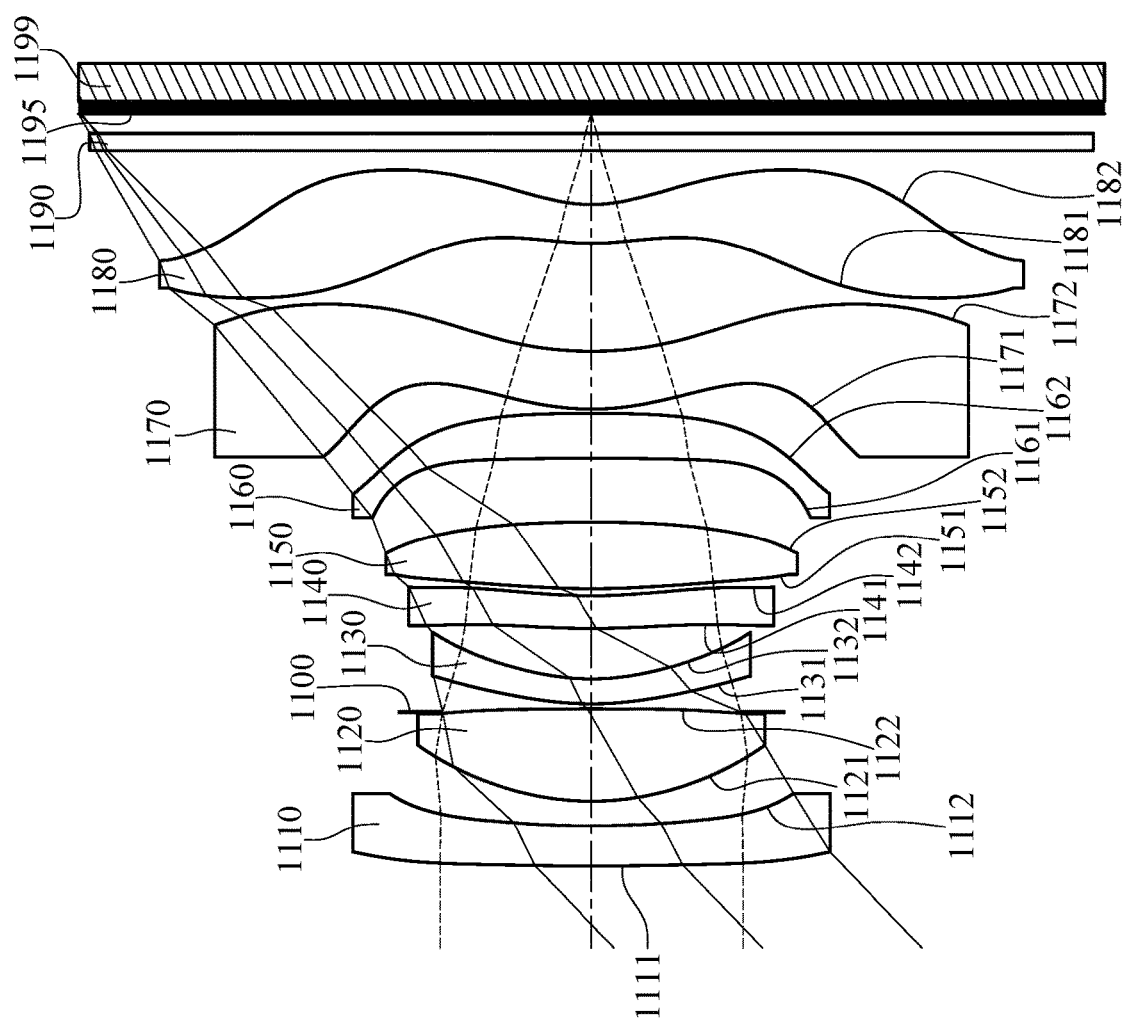
FIG. 21 is a schematic view of an image capturing unit according to the 11th embodiment of the present disclosure.
Figure 22:
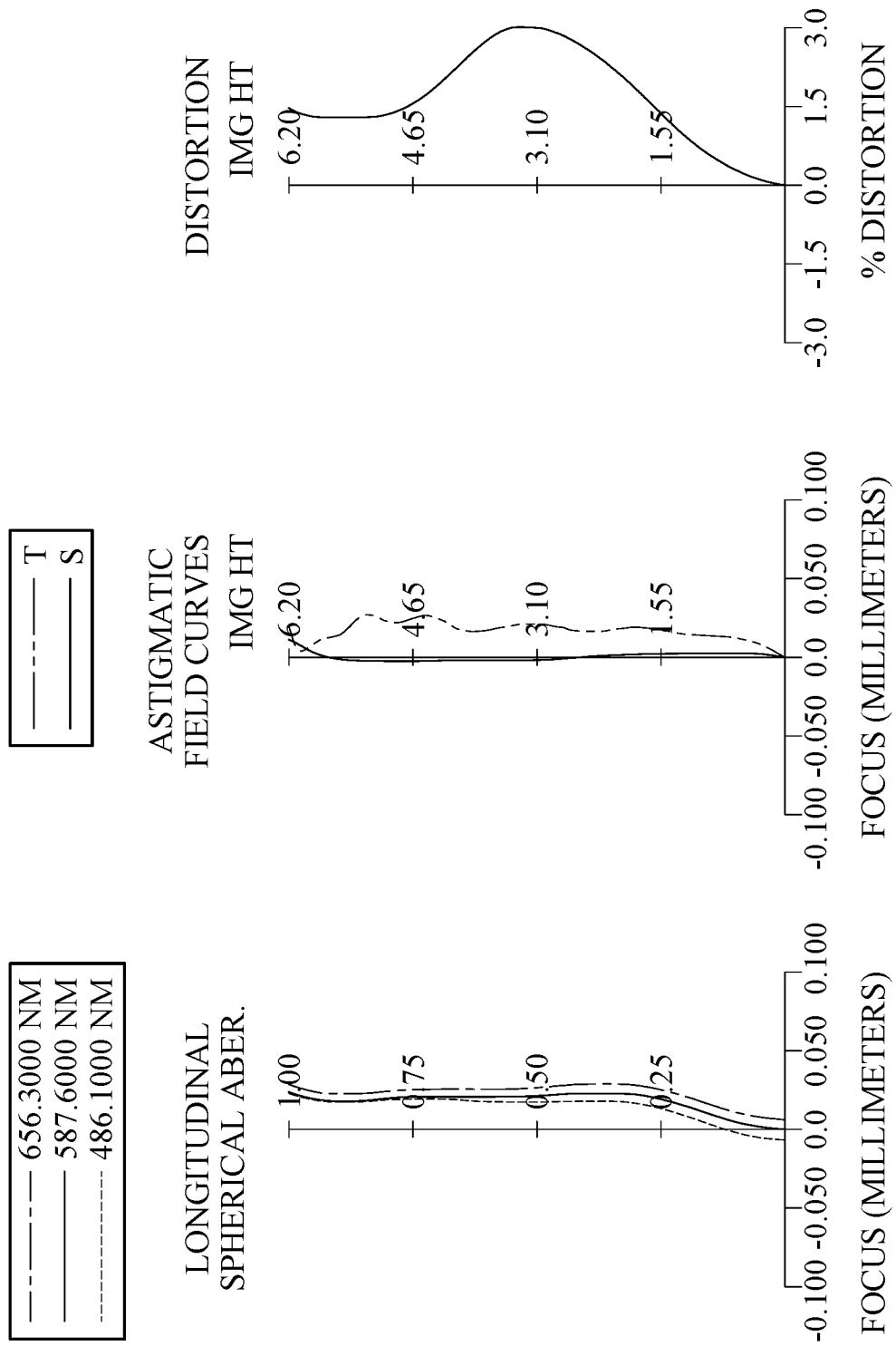
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the optical imaging lens system (its reference numeral is omitted) of the present disclosure and an image sensor 1199. The optical imaging lens system includes, in order from an object side to an image side along an optical path, a first lens element 1110, a second lens element 1120, an aperture stop 1100, a third lens element 1130, a fourth lens element 1140, a fifth lens element 1150, a sixth lens element 1160, a seventh lens element 1170, an eighth lens element 1180, a filter 1190 and an image surface 1195. The optical imaging lens system includes eight lens elements (1110, 1120, 1130, 1140, 1150, 1160, 1170 and 1180) with no additional lens element disposed between each of the adjacent eight lens elements.

The first lens element 1110 with negative refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric. The object-side surface 1111 of the first lens element 1110 has one inflection point.

The second lens element 1120 with positive refractive power has an object-side surface 1121 being convex in a paraxial region thereof and an image-side surface 1122 being convex in a paraxial region thereof. The second lens element 1120 is made of plastic material and has the object-side surface 1121 and the image-side surface 1122 being both aspheric.

The third lens element 1130 with negative refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with negative refractive power has an object-side surface 1141 being convex in a paraxial region thereof and an image-side surface 1142 being concave in a paraxial region thereof. The fourth lens element 1140 is made of plastic material and has the object-side surface 1141 and the image-side surface 1142 being both aspheric.

The fifth lens element 1150 with positive refractive power has an object-side surface 1151 being convex in a paraxial region thereof and an image-side surface 1152 being convex in a paraxial region thereof. The fifth lens element 1150 is made of plastic material and has the object-side surface 1151 and the image-side surface 1152 being both aspheric.

The sixth lens element 1160 with negative refractive power has an object-side surface 1161 being concave in a paraxial region thereof and an image-side surface 1162 being convex in a paraxial region thereof. The sixth lens element 1160 is made of plastic material and has the object-side surface 1161 and the image-side surface 1162 being both aspheric.

The seventh lens element 1170 with positive refractive power has an object-side surface 1171 being convex in a paraxial region thereof and an image-side surface 1172 being concave in a paraxial region thereof. The seventh lens element 1170 is made of plastic material and has the object-side surface 1171 and the image-side surface 1172 being both aspheric. The object-side surface 1171 of the seventh lens element 1170 has at least one inflection point. The image-side surface 1172 of the seventh lens element 1170 has at least one inflection point. The object-side surface 1171 of the seventh lens element 1170 has at least one critical point in an off-axis region thereof. The image-side surface 1172 of the seventh lens element 1170 has at least one convex critical point in an off-axis region thereof.

The eighth lens element 1180 with negative refractive power has an object-side surface 1181 being convex in a paraxial region thereof and an image-side surface 1182 being concave in a paraxial region thereof. The eighth lens element 1180 is made of plastic material and has the object-side surface 1181 and the image-side surface 1182 being both aspheric. The image-side surface 1182 of the eighth lens element 1180 has at least one critical point in an off-axis region thereof.

The filter 1190 is made of glass material and located between the eighth lens element 1180 and the image surface 1195, and will not affect the focal length of the optical imaging lens system. The image sensor 1199 is disposed on or near the image surface 1195 of the optical imaging lens system.

In this embodiment, the eight lens elements of the optical imaging lens system are all made of plastic material, an absolute value of a focal length of the second lens element 1120 is a minimum among absolute values of focal lengths of each of all lens elements of the optical imaging lens system, an axial distance between the seventh lens element 1170 and the eighth lens element 1180 is a maximum among axial distances between each of all adjacent lens elements of the optical imaging lens system, and a maximum effective radius of the image-side surface 1122 of the second lens element 1120 is a minimum among maximum effective radii of all lens surfaces of the optical imaging lens system.

The detailed optical data of the 11th embodiment are shown in Table 21 and the aspheric surface data are shown in Table 22 below.

TABLE 21

11th Embodiment
f = 6.34 mm, Fno = 1.72, HFOV = 43.8 deg.

| Surface # |        | Curvature Radius |       | Thickness | Material | Index | Abbe # | Focal Length |
|-----------|--------|------------------|-------|-----------|----------|-------|--------|--------------|
| 0         | Object | Plano            |       | Infinity  |          |       |        |              |
| 1         | Lens 1 | 31.425           | (ASP) | 0.493     | Plastic  | 1.545 | 56.1   | −29.84       |
| 2         |        | 10.656           | (ASP) | 0.300     |          |       |        |              |
| 3         | Lens 2 | 3.423            | (ASP) | 1.127     | Plastic  | 1.545 | 56.1   | 5.94         |
| 4         |        | −52.340          | (ASP) | −0.040    |          |       |        |              |
| 5         | Ape. Stop | Plano         |       | 0.100     |          |       |        |              |
| 6         | Lens 3 | 4.029            | (ASP) | 0.300     | Plastic  | 1.690 | 17.5   | −18.17       |
| 7         |        | 2.957            | (ASP) | 0.615     |          |       |        |              |
| 8         | Lens 4 | 10.225           | (ASP) | 0.400     | Plastic  | 1.669 | 19.5   | −29.33       |
| 9         |        | 6.617            | (ASP) | 0.086     |          |       |        |              |
| 10        | Lens 5 | 10.410           | (ASP) | 0.815     | Plastic  | 1.544 | 56.0   | 11.63        |
| 11        |        | −15.689          | (ASP) | 0.779     |          |       |        |              |
| 12        | Lens 6 | −25.259          | (ASP) | 0.545     | Plastic  | 1.562 | 44.6   | −1374.53     |
| 13        |        | −26.316          | (ASP) | 0.050     |          |       |        |              |
| 14        | Lens 7 | 3.179            | (ASP) | 0.704     | Plastic  | 1.544 | 56.0   | 15.44        |
| 15        |        | 4.717            | (ASP) | 1.320     |          |       |        |              |
| 16        | Lens 8 | 3.460            | (ASP) | 0.469     | Plastic  | 1.534 | 56.0   | −7.42        |
| 17        |        | 1.761            | (ASP) | 0.660     |          |       |        |              |
| 18        | Filter | Plano            |       | 0.210     | Glass    | 1.517 | 64.2   | —            |
| 19        |        | Plano            |       | 0.234     |          |       |        |              |
| 20        | Image  | Plano            |       | —         |          |       |        |              |

Note:
Reference wavelength is 587.6 nm (d-line).

TABLE 22

Aspheric Coefficients

| Surface # | 1 | 2 | 3 | 4 | 6 | 7 |
|-----------|---|---|---|---|---|---|
| k =  | −1.0000E+00 | −3.4793E+01 | −1.7888E−01 | 4.9771E+01 | −1.6165E+01 | −5.5348E+00 |
| A4 = | −5.1909E−03 | −5.3106E−03 | −3.4516E−03 | 5.0314E−04 | 1.0118E−02  | 3.6038E−03  |
| A6 = | 1.2406E−03  | 2.4258E−03  | 7.7440E−04  | −3.4591E−03 | −8.0109E−03 | 6.1151E−05  |
| A8 = | −4.6287E−05 | −1.5874E−04 | −1.5945E−04 | 1.8261E−03 | 3.5863E−03  | 1.7830E−04  |
| A10 = | −1.1250E−05 | −1.6307E−06 | 3.5405E−05 | −5.3413E−04 | −7.4941E−04 | 1.9536E−04 |
| A12 = | 2.0284E−06  | 1.6273E−06  | −4.8246E−06 | 7.7487E−05 | 6.3569E−05 | −8.3589E−05 |
| A14 = | −1.5304E−07 | 7.8171E−08  | 3.0079E−07  | −1.9774E−06 | −9.6424E−07 | 1.0951E−05 |
| A16 = | 4.2700E−09  | −1.9788E−08 | —           | −4.9123E−07 | —           | −3.0341E−07 |

| Surface # | 8 | 9 | 10 | 11 | 12 | 13 |
|-----------|---|---|----|----|----|----|
| k =  | −1.6449E+01 | −8.0189E+00 | −3.5588E+01 | −7.6501E+01 | 5.0000E+01  | −1.0000E+00 |
| A4 = | −1.4425E−02 | −1.8211E−02 | −5.5228E−03 | −4.9795E−03 | 1.1241E−02  | −1.6407E−02 |
| A6 = | 4.2798E−03  | 4.6882E−03  | 6.7694E−04  | −1.2645E−03 | −5.4345E−03 | 1.8272E−03  |
| A8 = | −2.3002E−03 | −1.2483E−03 | 6.3147E−04  | 4.9454E−04  | 1.0064E−03  | 4.8939E−04  |
| A10 = | 6.9679E−04 | 1.0039E−04  | −3.0538E−04 | −6.1799E−05 | −1.8121E−04 | −5.3512E−04 |
| A12 = | −9.8930E−05 | 1.9729E−05 | 5.0540E−05  | 1.0585E−05  | 1.6143E−05  | 1.6004E−04  |
| A14 = | 6.0633E−06  | −2.4178E−06 | −2.7748E−06 | −3.3877E−06 | 4.0776E−08  | −2.4553E−05 |
| A16 = | —           | —           | —           | 3.1367E−07  | −8.8041E−08 | 1.9683E−06  |
| A18 = | —           | —           | —           | —           | —           | −6.4203E−08 |

| Surface # | 14 | 15 | 16 | 17 |
|-----------|----|----|----|----|
| k =  | −6.3980E+00 | −1.6827E−01 | −2.1651E+01 | −5.3662E+00 |
| A4 = | 2.2179E−03  | 1.5106E−02  | −4.6976E−02 | −2.7393E−02 |
| A6 = | −4.8794E−03 | −8.2135E−03 | 6.7575E−03  | 5.5455E−03  |
| A8 = | 1.2260E−03  | 1.4315E−03  | −4.2381E−04 | −8.5660E−04 |
| A10 = | −3.8590E−04 | −1.4733E−04 | 9.7608E−06 | 9.6486E−05  |
| A12 = | 8.3639E−05  | 9.5956E−06  | 2.8656E−07  | −7.6654E−06 |
| A14 = | −1.0413E−05 | −3.8854E−07 | −2.4196E−08 | 4.0081E−07  |
| A16 = | 6.7788E−07  | 8.8946E−09  | 5.9030E−10  | −1.2807E−08 |
| A18 = | −1.7698E−08 | −8.7639E−11 | −5.2123E−12 | 2.2473E−10  |
| A20 = | —           | —           | —           | −1.6543E−12 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 6.34 | f/f1 | −0.21 |
| Fno | 1.72 | f/f2 | 1.07 |
| HFOV [deg.] | 43.8 | f/f4 | −0.22 |
| V6 | 44.6 | f2/f1 | −0.20 |
| V3/V4 | 0.9 | ImgH [mm] | 6.20 |
| V3 + V4 | 37.0 | TL [mm] | 9.17 |
| Vdmin | 17.5 | TL/ImgH | 1.48 |
| Nmax | 1.690 | TL/f | 1.44 |
| (Vi/Ni)min | 10.35 | TL/Y11 | 3.16 |
| CT1/CT3 | 1.64 | TL/EPD | 2.49 |
| CT5/CT6 | 1.50 | SL/TL | 0.79 |
| T34/CT3 | 2.05 | EPD/ImgH | 0.59 |
| T45/T34 | 0.14 | f/ImgH | 1.02 |
| T45/CT4 | 0.22 | BL/ImgH | 0.18 |
| T67/T78 | 0.04 | Yc71/Yc72 | 0.60 |
| T78/CT7 | 1.88 | f/Yc82 | 2.68 |
| (T23 + T45 + T67)/(T34 + T78) | 0.10 | V1/N1 | 36.30 |
| f/R15 | 1.83 | V2/N2 | 36.30 |
| f/R16 | 3.60 | V3/N3 | 10.35 |
| |f/R1| + |f/R2| | 0.80 | V4/N4 | 11.65 |
| f/R1 − f/R12 | 0.44 | V5/N5 | 36.26 |
| (R3 + R4)/(R3 − R4) | −0.88 | V6/N6 | 28.57 |
| (R5 − R6)/(R5 + R6) | 0.15 | V7/N7 | 36.26 |
| (R13 − R14)/(R13 + R14) | −0.19 | V8/N8 | 36.48 |
| (R15 + R16)/(R15 − R16) | 3.07 | — | — |

12th Embodiment

Figure 23:
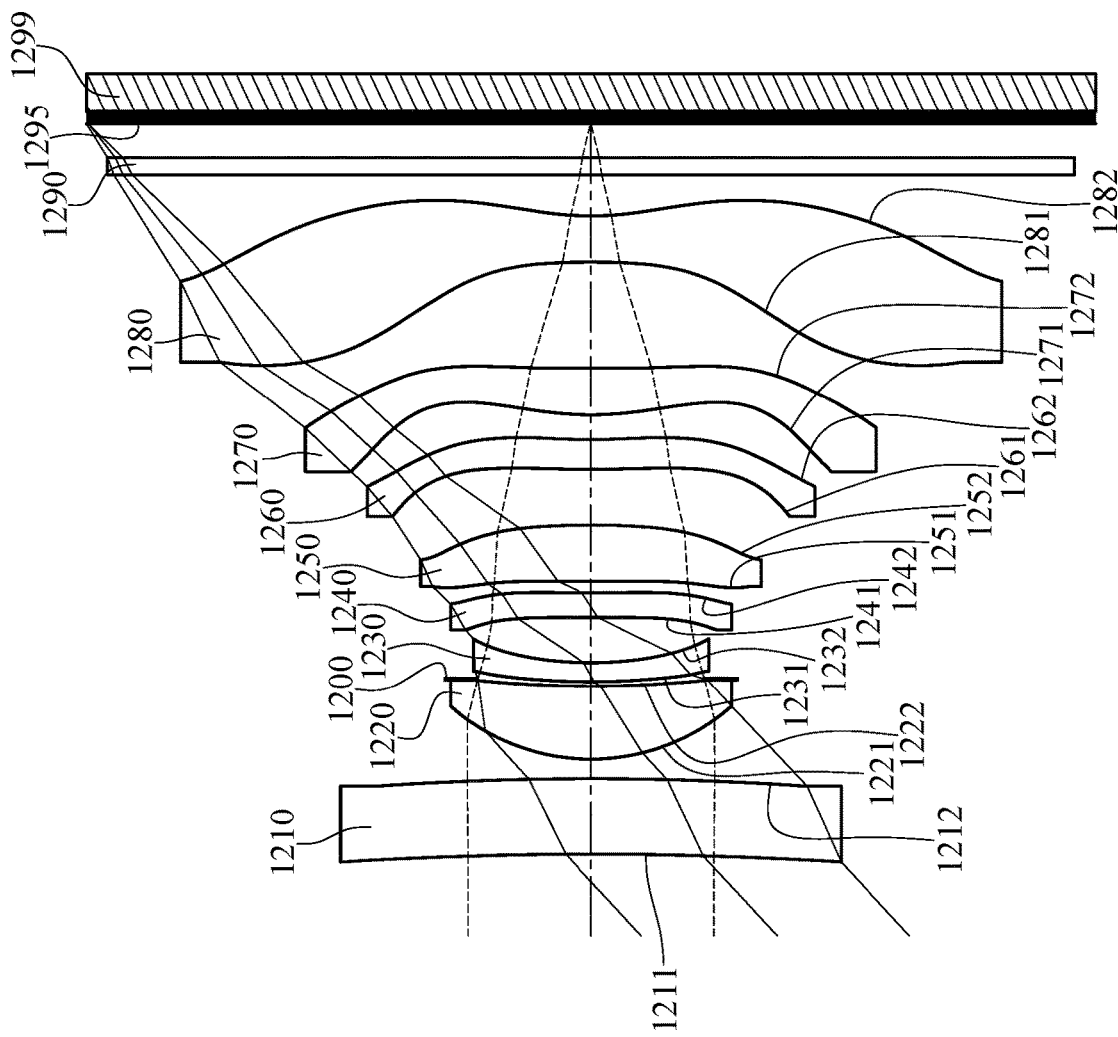
FIG. 23 is a schematic view of an image capturing unit according to the 12th embodiment of the present disclosure.
Figure 24:
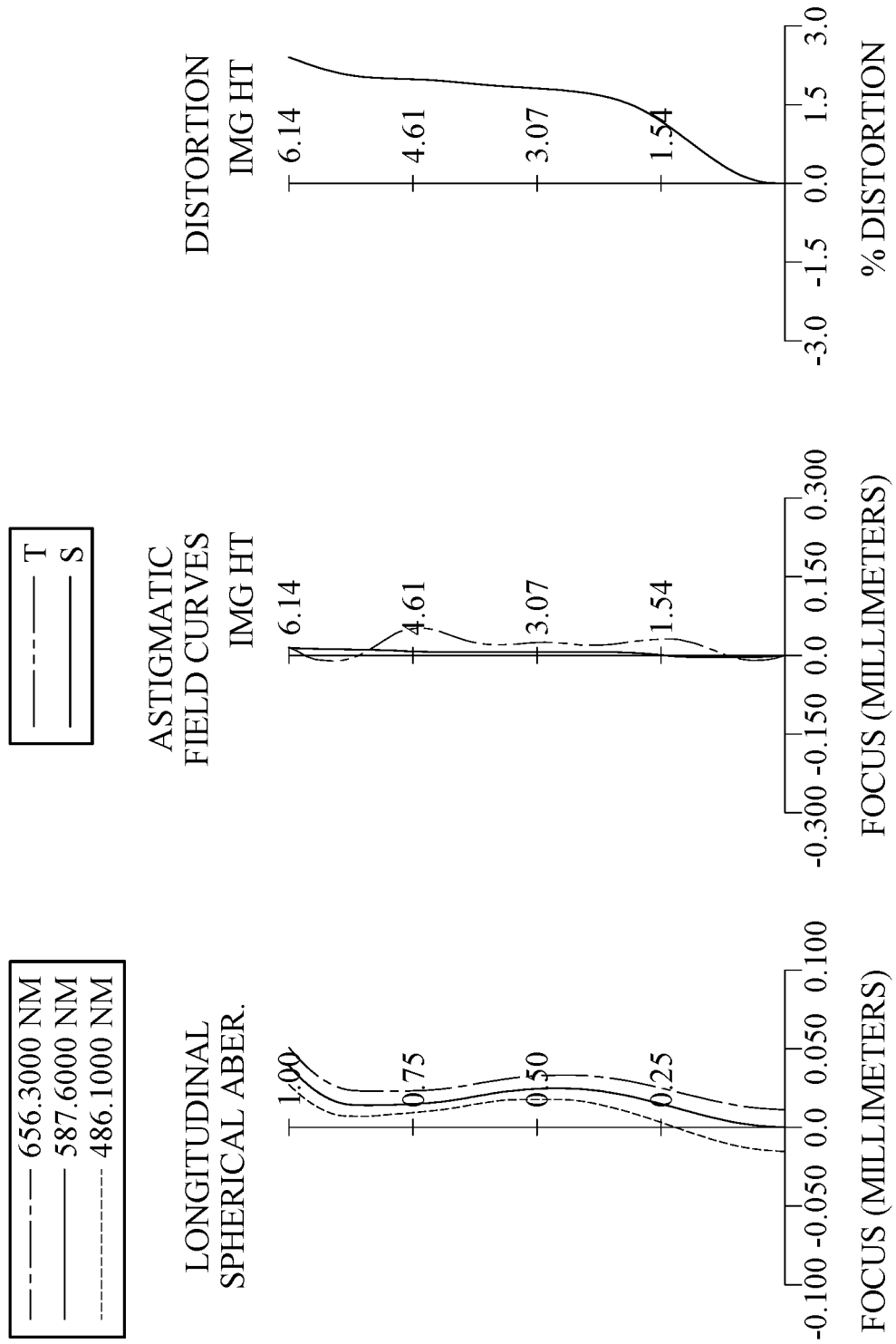
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the optical imaging lens system (its reference numeral is omitted) of the present disclosure and an image sensor 1299. The optical imaging lens system includes, in order from an object side to an image side along an optical path, a first lens element 1210, a second lens element 1220, an aperture stop 1200, a third lens element 1230, a fourth lens element 1240, a fifth lens element 1250, a sixth lens element 1260, a seventh lens element 1270, an eighth lens element 1280, a filter 1290 and an image surface 1295. The optical imaging lens system includes eight lens elements (1210, 1220, 1230, 1240, 1250, 1260, 1270 and 1280) with no additional lens element disposed between each of the adjacent eight lens elements.

The first lens element 1210 with positive refractive power has an object-side surface 1211 being concave in a paraxial region thereof and an image-side surface 1212 being convex in a paraxial region thereof. The first lens element 1210 is made of plastic material and has the object-side surface 1211 and the image-side surface 1212 being both aspheric.

The second lens element 1220 with positive refractive power has an object-side surface 1221 being convex in a paraxial region thereof and an image-side surface 1222 being concave in a paraxial region thereof. The second lens element 1220 is made of glass material and has the object-side surface 1221 and the image-side surface 1222 being both aspheric.

The third lens element 1230 with negative refractive power has an object-side surface 1231 being convex in a paraxial region thereof and an image-side surface 1232 being concave in a paraxial region thereof. The third lens element 1230 is made of plastic material and has the object-side surface 1231 and the image-side surface 1232 being both aspheric.

The fourth lens element 1240 with negative refractive power has an object-side surface 1241 being convex in a paraxial region thereof and an image-side surface 1242 being concave in a paraxial region thereof. The fourth lens element 1240 is made of plastic material and has the object-side surface 1241 and the image-side surface 1242 being both aspheric.

The fifth lens element 1250 with positive refractive power has an object-side surface 1251 being convex in a paraxial region thereof and an image-side surface 1252 being convex in a paraxial region thereof. The fifth lens element 1250 is made of plastic material and has the object-side surface 1251 and the image-side surface 1252 being both aspheric.

The sixth lens element 1260 with negative refractive power has an object-side surface 1261 being convex in a paraxial region thereof and an image-side surface 1262 being concave in a paraxial region thereof. The sixth lens element 1260 is made of plastic material and has the object-side surface 1261 and the image-side surface 1262 being both aspheric.

The seventh lens element 1270 with positive refractive power has an object-side surface 1271 being convex in a paraxial region thereof and an image-side surface 1272 being concave in a paraxial region thereof. The seventh lens element 1270 is made of plastic material and has the object-side surface 1271 and the image-side surface 1272 being both aspheric. The object-side surface 1271 of the seventh lens element 1270 has at least one inflection point. The image-side surface 1272 of the seventh lens element 1270 has at least one inflection point. The object-side surface 1271 of the seventh lens element 1270 has at least one critical point in an off-axis region thereof. The image-side surface 1272 of the seventh lens element 1270 has at least one convex critical point in an off-axis region thereof.

The eighth lens element 1280 with negative refractive power has an object-side surface 1281 being concave in a paraxial region thereof and an image-side surface 1282 being concave in a paraxial region thereof. The eighth lens element 1280 is made of plastic material and has the object-side surface 1281 and the image-side surface 1282 being both aspheric. The image-side surface 1282 of the eighth lens element 1280 has at least one critical point in an off-axis region thereof.

The filter 1290 is made of glass material and located between the eighth lens element 1280 and the image surface 1295, and will not affect the focal length of the optical imaging lens system. The image sensor 1299 is disposed on or near the image surface 1295 of the optical imaging lens system.

In this embodiment, seven of the eight lens elements of the optical imaging lens system are made of plastic material, an axial distance between the seventh lens element 1270 and the eighth lens element 1280 is a maximum among axial distances between each of all adjacent lens elements of the optical imaging lens system, and a maximum effective radius of the object-side surface 1231 of the third lens element 1230 is a minimum among maximum effective radii of all lens surfaces of the optical imaging lens system.

The detailed optical data of the 12th embodiment are shown in Table 23 and the aspheric surface data are shown in Table 24 below.

TABLE 23

12th Embodiment
f = 6.46 mm, Fno = 2.15, HFOV = 42.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −47.513 | (ASP) | 0.920 | Plastic | 1.545 | 56.1 | 391.92 |
| 2 | | −39.132 | (ASP) | 0.242 | | | | |
| 3 | Lens 2 | 2.631 | (ASP) | 0.895 | Glass | 1.541 | 47.2 | 6.26 |
| 4 | | 10.400 | (ASP) | 0.086 | | | | |
| 5 | Ape. Stop | Plano | | −0.030 | | | | |
| 6 | Lens 3 | 7.838 | (ASP) | 0.230 | Plastic | 1.686 | 18.4 | −15.27 |
| 7 | | 4.430 | (ASP) | 0.555 | | | | |
| 8 | Lens 4 | 127.247 | (ASP) | 0.302 | Plastic | 1.669 | 19.5 | −32.32 |
| 9 | | 18.466 | (ASP) | 0.140 | | | | |
| 10 | Lens 5 | 32.414 | (ASP) | 0.687 | Plastic | 1.544 | 56.0 | 15.57 |
| 11 | | −11.385 | (ASP) | 0.681 | | | | |
| 12 | Lens 6 | 9.836 | (ASP) | 0.362 | Plastic | 1.566 | 37.4 | −27.73 |
| 13 | | 5.966 | (ASP) | 0.305 | | | | |
| 14 | Lens 7 | 3.844 | (ASP) | 0.573 | Plastic | 1.544 | 56.0 | 7.08 |
| 15 | | 2333.315 | (ASP) | 1.300 | | | | |
| 16 | Lens 8 | −11.519 | (ASP) | 0.562 | Plastic | 1.534 | 56.0 | −4.95 |
| 17 | | 3.491 | (ASP) | 0.500 | | | | |
| 18 | Filter | Plano | | 0.210 | Glass | 1.517 | 64.2 | — |
| 19 | | Plano | | 0.414 | | | | |
| 20 | Image | Plano | | — | | | | |

Note:
Reference wavelength is 587.6 nm (d-line).

TABLE 24

Aspheric Coefficients

| Surface # | 1 | 2 | 3 | 4 | 6 | 7 |
|---|---|---|---|---|---|---|
| k = | 4.3423E+01 | −4.9997E+01 | −6.0447E−01 | −5.8107E+01 | 6.7451E+00 | 1.5524E+00 |
| A4 = | −3.9839E−04 | −1.6557E−03 | 3.9705E−03 | −1.8569E−02 | −3.0371E−02 | −7.1742E−03 |
| A6 = | 1.6479E−04 | 8.3822E−04 | 1.0146E−03 | 2.0596E−02 | 3.1984E−02 | 1.3754E−02 |
| A8 = | −1.3934E−05 | −1.9453E−04 | 9.8270E−05 | −1.0701E−02 | −1.7311E−02 | −3.7250E−03 |
| A10 = | −9.7774E−07 | 2.2798E−05 | 1.0680E−04 | 3.3618E−03 | 7.1634E−03 | −1.1133E−03 |
| A12 = | 1.9204E−07 | −1.3049E−06 | −1.3882E−04 | −5.8509E−04 | −2.7216E−03 | 1.2153E−03 |
| A14 = | −7.2372E−09 | 2.7767E−08 | 5.3393E−05 | 4.2137E−05 | 9.0153E−04 | −2.0241E−04 |
| A16 = | — | — | −7.1429E−06 | — | −1.4350E−04 | — |

| Surface # | 8 | 9 | 10 | 11 | 12 | 13 |
|---|---|---|---|---|---|---|
| k = | 5.4085E+01 | 2.4217E+01 | −6.8301E+01 | −1.7445E+01 | −2.8244E+01 | −9.9001E+01 |
| A4 = | −3.1392E−02 | −4.2888E−02 | −3.3802E−02 | −2.2848E−02 | −5.6304E−02 | −4.8925E−02 |
| A6 = | 6.7028E−03 | 2.1575E−02 | 3.0149E−02 | 6.6888E−03 | 4.9283E−02 | 2.2598E−02 |
| A8 = | −2.7014E−03 | −2.4309E−02 | −4.3593E−02 | −8.6310E−03 | −3.6924E−02 | −1.0478E−02 |
| A10 = | −4.6106E−03 | 2.0038E−02 | 4.3254E−02 | 7.1240E−03 | 1.8108E−02 | 3.5074E−03 |
| A12 = | 5.1699E−03 | −1.1889E−02 | −2.7889E−02 | −3.8736E−03 | −5.9339E−03 | −8.4261E−04 |
| A14 = | −2.2010E−03 | 4.5722E−03 | 1.1418E−02 | 1.3872E−03 | 1.2688E−03 | 1.4180E−04 |
| A16 = | 3.6822E−04 | −9.5553E−04 | −2.7990E−03 | −3.1719E−04 | −1.6869E−04 | −1.5455E−05 |
| A18 = | — | 8.1993E−05 | 3.7277E−04 | 4.2541E−05 | 1.2567E−05 | 9.6412E−07 |
| A20 = | — | — | −2.0753E−05 | −2.5059E−06 | −3.9797E−07 | −2.6010E−08 |

| Surface # | 14 | 15 | 16 | 17 |
|---|---|---|---|---|
| k = | −8.0245E−01 | −7.4949E+00 | 4.4198E+00 | −8.6854E−01 |
| A4 = | −3.0089E−02 | 2.8670E−02 | −3.3857E−02 | −4.2021E−02 |
| A6 = | 2.1125E−03 | −2.0475E−02 | 1.3531E−03 | 6.8747E−03 |
| A8 = | −1.5664E−03 | 6.7411E−03 | 1.0042E−03 | −8.7607E−04 |
| A10 = | 9.3278E−04 | −1.5017E−03 | −1.9454E−04 | 8.1940E−05 |
| A12 = | −3.4025E−04 | 2.2231E−04 | 1.7727E−05 | −5.3894E−06 |
| A14 = | 7.1995E−05 | −2.0968E−05 | −9.4900E−07 | 2.3759E−07 |
| A16 = | −8.7589E−06 | 1.2009E−06 | 3.0666E−08 | −6.6157E−09 |
| A18 = | 5.7491E−07 | −3.7927E−08 | −5.5732E−10 | 1.0497E−10 |
| A20 = | −1.5803E−08 | 5.0471E−10 | 4.4006E−12 | −7.2479E−13 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions.

| 12th Embodiment | | | |
|---|---|---|---|
| f [mm] | 6.46 | f/f1 | 0.02 |
| Fno | 2.15 | f/f2 | 1.03 |
| HFOV [deg.] | 42.8 | f/f4 | −0.20 |
| V6 | 37.4 | f2/f1 | 0.02 |
| V3/V4 | 0.9 | ImgH [mm] | 6.14 |
| V3 + V4 | 37.8 | TL [mm] | 8.93 |
| Vdmin | 18.4 | TL/ImgH | 1.46 |
| Nmax | 1.686 | TL/f | 1.38 |
| (Vi/Ni)min | 10.90 | TL/Y11 | 2.92 |
| CT1/CT3 | 4.00 | TL/EPD | 2.97 |
| CT5/CT6 | 1.90 | SL/TL | 0.76 |
| T34/CT3 | 2.41 | EPD/ImgH | 0.49 |
| T45/T34 | 0.25 | f/ImgH | 1.05 |
| T45/CT4 | 0.46 | BL/ImgH | 0.18 |
| T67/T78 | 0.23 | Yc71/Yc72 | 1.10 |
| T78/CT7 | 2.27 | f/Yc82 | 3.41 |
| (T23 + T45 + T67)/(T34 + T78) | 0.27 | V1/N1 | 36.30 |
| f/R15 | −0.56 | V2/N2 | 30.64 |
| f/R16 | 1.85 | V3/N3 | 10.90 |
| |f/R1| + |f/R2| | 0.30 | V4/N4 | 11.65 |
| f/R1 − f/R12 | −1.22 | V5/N5 | 36.26 |
| (R3 + R4)/(R3 − R4) | −1.68 | V6/N6 | 23.91 |
| (R5 − R6)/(R5 + R6) | 0.28 | V7/N7 | 36.26 |
| (R13 − R14)/(R13 + R14) | −1.00 | V8/N8 | 36.48 |
| (R15 + R16)/(R15 − R16) | 0.53 | — | — |

13th Embodiment

Figure 25:
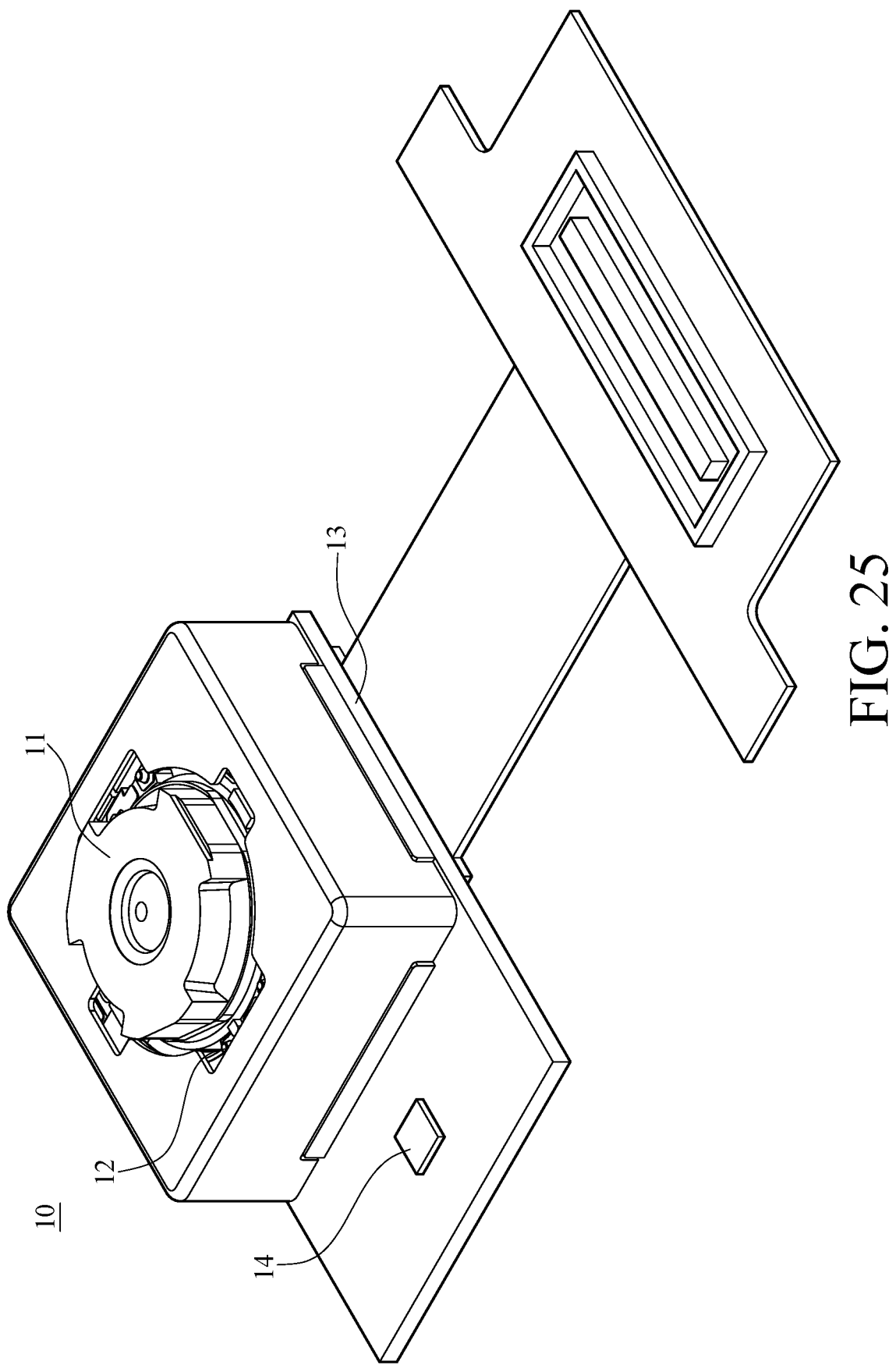
FIG. 25 is a perspective view of an image capturing unit according to the 13th embodiment of the present disclosure.

FIG. 25 is a perspective view of an image capturing unit according to the 13th embodiment of the present disclosure. In this embodiment, an image capturing unit 10 is a camera module including a lens unit 11, a driving device 12, an image sensor 13 and an image stabilizer 14. The lens unit 11 includes the optical imaging lens system disclosed in the 1st embodiment, a barrel and a holder member (their reference numerals are omitted) for holding the optical imaging lens system. However, the lens unit 11 may alternatively be provided with the optical imaging lens system disclosed in other embodiments of the present disclosure, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical imaging lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

14th Embodiment

Figure 26:
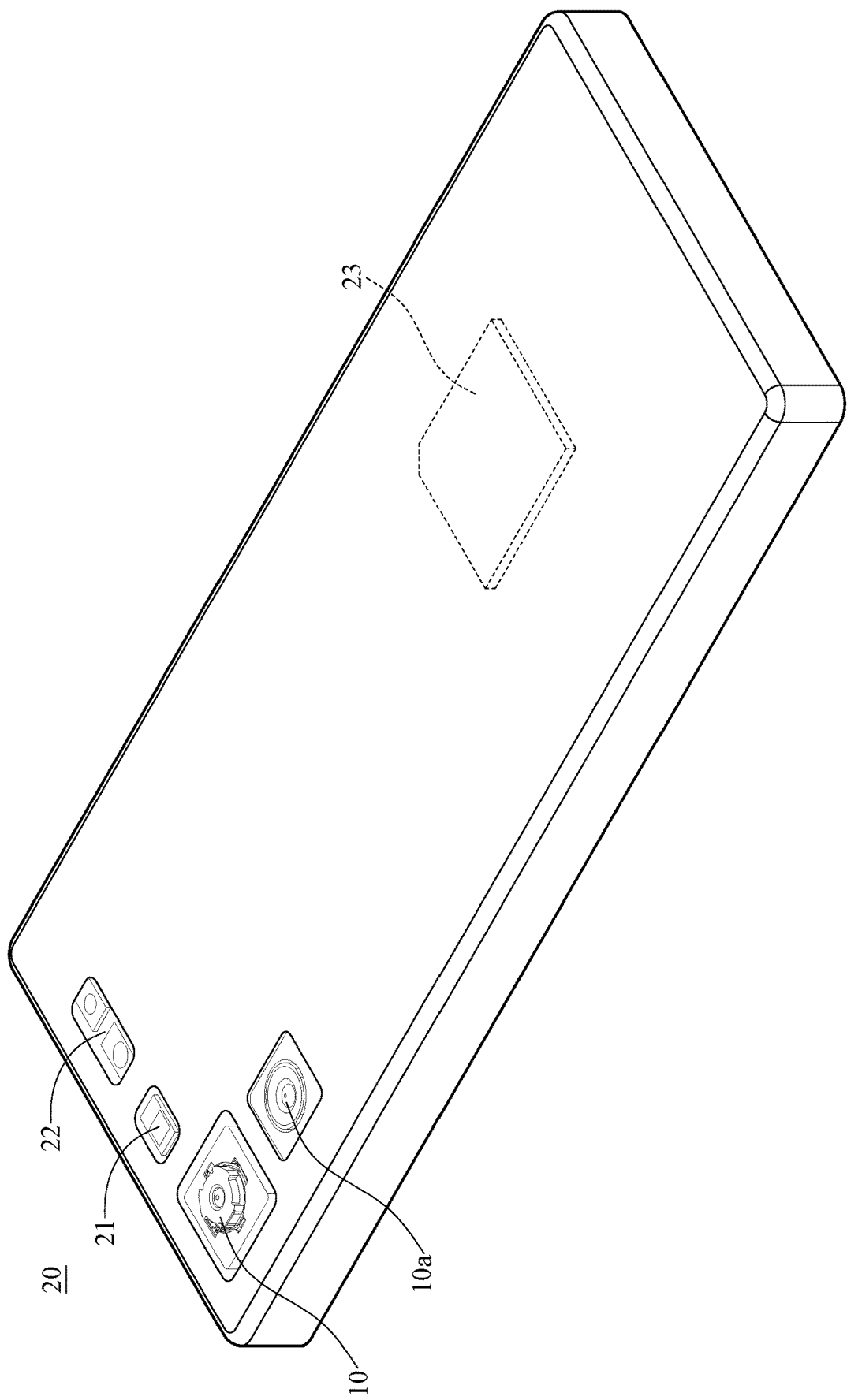
FIG. 26 is one perspective view of an electronic device according to the 14th embodiment of the present disclosure.
Figure 27:
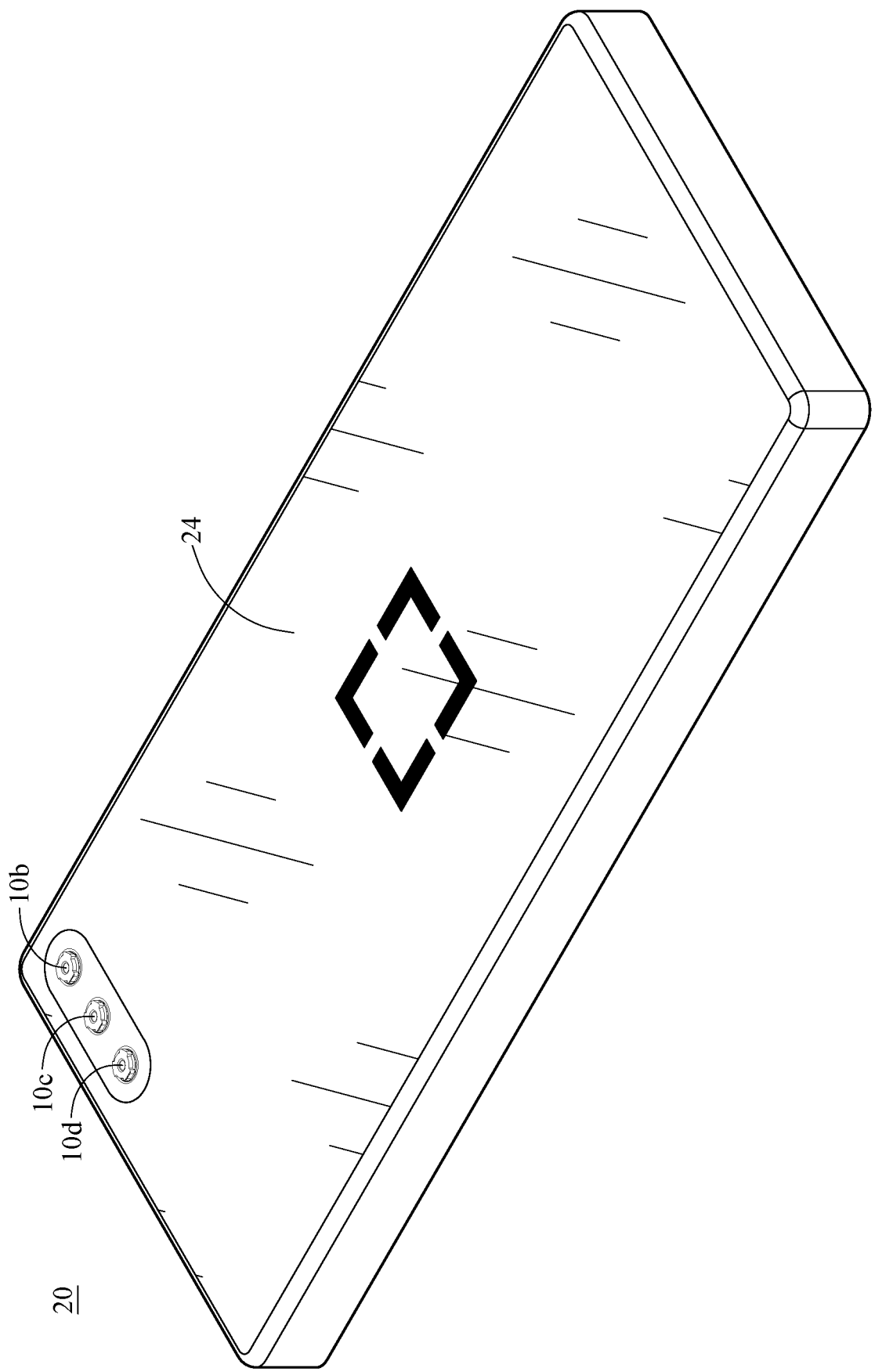
FIG. 27 is another perspective view of the electronic device in FIG. 26.
Figure 28:
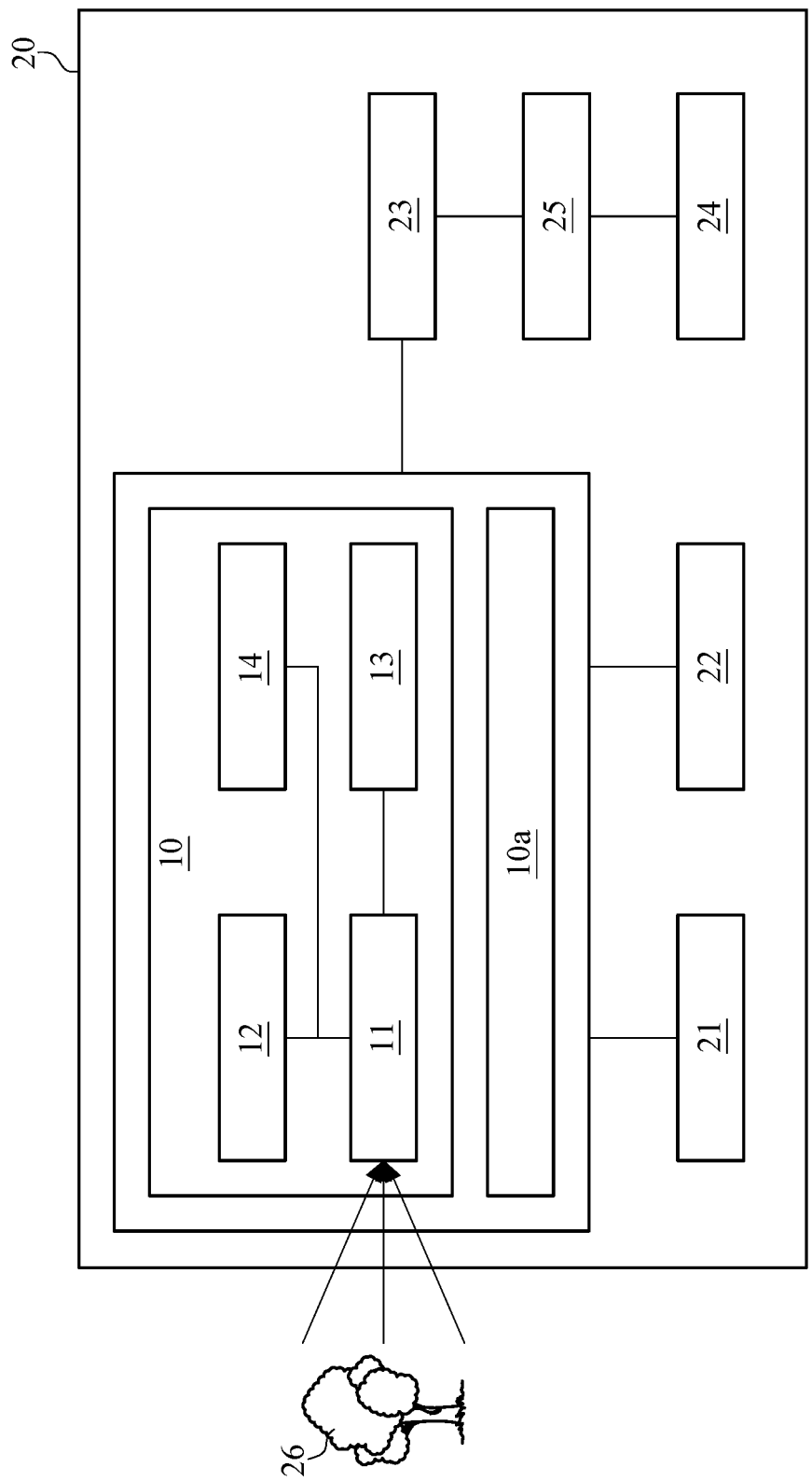
FIG. 28 is a block diagram of the electronic device in FIG. 26.

FIG. 26 is one perspective view of an electronic device according to the 14th embodiment of the present disclosure. FIG. 27 is another perspective view of the electronic device in FIG. 26. FIG. 28 is a block diagram of the electronic device in FIG. 26.

In this embodiment, an electronic device 20 is a smartphone including the image capturing unit 10 disclosed in the 13th embodiment, an image capturing unit 10a, an image capturing unit 10b, an image capturing unit 10c, an image capturing unit 10d, a flash module 21, a focus assist module 22, an image signal processor 23, a display module (user interface) 24 and an image software processor 25. The image capturing unit 10 and the image capturing unit 10a are disposed on the same side of the electronic device 20 and each of the image capturing units 10 and 10a has a single focal point. The image capturing unit 10b, the image capturing unit 10c, the image capturing unit 10d and the display module 24 are disposed on the opposite side of the electronic device 20, such that the image capturing units 10b, 10c, 10d can be front-facing cameras of the electronic device 20 for taking selfies, but the present disclosure is not limited thereto. Furthermore, each of the image capturing units 10a, 10b, 10c and 10d can include the optical imaging lens system of the present disclosure and can have a configuration similar to that of the image capturing unit 10. In detail, each of the image capturing units 10a, 10b, 10c and 10d can include a lens unit, a driving device, an image sensor and an image stabilizer, and each of the lens unit can include an optical lens assembly such as the optical imaging lens system of the present disclosure, a barrel and a holder member for holding the optical lens assembly.

The image capturing unit 10 is a wide-angle image capturing unit, the image capturing unit 10a is an ultra-wide-angle image capturing unit, the image capturing unit 10b is a wide-angle image capturing unit, the image capturing unit 10c is an ultra-wide-angle image capturing unit, and the image capturing unit 10d is a ToF (time of flight) image capturing unit. In this embodiment, the image capturing units 10 and 10a have different fields of view, such that the electronic device 20 can have various magnification ratios so as to meet the requirement of optical zoom functionality. Moreover, a maximum field of view of the image capturing unit 10 and a maximum field of view of one of the image capturing units 10a, 10b, 10c, 10d can differ by at least 20 degrees. Therefore, it is favorable for the electronic device 20 to capture images of different fields of view for various applications. In addition, the image capturing unit 10d can determine depth information of the imaged object. In this embodiment, the electronic device 20 includes multiple image capturing units 10, 10a, 10b, 10c and 10d, but the present disclosure is not limited to the number and arrangement of image capturing units.

When a user captures images of an object 26, the light rays converge in the image capturing unit 10 or the image capturing unit 10a to generate images, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the light rays may converge in the image capturing unit 10b, 10c or 10d to generate images. The display module 24 can include a touch screen, and the user is able to interact with the display module 24 and the image software processor 25 having multiple functions to capture images and complete image processing. Alternatively, the user may capture images via a physical button. The image processed by the image software processor 25 can be displayed on the display module 24.

15th Embodiment

Figure 29:
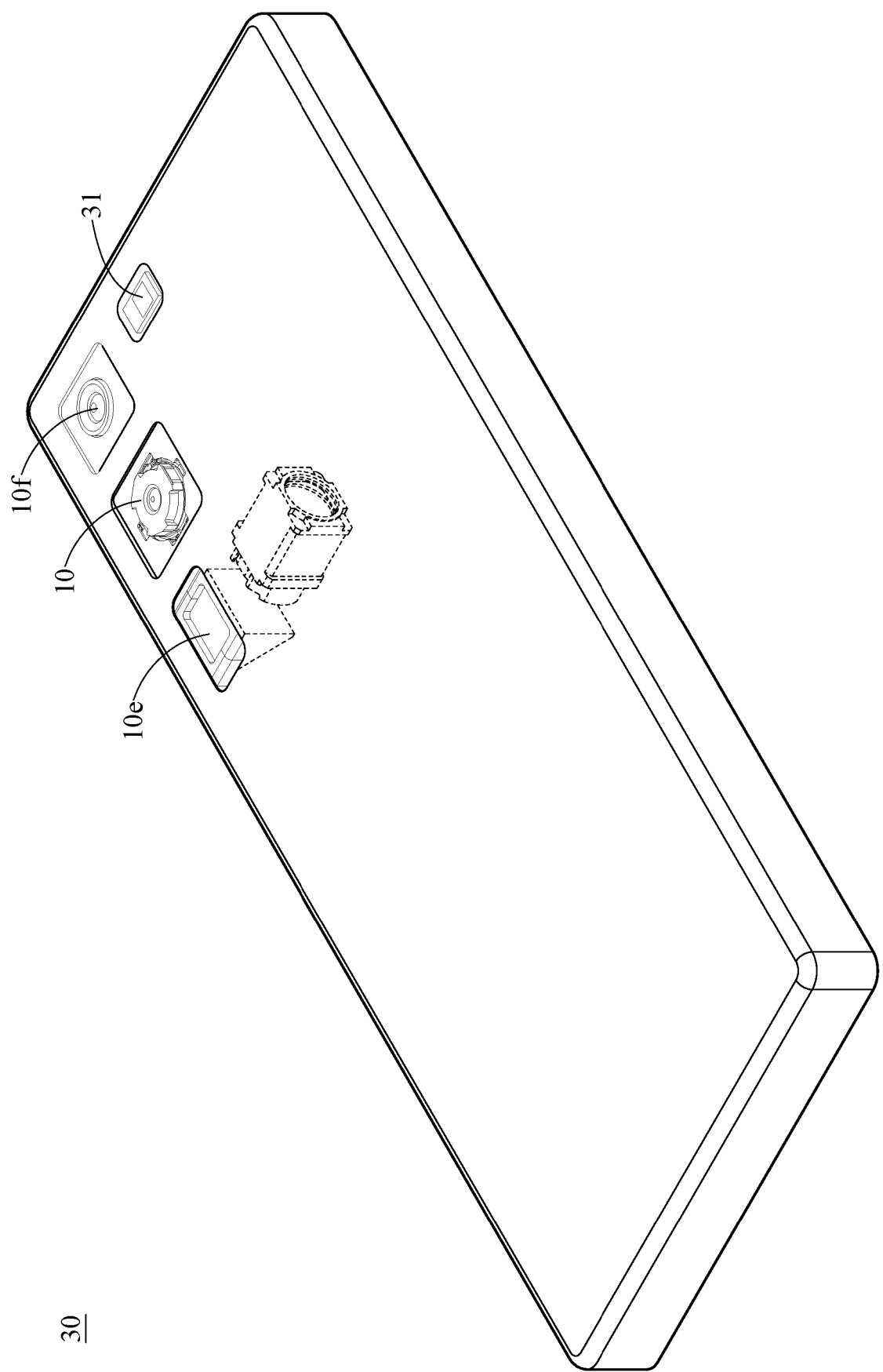
FIG. 29 is one perspective view of an electronic device according to the 15th embodiment of the present disclosure.

FIG. 29 is one perspective view of an electronic device according to the 15th embodiment of the present disclosure.

In this embodiment, an electronic device 30 is a smartphone including the image capturing unit 10 disclosed in the 13th embodiment, an image capturing unit 10e, an image capturing unit 10f, a flash module 31, a focus assist module, an image signal processor, a display module and an image software processor (not shown). The image capturing unit 10, the image capturing unit 10e and the image capturing unit 10f are disposed on the same side of the electronic device 30, while the display module is disposed on the opposite side of the electronic device 30. Furthermore, each of the image capturing units 10e and 10f can include the optical imaging lens system of the present disclosure and can have a configuration similar to that of the image capturing unit 10, so the details in this regard will not be provided again.

The image capturing unit 10 is a wide-angle image capturing unit, the image capturing unit 10e is a telephoto image capturing unit, and the image capturing unit 10f is an ultra-wide-angle image capturing unit. In this embodiment, the image capturing units 10, 10e and 10f have different fields of view, such that the electronic device 30 can have various magnification ratios so as to meet the requirement of optical zoom functionality. Moreover, the image capturing unit 10e can be a telephoto image capturing unit having a light-folding element configuration, such that the total track length of the image capturing unit 10e is not limited by the thickness of the electronic device 30. Moreover, the light-folding element configuration of the image capturing unit 10e can be similar to, for example, one of the structures shown in FIG. 32 to FIG. 34 which can be referred to foregoing descriptions corresponding to FIG. 32 to FIG. 34 so the details in this regard will not be provided again. In this embodiment, the electronic device 30 includes multiple image capturing units 10, 10e and 10f, but the present disclosure is not limited to the number and arrangement of image capturing units. When a user captures images of an object, light rays converge in the image capturing unit 10, 10e or 10f to generate images, and the flash module 31 is activated for light supplement. Further, the subsequent processes are performed in a manner similar to the abovementioned embodiment, so the details in this regard will not be provided again.

16th Embodiment

Figure 30:
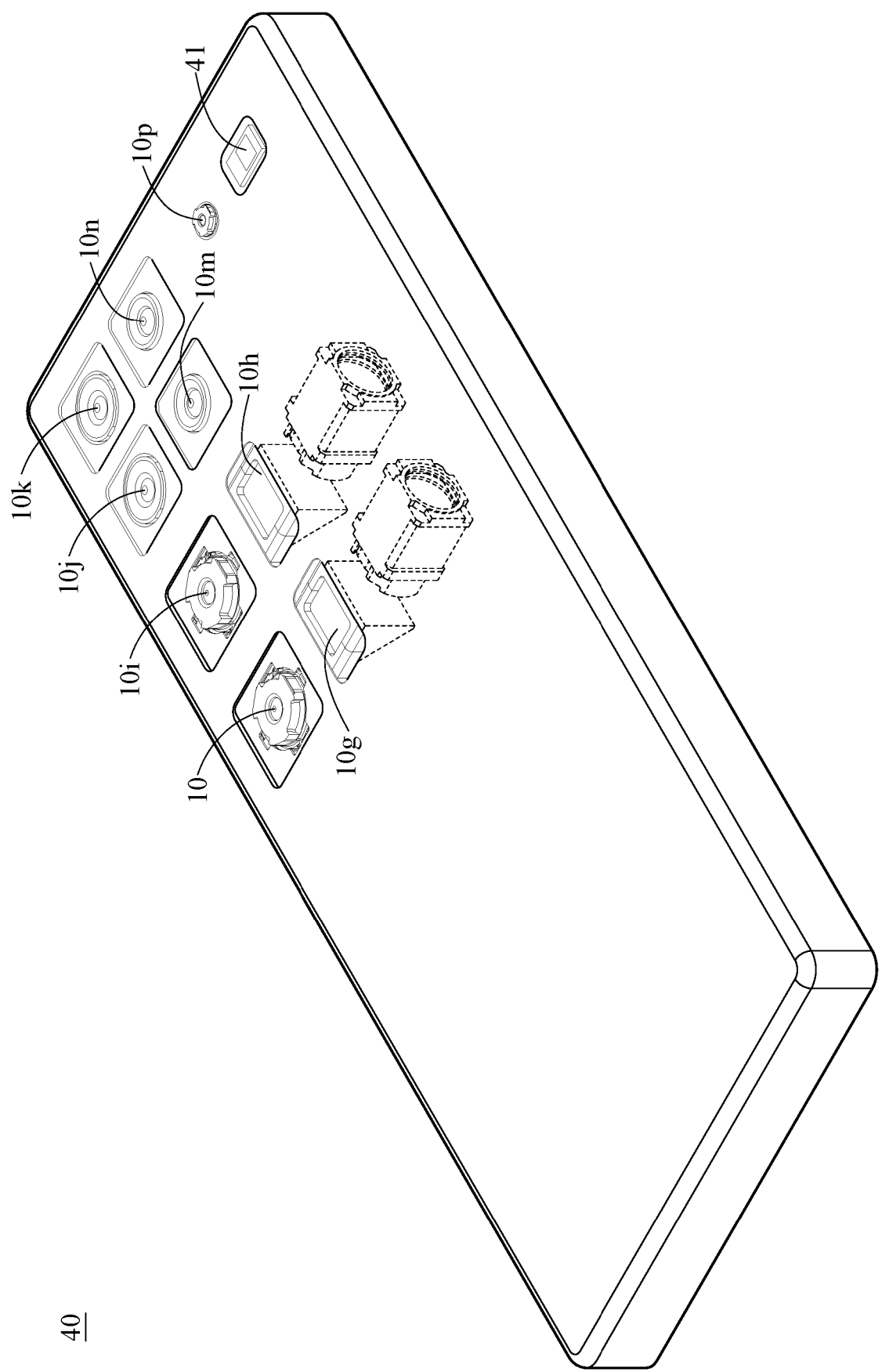
FIG. 30 is one perspective view of an electronic device according to the 16th embodiment of the present disclosure.

FIG. 30 is one perspective view of an electronic device according to the 16th embodiment of the present disclosure.

In this embodiment, an electronic device 40 is a smartphone including the image capturing unit 10 disclosed in the 13th embodiment, an image capturing unit 10g, an image capturing unit 10h, an image capturing unit 10i, an image capturing unit 10j, an image capturing unit 10k, an image capturing unit 10m, an image capturing unit 10n, an image capturing unit 10p, a flash module 41, a focus assist module, an image signal processor, a display module and an image software processor (not shown). The image capturing units 10, 10g, 10h, 10i, 10j, 10k, 10m, 10n and 10p are disposed on the same side of the electronic device 40, while the display module is disposed on the opposite side of the electronic device 40. Furthermore, each of the image capturing units 10g, 10h, 10i, 10j, 10k, 10m, 10n and 10p can include the optical imaging lens system of the present disclosure and can have a configuration similar to that of the image capturing unit 10, so the details in this regard will not be provided again.

The image capturing unit 10 is a wide-angle image capturing unit, the image capturing unit 10g is a telephoto image capturing unit, the image capturing unit 10h is a telephoto image capturing unit, the image capturing unit 10i is a wide-angle image capturing unit, the image capturing unit 10j is an ultra-wide-angle image capturing unit, the image capturing unit 10k is an ultra-wide-angle image capturing unit, the image capturing unit 10m is a telephoto image capturing unit, the image capturing unit 10n is a telephoto image capturing unit, and the image capturing unit 10p is a ToF image capturing unit. In this embodiment, the image capturing units 10, 10g, 10h, 10i, 10j, 10k, 10m and 10n have different fields of view, such that the electronic device 40 can have various magnification ratios so as to meet the requirement of optical zoom functionality. Moreover, each of the image capturing units 10g and 10h can be a telephoto image capturing unit having a light-folding element configuration. Moreover, the light-folding element configuration of each of the image capturing units 10g and 10h can be similar to, for example, one of the structures shown in FIG. 32 to FIG. 34 which can be referred to foregoing descriptions corresponding to FIG. 32 to FIG. 34 so the details in this regard will not be provided again. In addition, the image capturing unit 10p can determine depth information of the imaged object. In this embodiment, the electronic device 40 includes multiple image capturing units 10, 10g, 10h, 10i, 10j, 10k, 10m, 10n and 10p, but the present disclosure is not limited to the number and arrangement of image capturing units. When a user captures images of an object, the light rays converge in the image capturing unit 10, 10g, 10h, 10i, 10j, 10k, 10m, 10n or 10p to generate images, and the flash module 41 is activated for light supplement. Further, the subsequent processes are performed in a manner similar to the abovementioned embodiments, so the details in this regard will not be provided again.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1−24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;
wherein the image-side surface of the sixth lens element is concave in a paraxial region thereof, the eighth lens element has negative refractive power, the object-side surface of the eighth lens element is convex in a paraxial region thereof, the image-side surface of the eighth lens element is concave in a paraxial region thereof, the image-side surface of the eighth lens element has at least one critical point in an off-axis region thereof, and a total number of lens elements in the optical imaging lens system is eight;
wherein an Abbe number of the third lens element is V3, an Abbe number of the fourth lens element is V4, a focal length of the optical imaging lens system is f, a focal length of the second lens element is f2, a curvature radius of the object-side surface of the first lens element is R1, a curvature radius of the image-side surface of the sixth lens element is R12, an axial distance between the seventh lens element and the eighth lens element is T78, a central thickness of the seventh lens element is CT7, and the following conditions are satisfied:

10.0<$V3+V4$<70.0;

−8.0<$f/R1-f/R12$≤1.50;

−0.60<$f/f2$<5.0; and 0.60<$T78/CT7$<8.0.

2. The optical imaging lens system of claim 1, wherein at least one of the object-side surface and the image-side surface of the first lens element has at least one inflection point.

3. The optical imaging lens system of claim 1, wherein the second lens element has positive refractive power, and the object-side surface of the second lens element is convex in a paraxial region thereof.

4. The optical imaging lens system of claim 1, wherein the seventh lens element has positive refractive power, and the object-side surface of the seventh lens element is convex in a paraxial region thereof;
wherein the Abbe number of the third lens element is V3, the Abbe number of the fourth lens element is V4, and the following condition is satisfied:

0.60<$V3/V4$<1.50.

5. The optical imaging lens system of claim 1, wherein the image-side surface of the seventh lens element is concave in a paraxial region thereof, the image-side surface of the seventh lens element has at least one convex critical point in an off-axis region thereof, and at least four lens elements of the optical imaging lens system are made of plastic material.

6. The optical imaging lens system of claim 1, wherein an Abbe number of the sixth lens element is V6, and the following condition is satisfied:

25.0<$V6$<50.0.

7. The optical imaging lens system of claim 1, wherein an axial distance between the second lens element and the third lens element is T23, an axial distance between the third lens element and the fourth lens element is T34, an axial distance between the fourth lens element and the fifth lens element is T45, an axial distance between the sixth lens element and the seventh lens element is T67, the axial distance between the seventh lens element and the eighth lens element is T78, and the following condition is satisfied:

0<$(T23+T45+T67)/(T34+T78)$<0.60.

8. The optical imaging lens system of claim 1, wherein the focal length of the optical imaging lens system is f, a focal length of the first lens element is f1, the focal length of the second lens element is f2, an axial distance between the object-side surface of the first lens element and an image surface is TL, a maximum value among refractive indices of all lens elements of the optical imaging lens system is Nmax, and the following conditions are satisfied:

−1.0<$f2/f1$<1.0;

0.50<$TL/f$<5.0; and 1.60<$N$max<1.78.

9. The optical imaging lens system of claim 1, wherein a minimum value among Abbe numbers of all lens elements of the optical imaging lens system is Vdmin, the focal length of the optical imaging lens system is f, a maximum image height of the optical imaging lens system is ImgH, a vertical distance between a non-axial critical point on the image-side surface of the eighth lens element and an optical axis is Yc82, and the following conditions are satisfied:

10.0<$Vd$min<20.0;

0.30<$f/$ImgH<1.15; and 0.50<$f/Yc82$<5.0.

10. The optical imaging lens system of claim 1, wherein an axial distance between the image-side surface of the eighth lens element and an image surface is BL, a maximum image height of the optical imaging lens system is ImgH, an axial distance between the object-side surface of the first lens element and the image surface is TL, and the following conditions are satisfied:

0.05<$BL/$ImgH<0.25; and 0.80<$TL/$ImgH<1.90.

11. The optical imaging lens system of claim 1, wherein the focal length of the optical imaging lens system is f, the curvature radius of the object-side surface of the first lens element is R1, a curvature radius of the image-side surface of the first lens element is R2, and the following condition is satisfied:

0<|f/R1|+|f/R2|<2.0.

12. The optical imaging lens system of claim 1, wherein an absolute value of the focal length of the second lens element is a minimum among absolute values of focal lengths of all lens elements of the optical imaging lens system.

13. An image capturing unit, comprising:
the optical imaging lens system of claim 1; and
an image sensor disposed on an image surface of the optical imaging lens system.

14. An electronic device, comprising at least two image capturing units disposed on same side of the electronic device, and the at least two image capturing units comprising:
a first image capturing unit, comprising the optical imaging lens system of claim 1 and an image sensor disposed on an image surface of the optical imaging lens system; and
a second image capturing unit, comprising an optical lens assembly and an image sensor disposed on an image surface of the optical lens assembly;
wherein a maximum field of view of the first image capturing unit and a maximum field of view of the second image capturing unit differ by at least 20 degrees.

15. An optical imaging lens system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;
wherein the second lens element has positive refractive power, the image-side surface of the third lens element is concave in a paraxial region thereof, the image-side surface of the seventh lens element is concave in a paraxial region thereof, at least one of the object-side surface and the image-side surface of the seventh lens element has at least one inflection point, the image-side surface of the eighth lens element is concave in a paraxial region thereof, the image-side surface of the eighth lens element has at least one critical point in an off-axis region thereof, and a total number of lens elements in the optical imaging lens system is eight;
wherein an Abbe number of the third lens element is V3, an Abbe number of the fourth lens element is V4, a focal length of the optical imaging lens system is f, a curvature radius of the object-side surface of the first lens element is R1, a curvature radius of the image-side surface of the sixth lens element is R12, an axial distance between the sixth lens element and the seventh lens element is T67, an axial distance between the seventh lens element and the eighth lens element is T78, and the following conditions are satisfied:

10.0<V3+V4<70.0;

−8.0<f/R1−f/R12<1.80; and 0.01<T67/T78<0.45.

16. The optical imaging lens system of claim 15, wherein the object-side surface of the second lens element is convex in a paraxial region thereof;
wherein an axial distance between the third lens element and the fourth lens element is T34, a central thickness of the third lens element is CT3, and the following condition is satisfied:

1.0<T34/CT3<3.50.

17. The optical imaging lens system of claim 15, wherein the third lens element has negative refractive power, and the object-side surface of the seventh lens element is convex in a paraxial region thereof.

18. The optical imaging lens system of claim 15, wherein the fifth lens element has positive refractive power, and an absolute value of a focal length of the second lens element is a minimum among absolute values of focal lengths of all lens elements of the optical imaging lens system.

19. The optical imaging lens system of claim 15, wherein the focal length of the optical imaging lens system is f, a focal length of the first lens element is f1, an axial distance between the fourth lens element and the fifth lens element is T45, a central thickness of the fourth lens element is CT4, and the following conditions are satisfied:

−0.50<f/f1<0.15; and 0.03<T45/CT4<0.55.

20. The optical imaging lens system of claim 15, wherein the focal length of the optical imaging lens system is f, the curvature radius of the object-side surface of the first lens element is R1, the curvature radius of the image-side surface of the sixth lens element is R12, a central thickness of the fifth lens element is CT5, a central thickness of the sixth lens element is CT6, and the following conditions are satisfied:

−6.0<f/R1−f/R12<0.70; and 1.20<CT5/CT6<2.50.

21. The optical imaging lens system of claim 15, further comprising an aperture stop, wherein an axial distance between the aperture stop and an image surface is SL, an axial distance between the object-side surface of the first lens element and the image surface is TL, half of a maximum field of view of the optical imaging lens system is HFOV, and the following conditions are satisfied:

0.70<SL/TL<0.92; and 40.0 [deg.]<HFOV<58.0 [deg.].

22. The optical imaging lens system of claim 15, wherein the focal length of the optical imaging lens system is f, a focal length of the first lens element is f1, a focal length of the second lens element is f2, a focal length of the fourth lens element is f4, and the following conditions are satisfied:

−9.0<f2/f1<2.0; and

−1.0<f/f4≤−0.20.

23. The optical imaging lens system of claim 15, wherein the axial distance between the seventh lens element and the eighth lens element is a maximum among axial distances between each of all adjacent lens elements of the optical imaging lens system;

wherein the focal length of the optical imaging lens system is f, a curvature radius of the object-side surface of the eighth lens element is R15, and the following condition is satisfied:

−0.15<f/R15.

24. An optical imaging lens system comprising eight lens elements, the eight lens elements being, in order from an object side to an image side along an optical path, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;
wherein the object-side surface of the first lens element is concave in a paraxial region thereof, at least one of the object-side surface and the image-side surface of the first lens element is aspheric, at least one of the object-side surface and the image-side surface of the first lens element has at least one inflection point, the image-side surface of the eighth lens element is concave in a paraxial region thereof, the image-side surface of the eighth lens element has at least one critical point in an off-axis region thereof, and a total number of lens elements in the optical imaging lens system is eight;
wherein an Abbe number of the third lens element is V3, an Abbe number of the fourth lens element is V4, a curvature radius of the object-side surface of the eighth lens element is R15, a curvature radius of the image-side surface of the eighth lens element is R16, an axial distance between the object-side surface of the first lens element and an image surface is TL, a maximum image height of the optical imaging lens system is ImgH, and the following conditions are satisfied:

10.0<V3+V4<70.0;

−0.80<(R15+R16)/(R15−R16); and 0.80<TL/ImgH<1.90.

25. The optical imaging lens system of claim 24, wherein the image-side surface of the third lens element is concave in a paraxial region thereof, and the fourth lens element has negative refractive power.

26. The optical imaging lens system of claim 24, wherein a focal length of the optical imaging lens system is f, the curvature radius of the image-side surface of the eighth lens element is R16, the Abbe number of the third lens element is V3, the Abbe number of the fourth lens element is V4, and the following conditions are satisfied:

2.0<f/R16<6.5; and 20.0<V3+V4<50.0.

27. The optical imaging lens system of claim 24, wherein a central thickness of the first lens element is CT1, a central thickness of the third lens element is CT3, and the following condition is satisfied:

0.60<CT1/CT3<4.50.

28. The optical imaging lens system of claim 24, wherein a vertical distance between a non-axial critical point on the object-side surface of the seventh lens element and an optical axis is Yc71, a vertical distance between a non-axial critical point on the image-side surface of the seventh lens element and the optical axis is Yc72, the curvature radius of the object-side surface of the eighth lens element is R15, the curvature radius of the image-side surface of the eighth lens element is R16, and the following conditions are satisfied:

0.30<Yc71/Yc72<2.0; and

−0.30<(R15+R16)/(R15−R16)<9.0.

29. The optical imaging lens system of claim 24, wherein a focal length of the optical imaging lens system is f, a curvature radius of the object-side surface of the first lens element is R1, a curvature radius of the image-side surface of the first lens element is R2, a curvature radius of the object-side surface of the second lens element is R3, a curvature radius of the image-side surface of the second lens element is R4, and the following conditions are satisfied:

0.05<|f/R1|+|f/R2|<1.20; and

−1.50<(R3+R4)/(R3−R4)<0.50.

30. The optical imaging lens system of claim 24, wherein an axial distance between the third lens element and the fourth lens element is T34, an axial distance between the fourth lens element and the fifth lens element is T45, a central thickness of the fourth lens element is CT4, and the following conditions are satisfied:

0<T45/T34<1.0; and 0.03<T45/CT4<0.55.

31. The optical imaging lens system of claim 24, wherein the axial distance between the object-side surface of the first lens element and the image surface is TL, a maximum effective radius of the object-side surface of the first lens element is Y11, and the following condition is satisfied:

2.0<TL/Y11<4.50.

32. The optical imaging lens system of claim 24, wherein the axial distance between the object-side surface of the first lens element and the image surface is TL, an entrance pupil diameter of the optical imaging lens system is EPD, a curvature radius of the object-side surface of the third lens element is R5, a curvature radius of the image-side surface of the third lens element is R6, and the following conditions are satisfied:

1.50<TL/EPD<3.80; and

−0.40<(R5−R6)/(R5+R6)<0.40.

33. The optical imaging lens system of claim 24, wherein an entrance pupil diameter of the optical imaging lens system is EPD, the maximum image height of the optical imaging lens system is ImgH, a curvature radius of the object-side surface of the seventh lens element is R13, a curvature radius of the image-side surface of the seventh lens element is R14, and the following conditions are satisfied:

0.45<EPD/ImgH<1.0; and

−0.70<(R13−R14)/(R13+R14)<0.50.

34. The optical imaging lens system of claim 24, wherein an Abbe number of the first lens element is V1, an Abbe number of the second lens element is V2, the Abbe number of the third lens element is V3, the Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the i-th lens element is Ni, a minimum value of Vi/Ni is (Vi/Ni)min, the axial distance between the object-side surface of the first lens element and the image surface is TL, the maximum image height of the optical imaging lens system is ImgH, and the following conditions are satisfied:

$7.0 < (Vi/Ni)\min < 11.80$, wherein $i=1,2,3,4,5,6,7$ or 8;

$4.0 \text{ [mm]} < TL < 10.0 \text{ [mm]}$; and $4.0 \text{ [mm]} < ImgH < 9.50 \text{ [mm]}$.

35. The optical imaging lens system of claim 24, wherein a maximum effective radius of one of the object-side surface of the second lens element, the image-side surface of the second lens element, the object-side surface of the third lens element and the image-side surface of the third lens element is a minimum among maximum effective radii of all lens surfaces of the optical imaging lens system.

* * * * *